(12) United States Patent
Naitoh

(10) Patent No.: US 9,864,939 B2
(45) Date of Patent: Jan. 9, 2018

(54) INFORMATION PROCESSING APPARATUS, INFORMATION PROCESSING SYSTEM, METHOD OF SHARING DATA, AND RECORDING MEDIUM STORING DATA SHARING CONTROL PROGRAM

(71) Applicant: Shohichi Naitoh, Kanagawa (JP)

(72) Inventor: Shohichi Naitoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 112 days.

(21) Appl. No.: 13/768,654

(22) Filed: Feb. 15, 2013

(65) Prior Publication Data
US 2013/0242335 A1    Sep. 19, 2013

(30) Foreign Application Priority Data

Mar. 14, 2012  (JP) .................................. 2012-057005
Nov. 28, 2012  (JP) .................................. 2012-260157

(51) Int. Cl.
*G06K 15/00* (2006.01)
*G06F 3/12* (2006.01)
*G06F 21/60* (2013.01)

(52) U.S. Cl.
CPC ....... *G06K 15/4095* (2013.01); *G06F 3/1222* (2013.01); *G06F 3/1238* (2013.01); *G06F 3/1288* (2013.01); *G06F 21/608* (2013.01); *G06K 15/405* (2013.01)

(58) Field of Classification Search
CPC .... G06F 21/608; G06F 3/1222; G06F 3/1238; G06F 3/1288; G06K 15/405; G06K 15/4095; H02J 3/00; H04N 1/00899; H04N 1/00901; H04N 1/00904; Y10T 307/604
USPC ............................................... 358/1.14, 1.15
See application file for complete search history.

(56) References Cited

U.S. PATENT DOCUMENTS

| | | | | |
|---|---|---|---|---|
| 9,207,884 | B1 * | 12/2015 | Baratharajan | ......... G06F 3/1204 |
| 2007/0081186 | A1 * | 4/2007 | Numata | ............. H04N 1/00352 |
| | | | | 358/1.15 |
| 2008/0177743 | A1 * | 7/2008 | Kasatani | ............ H04N 1/00127 |
| 2010/0321717 | A1 * | 12/2010 | Ohba et al. | ................. 358/1.14 |

FOREIGN PATENT DOCUMENTS

| | | | |
|---|---|---|---|
| JP | 2001101100 | * | 4/2001 |
| JP | 2005-269422 | | 9/2005 |
| JP | 2009-067021 | | 4/2009 |

OTHER PUBLICATIONS

English machine translation for case JP2001101100.*

* cited by examiner

*Primary Examiner* — Iriana Cruz
(74) *Attorney, Agent, or Firm* — Harness, Dickey & Pierce, P.L.C.

(57) ABSTRACT

A service provider system obtains, from a request for registering a job to process electronic data, first user information regarding a first user who sends the request, location information indicating a data storage area at which the electronic data to be processed is stored, and second user information regarding a second user, and allows the second user to execute the job being registered.

20 Claims, 36 Drawing Sheets

FIG. 15

| PRINT JOB REGISTRATION TABLE | | |
|---|---|---|
| JOB ID | USER NAME | SHARED USER NAME |
| 001 | User A | — |
| 002 | User B | — |
| 003 | User C | Guest E |
| 004 | User A | Guest D, User C |

FIG. 16

| SHARED PASSWORD TABLE | | |
|---|---|---|
| JOB ID | SHARED USER NAME | ONE-TIME PASSWORD |
| 003 | Guest E | ABCDEFG |
| 004 | Guest D | abcdefg |
| 004 | User C | hijklmn |

FIG. 17

| ADDRESS TABLE | | |
|---|---|---|
| USER NAME | EMAIL ADDRESS | USER REGISTRATION |
| User A | usera@xxx.com | Y |
| User B | userb@xxx.com | Y |
| User C | userc@xxx.com | Y |
| Guest D | guestd@guest.com | N |
| Guest E | gueste@guest.com | N |

FIG. 18

| ACCESS AUTHENTICATION INFORMATION TABLE | | | |
|---|---|---|---|
| USER NAME | STORAGE URL | ACCESS AUTHENTICATION INFORMATION | |
| | | LOGIN NAME | PASSWORD |
| User A | www.webstorage1.com | a | A |
| User B | www.webstorage2.com | yamada | takashi |
| User B | www.webstorage3.com | test | test |
| ... | ... | ... | ... |

FIG. 19

| SYSTEM LOGIN DATA TABLE ||
|---|---|
| USER NAME | PASSWORD |
| User A | aaa |
| User B | bbb |
| User C | ccc |

FIG. 20

| PRINT JOB REGISTRATION TABLE ||||
|---|---|---|---|
| JOB ID | USER NAME | SHARED USER NAME | URL |
| 004 | User A | Guest D, User B | www.webstorage1.com/test/data1 |
| ... | ... | ... | ... |

FIG. 21

| PRINT JOB REGISTRATION TABLE ||||
|---|---|---|---|
| JOB ID | USER NAME | SHARED USER NAME | URL |
| 004 | User A | Guest D | www.webstorage1.com/test/data1 |
| 005 | User B | ... | www.webstorage2.com/test/data1 |

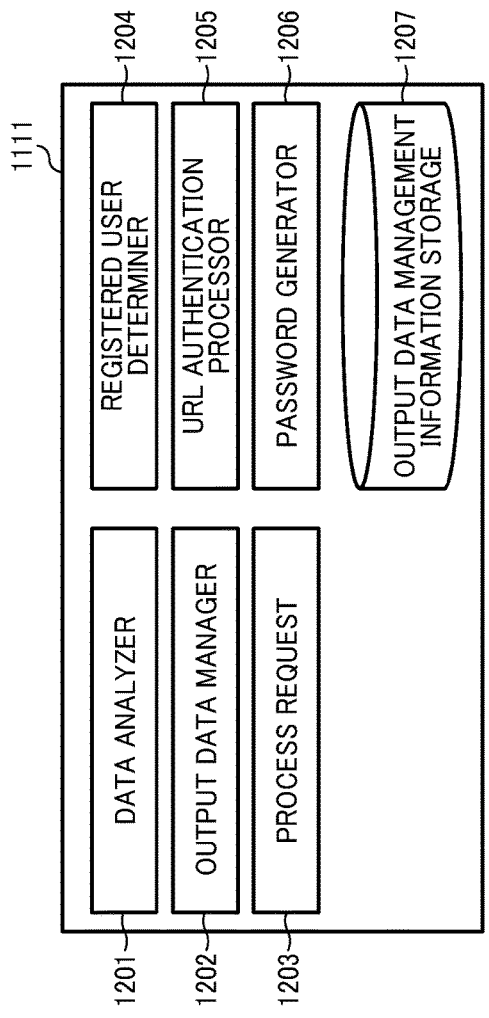

FIG. 27

| ID | OUTPUT DATA ID | ORGANIZATION CODE | USER IDENTIFICATION DATA | REQUEST USER ORGANIZATION CODE | REQUEST USER IDENTIFICATION DATA | BIBLIOGRAPHIC DATA | CONVERSION STATUS |
|---|---|---|---|---|---|---|---|
| 1 | 6 | XXX | User B | XXX | User A | ... | COMPLETED |
| 2 | 7 | XXX | User B | XXX | User C | ... | COMPLETED |
| 5 | 8 | YYY | User D | YYY | User A | ... | COMPLETED |

FIG. 28

| ID | OUTPUT DATA ID | ORGANIZATION CODE | USER IDENTIFICATION DATA | REQUEST USER ORGANIZATION CODE | REQUEST USER IDENTIFICATION DATA | BIBLIOGRAPHIC DATA | CONVERSION STATUS |
|---|---|---|---|---|---|---|---|
| 1 | 1 | XXX | User B | XXX | User A | ... | COMPLETED |
| 2 | 3 | XXX | User B | XXX | User C | ... | COMPLETED |
| 5 | 5 | YYY | User D | YYY | User A | ... | COMPLETED |

FIG. 29

| ORGANIZATION CODE | ORGANIZATION NAME | COUNTRY | LANGUAGE | ADDRESS DATA | ... |
|---|---|---|---|---|---|
| XXX | COMPANY A | JAPAN | JAPANESE | CompanyA@print.com | |
| YYY | COMPANY B | USA | ENGLISH | CompanyB@print.com | |

FIG. 30

| ORGANIZATION CODE | USER NAME | PASSWORD | ADDRESS DATA | STORAGE A, LOGIN DATA | STORAGE B, LOGIN DATA | ... |
|---|---|---|---|---|---|---|
| XXX | User A | AAA | A@aaa.com | User AA / xxx | User AA / xx | |
| | User B | BBB | B@aaa.com | User B / BBB | — | |
| | User C | CCC | C@aaa.com | User C / CCC | User CC / CCC | |
| YYY | User A | AAA | A@bbb.com | — | — | |
| | User D | DDD | D@bbb.com | — | — | |

FIG. 31

| ORGANIZA-TION CODE | DEVICE AUTHEN-TICATION DATA | BUSINESS UNIT DATA | CAPABILITY | ... |
|---|---|---|---|---|
| XXX | 111 | BUSINESS UNIT A | A4 COLOR | |
| | 222 | BUSINESS UNIT B | A2 COLOR | |
| | 333 | BUSINESS UNIT B | A4 MONOCHROME | |
| YYY | 444 | — | A4 COLOR | |

FIG. 32

| STORAGE NAME | URL KEYWORD |
|---|---|
| STORAGE A | storageA |
| STORAGE B | stoB |
| ... | ... |

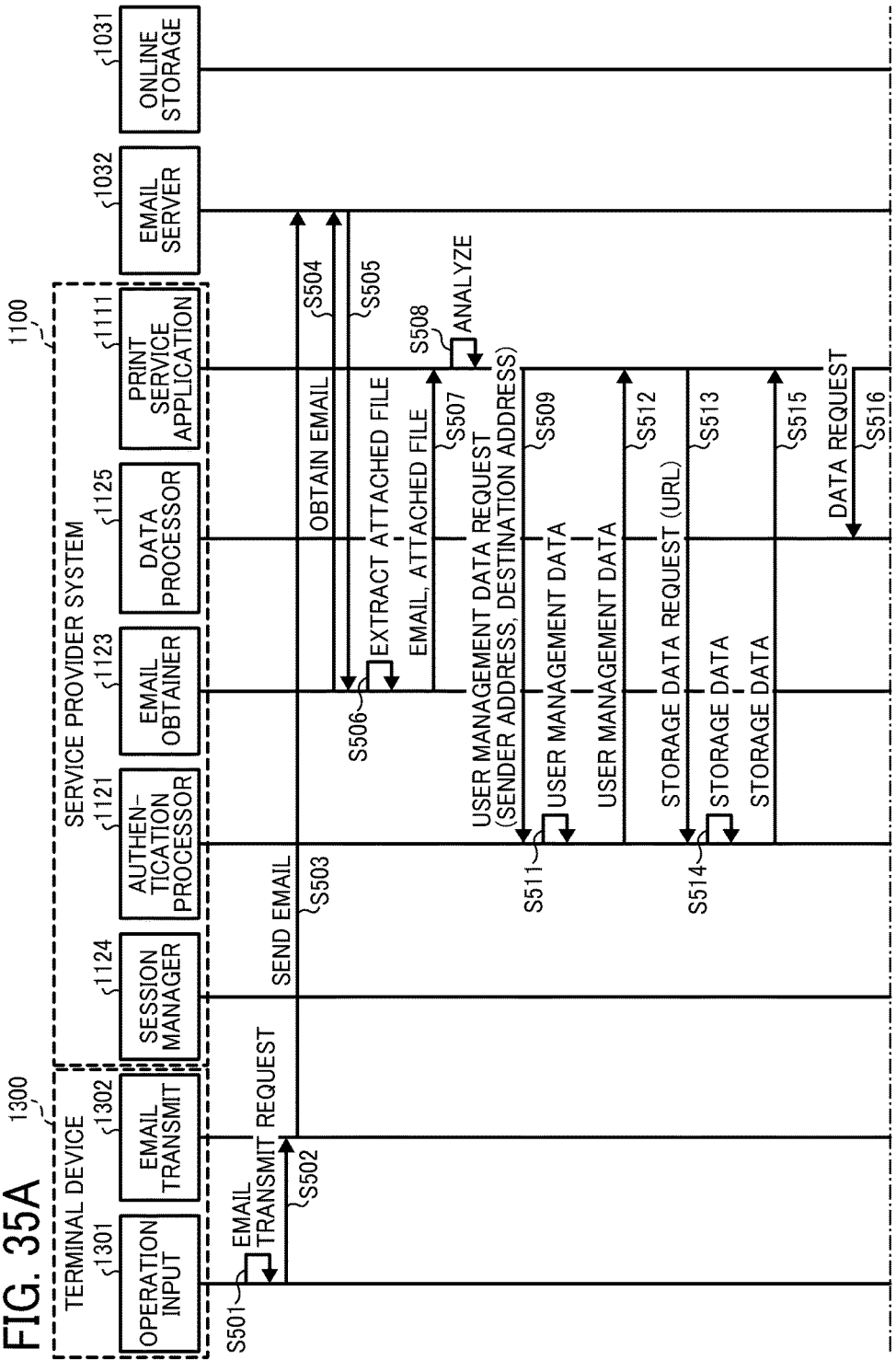

FIG. 38

| ID | OUTPUT DATA ID | ORGANI-ZATION CODE | USER IDENTIFICATION DATA | PASSWORD | REQUEST USER ORGANIZATION CODE | REQUEST USER IDENTIFICATION DATA | BIBLIO-GRAPHIC DATA | CONVERSION STATUS |
|---|---|---|---|---|---|---|---|---|
| 1 | 1 | XXX | User A | — | XXX | User A | ... | COMPLETED |
| 2 | 2 | XXX | User B | — | XXX | User C | ... | COMPLETED |
| 3 | 3 | YYY | User D | — | YYY | User A | ... | COMPLETED |
| 4 | 4 | — | — | 12345 | XXX | User A | ... | COMPLETED | ic
INFORMATION PROCESSING APPARATUS, INFORMATION PROCESSING SYSTEM, METHOD OF SHARING DATA, AND RECORDING MEDIUM STORING DATA SHARING CONTROL PROGRAM

CROSS-REFERENCE TO RELATED APPLICATIONS

This patent application is based on and claims priority pursuant to 35 U.S.C. §119 to Japanese Patent Application Nos. 2012-057005 filed on Mar. 14, 2012, and 2012-260157 filed on Nov. 28, 2012, in the Japan Patent Office, the entire disclosure of which is hereby incorporated by reference herein.

BACKGROUND OF THE INVENTION

Technical Field

The present invention generally relates to an apparatus, system, and method of sharing electronic data, and more specifically to an information processing apparatus, an information processing system, a method of sharing electronic data, and a data sharing control program stored in a non-transitory recording medium.

Background Art

Japanese Patent Application Publication No. JP-2005-269422A discloses a print server, which spools an electronic file attached to an electronic mail ("email") as a print job, when the email requesting printing of the electronic file is received from a registered user. The print server further sends email that is set with a right to access the print job to the registered user, thus preventing an unregistered user from accessing the print job such as the spooled electronic file.

SUMMARY OF THE INVENTION

While the technique disclosed in Japanese Patent Application Publication No. JP-2005-269422A improves the security by preventing the other user from accessing the print job, the user may sometimes want to share the electronic file, which is spooled as the print job, with the other user. The other user, who may not be registered, is not able to access the print job as the access right is only set for the registered user. On the other hand, without setting the access right, the electronic file will be accessible by any user, thus causing the security problem.

In view of the above, one of the objects of the present invention is to provide a technique of registering a job to process electronic data in response to a request from a user in a manner such that access to the job, such as the electronic data to be processed, can easily be shared with the other user with the improved security.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 15 is an example data structure of a print job registration table, managed by the print server of FIG. 2;

FIG. 16 is an example data structure of a shared user password table, managed by the print server of FIG. 2;

FIG. 17 is an example data structure of an address table, managed by the print server of FIG. 2;

FIG. 18 is an example data structure of an access authentication information table, managed by the print server of FIG. 2;

FIG. 19 is an example data structure of a system login data table, managed by the print server of FIG. 2;

FIG. 20 is an example data structure of a print job registration table, managed by the print server of FIG. 2;

FIG. 21 is an example data structure of a print job registration table, managed by the print server of FIG. 2;

FIG. 25 is a schematic block diagram illustrating a functional structure of print service application of the service provider system of FIG. 24, according to an example embodiment of the present invention;

FIG. 26 is an example data structure of output data management information of a request user, managed by the print service application of FIG. 25;

FIG. 27 is an example data structure of output data management information of a shared user, managed by the print service application of FIG. 25;

FIG. 28 is an example data structure of output data management information of a shared user, managed by the print service application of FIG. 25;

FIG. 29 is an example data structure of organization management data, managed by the service provider system of FIG. 24;

FIG. 30 is an example data structure of user management data, managed by the service provider system of FIG. 24;

FIG. 31 is an example data structure of device management data, managed by the service provider system of FIG. 24;

FIG. 32 is an example data structure of storage data, managed by the service provider system of FIG. 24;

FIGS. 35A and 35B are a data sequence diagram illustrating operation of processing email that requests registration of a job, performed by the data output system of FIG. 22, according to an example embodiment of the present invention:

FIG. 38 is an example data structure of output data management information, managed by the print service application of FIG. 25;

Figure 1:
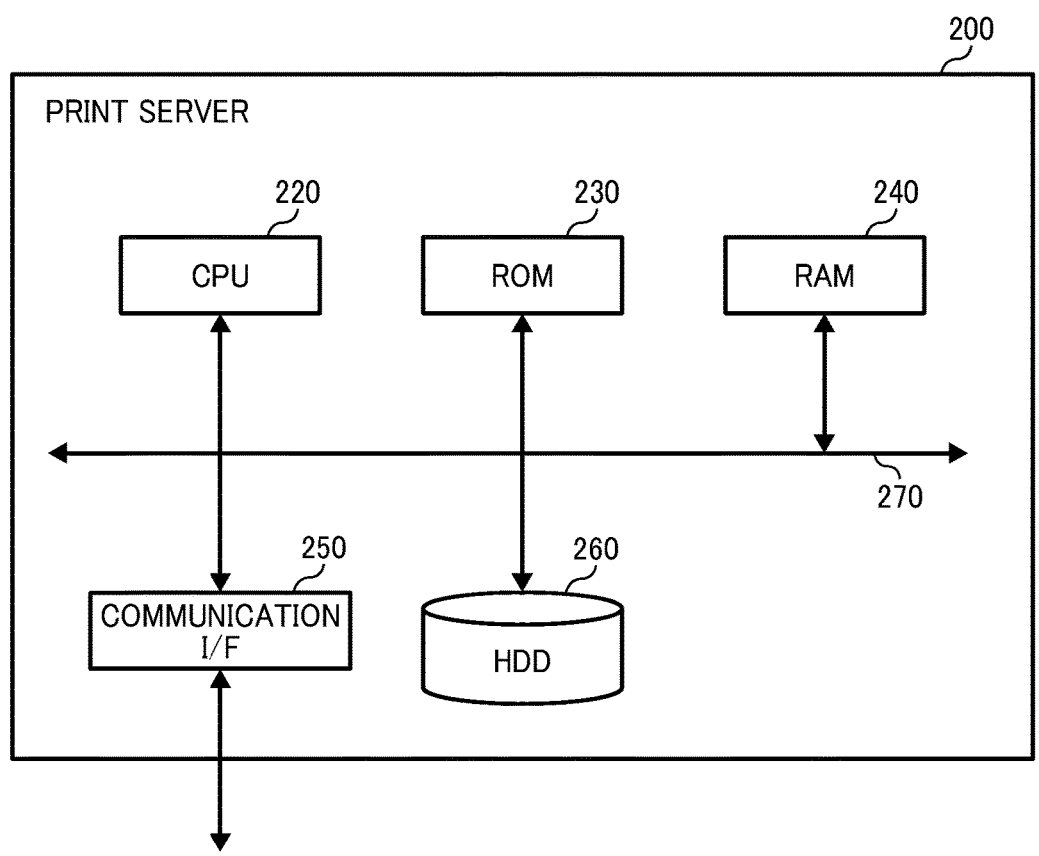
FIG. 1 is a schematic block diagram illustrating a hardware structure of a computer system, which functions as a print server, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIGS. 1 to 21 and 43, an example configuration of a data output system including an information processing apparatus or an information processing system, which functions as a server that processes electronic data according to a request received from a client is explained. More specifically, in this example, the data output system is implemented as a print system including a print server that prints electronic data according to a request received from a user. As described below, in one example, the print server receives an email requesting registration of a print job to print electronic data, from a first user. When the email indicates that the print job be shared with a second user different from the first user, the print server stores first user information and second user information, in association with information regarding the electronic data to be printed, as job information regarding the print job. When a request for executing the print job is received from the first user or the second user through a printer, the print server obtains the information regarding the electronic data to be printed using the job information, and sends the information regarding the electronic data or the electronic data to the printer.

Figure 2:
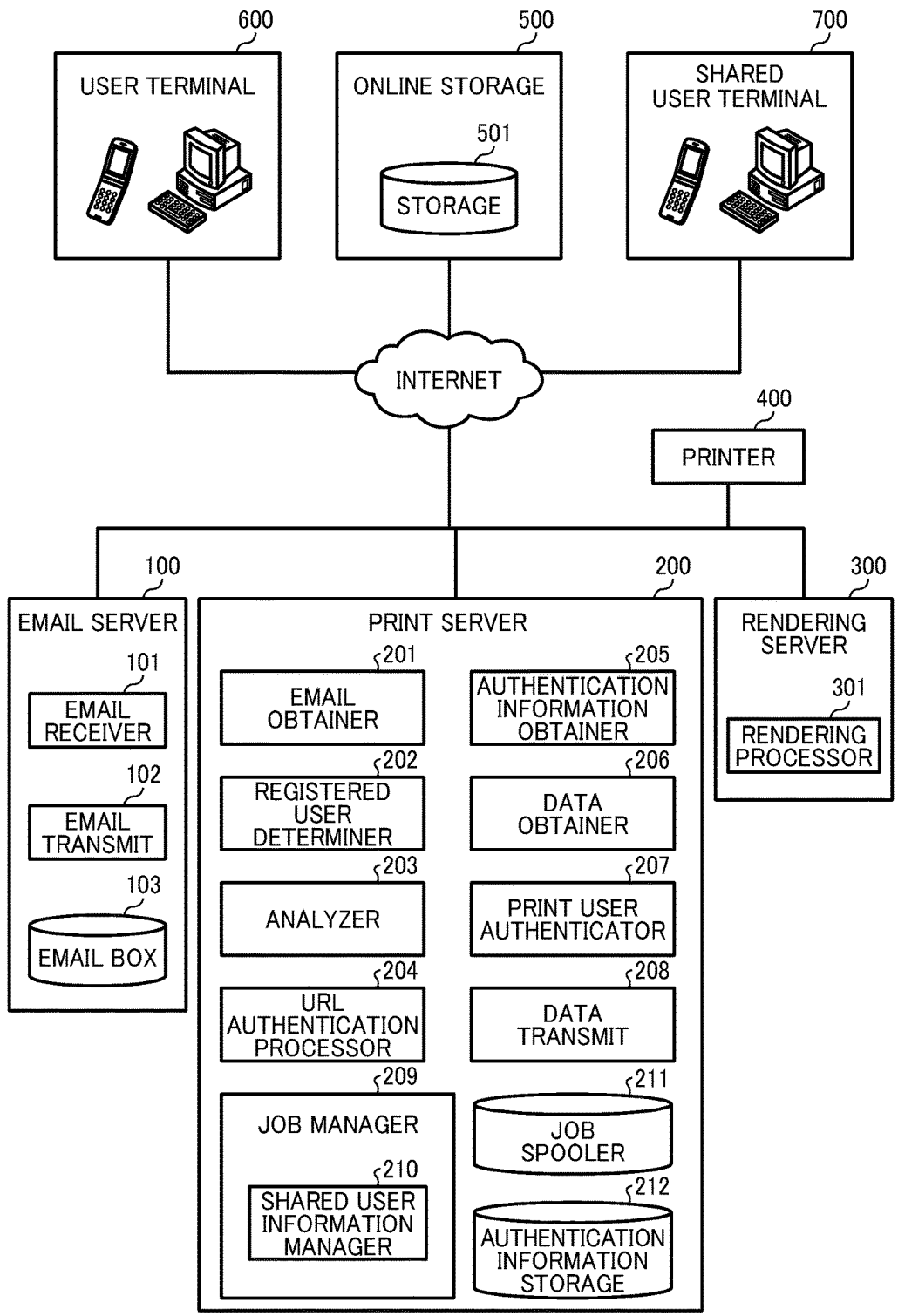
FIG. 2 is a schematic block diagram illustrating a functional structure of a print system including the print server of FIG. 1.

In this example illustrated in FIGS. 1 to 21, as illustrated in FIG. 2, the print system of FIG. 2 includes an email server 100, a print server 200, a rendering server 300, and a printer 400. The print system of FIG. 2 further includes an online storage 500, which may be accessed by a server such as the print server 200 through the Internet. The user of the print system may access a plurality of servers on the network, such as the print server 200, through a user terminal 600 or a shared user terminal 700.

Further, in this example, it is assumed that at least the email server 100 and the printer 400 are located on a private network, such as the company's network, which is protected by firewall. The online storage 500 may be provided on a public network outside the firewall. The print server 200 and the rendering server 300 may be provided on the private network, or may be provided on the public network at which the online storage is provided.

Furthermore, the print system of FIG. 2 may further include any other server apparatus or client apparatus.

<Hardware and Software Configuration of Print System>

FIG. 1 illustrates a schematic block diagram illustrating a hardware structure of the print server 200, according to an example embodiment of the present invention. The print server 200 may be implemented by an information processing apparatus, which includes a central processing unit (CPU) 220, a read only memory (ROM) 230, a random access memory (RAM) 240, a communication interface (UF) 250, and a hard disk drive (HDD) 260, which are connected through a system bus 270.

The CPU 220 is a central processing unit, which manages or controls entire operation of the print server 200. The ROM 230 is a read only memory, which stores various control programs for execution by the CPU 220. The RAM 240 is a rewritable memory, which functions as a work area in which the programs to be executed by the CPU 220 are deployed for various processing.

The communication I/F 250 is an interface, which allows the print server 200 to communicate with the outside apparatus such as the email server 100, the rendering server 300, or the printer 400, of the print system of FIG. 2 through the network. The communication I/F 250 may be implemented by any desired wired or wireless interface in compliance with the communication standards compatible with the print server 200. The HDD 260 is a storage area of large size, which is capable of storing various data.

In operation, the CPU 220 reads out various control programs from the ROM 230 onto the RAM 240, and operates according to the control programs deployed on the RAM 240. More specifically, the CPU 220 selectively operates according to the various programs to cause the print server 200 to have various functions including, for example, the function of receiving an email, the function of analyzing an email, the function of obtaining authentication information, the function of obtaining electronic data, the function of transmitting electronic data, the function of authenticating, the function of managing a job, and the function of managing information to be shared among a plurality of users. These functional modules of the print server 200, which are realized by the control programs, will be explained below referring to FIG. 2.

In this example, the email server 100, the rendering server 300, the online storage 500, the user terminal 600, and the shared user terminal 700 may each be implemented by an information processing apparatus having the hardware structure that is similar to the hardware structure of FIG. 1, except for control program being installed that cause the information processing apparatus to respectively function as the rendering server 300, the online storage 500, the user terminal 600, and the shared user terminal 700.

Referring now to FIG. 2, a functional structure of the print system including the print server 200 is explained according to an example embodiment of the present invention. As described above, in the print system of FIG. 2, the user at the user terminal 600 sends email addressed to the print server 200, which requests registration of a print job to print a specific electronic file for the user himself or herself ("the request user"), and the other user ("shared user"). The print server 200 registers the print job, by storing information regarding the request user and the shared user, and information regarding the electronic file to be printed. When the registered job is to be executed, the print server 200 obtains the electronic file, and prints the electronic file using the printer 400.

The email server 100 includes an email receive 101, an email transmit 102, and an email box 103. More specifically, the CPU 220 operates according to the email managing program loaded from the ROM 230 onto the RAM 240 to cause the information processing apparatus to function as the email server 100.

The email receive 100, which may be implemented by the CPU 220 and the communication I/F 250, receives email addressed to a specific user registered in the system. In one example, the email receive 101 receives email addressed to the print server 200, which may be transmitted from a user terminal 600, and stores the received email in the email box 103. The email transmit 102, which may be implemented by the CPU 220 and the communication I/F 250, transmits the email to a destination address. For example, the email transmit 102 transmits the email addressed to the print server 200, to the print server 200. The email box 103 is a storage area, which may be implemented by any desired memory such as the HDD 260, in which email received at the email receive 101 is stored at least until the email transmit 102 transmits the email to the destination.

In this example, the print server 200 is provided with the function of registering a print job that prints electronic data as specified by email received from the user, and the function of transmitting the electronic data to be printed to the printer 400 according to a user instruction. The print server 200 includes an email obtainer 201, a registered user determiner 202, an analyzer 203, an URL authentication processor 204, an authentication information obtainer 205, a data obtainer 206, a print user authenticator 207, a data transmit 208, a job manager 209, a job spooler 211, and an authentication information storage 212.0

The email obtainer 201 is implemented by the instructions generated by the CPU 220 that execute the function of obtaining email using the communication I/F 250. The email obtainer 201 monitors email in the email box 103 of the email server 100 by periodically polling. When new email addressed to the print server 200 is stored in the email box 103, the email obtainer 201 receives the new email from the email server 100.

The registered user determiner 202, which is implemented by the instructions generated by the CPU 220, authenticates a user of the print server 200 In one example, the registered user determiner 202 determines whether a sender of email received at the email obtainer 201 is a registered user who is previously registered to the print server 200.

The analyzer 203 is implemented by the instructions generated by the CPU 220 that execute the function of analyzing an email. The analyzer 203 analyzes email obtained at the email obtainer 201 based on information extracted from the email. Examples of information extracted from the email include a uniform resource locator (URL) described in the body of the email, a sender's email address described in the "From" field, and a destination email address described in the "To" field and/or the "CC" (or "BCC") field. While the URL is used to point out a location at which an electronic data file ("electronic file") to be printed is stored, any other information indicating a location at which specific electronic file is stored may be used.

The URL authentication processor 204, which may be implemented by the instructions generated by the CPU 220, determines whether authentication is required to obtain the electronic file specified by the URL obtained by the analyzer 203, to generate a determination result.

The authentication information obtainer 205, which may be implemented by the instructions generated by the CPU 220, obtains access authentication information based on the determination result generated by the URL authentication processor 204. More specifically, when the URL authentication processor 204 determines that authentication is required to obtain the electronic file specified by the URL, the authentication information obtainer 205 accesses the authentication information storage 212 to obtain access authentication information. The access authentication information is used to authenticate whether a user, such as the email sender, is allowed to access the specified URL to obtain the electronic file.

The data obtainer 206, which may be implemented by the instructions generated by the CPU 220, obtains electronic data. The data obtainer 206 obtains the electronic file from the specified URL, when the authentication is successful. Alternatively, when the URL authentication processor 204 determines that authentication is not required to obtain the electronic file, the data obtainer 206 obtains the electronic file from the specified URL without authentication, that is, without using access authentication information.

The print user authenticator 207, which may be implemented by the instructions generated by the CPU 220, performs the function of authenticating a user. The print user authenticator 207 authenticates a user, which is registered to use the print services of the print server 200.

The data transmit 208, which may be implemented by the instructions generated by the CPU 220 that execute the function of transmitting electronic data using the communication I/F 250. The data transmit 208 transmits the electronic file obtained at the data obtainer 206 to the printer 400.

The job manager 209, which may be implemented by the instructions generated by the CPU 220, performs the function of managing a job such as a print job that is registered according to a user instruction. The job manager 209 manages information regarding the print job, for example, by using a print job registration table of FIG. 15, which may be stored in any desired memory such as the HDD 260. Referring to FIG. 15, the print job registration table stores, for each of the registered jobs, a job ID, a user name, and a shared user name in association with one another. The job ID is one example of job identification data for uniquely identifying a job. The user name is one example of user identification data for uniquely identifying a request user who requests registration of a job. The shared user name is one example of shared user identification data for uniquely identifying a shared user of the job, which is set by the request user.

The job manager 209 is provided with a shared user information manager 210 (FIG. 2). The shared user information manager 210 performs the function of managing shared user information regarding a shared user registered in the print job registration table of FIG. 15. More specifically, in this example, the shared user information manager 210 manages shared user authentication information, for example, by using a shared user password table of FIG. 16, which may be stored in any desired memory such as the HDD 260. The shared user password table of FIG. 16 stores, for each shared user, a job ID, a shared user name, and a one-time password in association with one another. The job ID is one example of job identification data for uniquely identifying a job, which is to be shared with the shared user. With the job ID, shared user authentication information stored in the shared user password table of FIG. 16 and the job registration information stored in the print job registration table of FIG. 15 can be associated with one another. The shared user name is one example of shared user identification data for uniquely identifying a shared user. The one-time password is one example of shared user authentication information used for authenticating a shared user of the print job. The one-time password may be assigned to each one of the shared users.

The shared user information manager 210 is additionally provided with the function of notifying the shared user of the one-time password, for example, by sending email addressed to the shared user. The shared user information manager 210 requests the email transmit 102 of the email server 100 to send notification regarding the one-time password via email.

The job spooler 211 stores, for each one of the print jobs registered in the print job registration table of FIG. 15, information regarding the print settings of the print job in a predetermined memory area in association with the job ID of the print job. The print settings information may be stored in the form of electronic file. Further, the job spooler 211 may be implemented by a memory such as the HDD 260.

The authentication information memory 212 stores information related to authentication such as an address table of FIG. 17, an access authentication information table of FIG. 18, and a system login data table of FIG. 19. The authentication information memory 212 may be implemented by, for example, the HDD 260.

Referring to FIG. 17, the address table stores, for each one of a plurality of users, a user name, an email address, and information indicating whether the user is a registered user having system login data registered in the print server 200, in association with one another. The address table of FIG. 17 may be referred to by the registered user determiner 202 to determine whether a sender of email is a registered user. In this example, the user having the value "Y" in the "user registration" field is a registered user, and the user having the value "N" in the "user registration" field is an unregistered user.

For example, as illustrated in the case of Guest D or Guest E in FIG. 17, assuming that the analyzer 203 determines that an email address of a shared user obtained from the email indicates that the shared user is not registered in the address table of FIG. 17, the analyzer 203 enters the email address of the shared user, in association with a user name that is arbitrarily assigned. The analyzer 203 further enters the value "N" in the "user registration" field in association with the email address of the shared user to indicate that the user is unregistered. The entry for the unregistered user having the value "N" is kept at least temporarily so that the shared user information manager 210 is able to refer to this entry to obtain the email address, which is used to send notification regarding the one-time password to the shared user. At any timing after the entry is referred to by the shared user information manager 210 for password notification, the entry regarding the unregistered user may be deleted. For example, as soon as password notification is sent to the unregistered user, information regarding the unregistered user may be deleted.

Referring to FIG. 18, the access authentication information table stores access authentication information to be used for authenticating a user to determine whether to allow the user to access a storage area of the online storage 500. For each combination of specific user and specific storage area, the access authentication information table stores access authentication information of the user, in association with a user name and a storage URL. In this example, the storage URL indicates a URL of specific storage area of the online storage 500 that requires authentication for access. For example, a system administrator or a user may previously access the print server 200 to register access authentication information in the access authentication information table. The access authentication information may be a combination of user name and password.

Referring to FIG. 19, the system login data table stores, for each user, system login data to be used for authenticating the user of the printer 400, who requests to print an electronic file using the print system of FIG. 2. The user who is registered to the system login data table of FIG. 19 is a registered user who is authorized to use the print services provided by the print server 200. In addition to the registered user, an unregistered user may be allowed to use the print services provided by the print server 200, as long as the unregistered user is assigned with a one-time password issued by the print server 200.

Referring back to FIG. 2, the rendering server 300 includes a rendering processor 301, which may be implemented by the instructions generated by the CPU 220 according to the rendering control program stored in any desired memory. In case the data obtainer 206 of the print server 200 obtains an electronic file having a data format that is not compatible with the printer 400 such that the printer 400 is not able to print, the rendering processor 301 applies rendering processing to the electronic file to convert a data format from the non-printable format to a printable format. For example, assuming that the data obtainer 206 receives a electronic file in word format, the rendering processor 301 applies rendering processing to convert from the word format to a pdf format.

The printer 400, which is one example of image forming apparatus, is provided with an operation panel, which displays a login screen to a user, and receives authentication information of the user, such as a user name and a password that are respectively input by the user, as system login data. As described below, the password of the system login data may be a one-time password. The printer 400 sends the system login data to the print server 200 to request for authentication through a communication interface. Based on a determination result indicating that authentication is successful, the printer 400 receives an electronic file of the print job, from the data transmit 208 of the print server 200 through the communication interface, and forms an image on a recording sheet based on the received electronic file using an image forming device.

Figure 43:
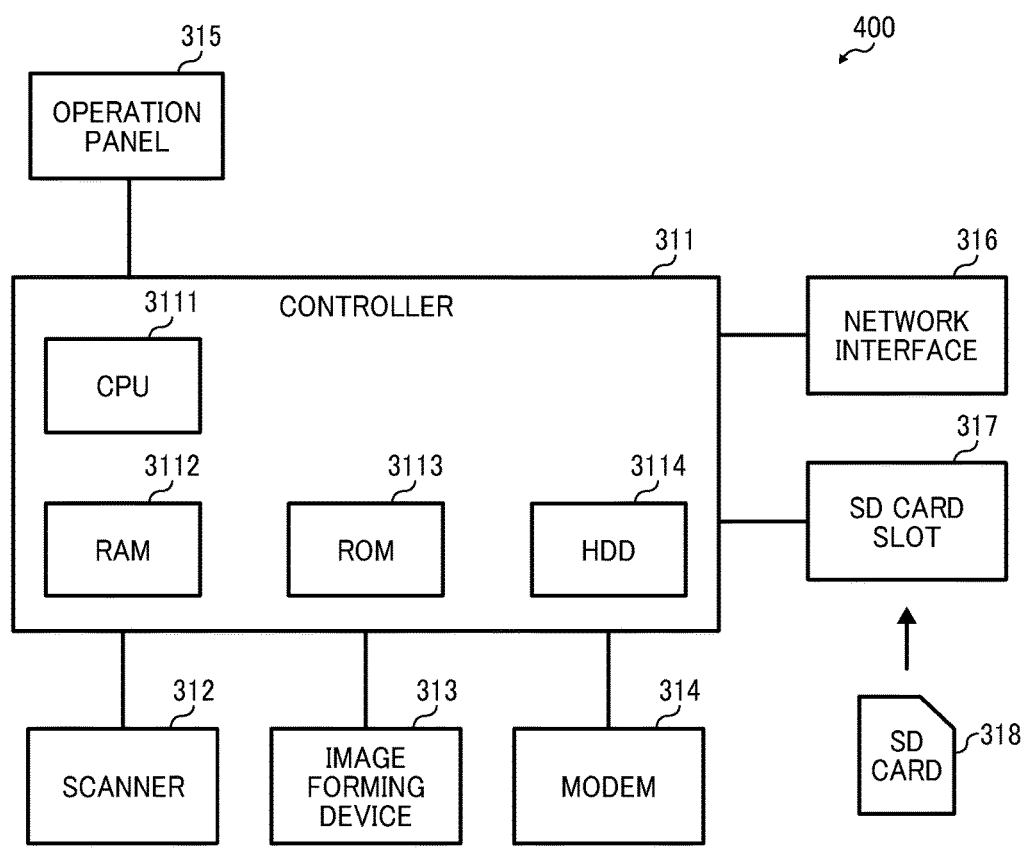
FIG. 43 is a schematic block diagram illustrating a hardware structure of any one of a printer of the print system of FIG. 2 and the information processing apparatus of the data output system of FIG. 22, according to an example embodiment of the present invention.

FIG. 43 illustrates an example hardware structure of the printer 400, which is implemented by a multifunctional peripheral (MFP). The printer 400 includes a controller 311, a scanner 312, an image forming device 313, a modem 314, an operation panel 315, a network interface 316, and a SD card slot 317. To the SD card slot 317, a SD card 318 may be inserted.

The controller 311 includes a CPU 3111, a random access memory (RAM) 3112, a read only memory (ROM) 3113, and a hard disk drive (HDD) 3114. The ROM 3113 stores therein various control programs ("control program") and/or data to be used in cooperation with the control program. The RAM 3112 functions as a memory area to which the control program is loaded, or a work area used for the loaded control program. The CPU 3111 executes the control program loaded onto the RAM 3112 to perform various functions or operations according to the control program. The HDD 3114 stores therein the control program or various data to be used for the control program.

The scanner 312 scans an original document into image data. The image forming device 313 forms an image onto a recording sheet based on print data, which may be generated from the image data. The modem 314 allows the printer 400 to connect with a telephone line such as a public switched telephone network. The modem 314 is used to transmit or receive facsimile data to or from the outside apparatus through the telephone line.

The operation panel 315 includes an input device such as one or more keys ("hard keys"), each of which may be selected by a user to input a user instruction, and a display device such as a liquid crystal display (LCD). The display device of the operation panel 315 may display various data including, for example, an image such as a thumbnail image of image data input to the printer 400, and information regarding an operation state of the printer 400. The display device of the operation panel 315 may be implemented by a touch panel screen, which allows the user to input a user instruction through a screen displayed by the display device.

The network interface 316 allows the printer 400 to connect with a wired or wireless network in the print system of FIG. 2. The network interface 316 may be implemented by, for example, a network interface card.

The SD card slot 317 allows the printer 400 to read out various data from the SD card 318, which may be inserted to the SD card slot 317. For example, the printer 400 may read a control program stored in the SD card 318 to load the read program, in addition to or in alternative to the control program stored in the ROM 3113.

In alternative to using the SD card 318, any desired recording medium such as a CD-ROM or universal serial bus (USB) memory may be used. In such case, the SD card 317 may be replaced with any desired reading device specific to a type of the recording medium.

Referring back to FIG. 2, the online storage 500 provides a user with a storage area (storage) 501. More specifically, the user can access the storage area 501 using any desired terminal device through the network, such as the Internet, to store an electronic file in the storage area 501. The online storage 500 may be implemented by any data storage service that is publicly available such as Google Docs, quanp (Registered trademark), Evernote (Registered trademark), or Dropbox (Registered trademark). The online storage generally requests the user to provide a login name and a password for authentication. In this example, it is assumed that the online storage 500 requires the user to provide with access authentication information to access the storage area 501.

As described above referring to FIG. 18, the print server 200 stores access authentication information of the user for authentication by the online storage 500. In response to a user instruction for accessing an electronic file in the storage area 501, the print server 200 transmits the access authentication information of the user that is stored in the table of FIG. 18 to the online storage 500 to request for authentication.

In this example illustrated in FIG. 2, only one online storage 500 is illustrated. Alternatively, any number of online storages may be used in the print system of FIG. 2. Further, in this example, it is assumed that the access authentication information table of FIG. 18 stores access authentication information for a plurality of combinations of user and online storage area.

Further, in addition to or in alternative to the online storage 500 accessed through the public network such as the Internet, any private server such as a file server located within the private network may be used to store an electronic file. For example, a file server may be provided within the local area network managed by the same organization such as one company. In such case, access authentication information may not be required to access the file server to obtain an electronic file, as the file server is provided within the private network.

The user terminal 600 is any desired terminal operated by a user who sends email ("email sender") to use the services provided by the print system of FIG. 2. Examples of the user terminal 600 include, but not limited to, a personal computer (PC), and a portable device such as a portable phone. The user who decides to use the services provided by the print system of FIG. 2 describes an URL of an electronic file, which is previously stored in the online storage 500, in a body of email, using email software. The user further sets a destination address of email, specifically, by entering in the "TO" field with an email address "cloud_print@xxx.com" assigned to the print server 200. In case the user wants to share the electronic file with the other users (shared user), the user further enters an email address of the shared user to "TO" or "CC" field of email data. The email transmitted by the user terminal 600 is stored in the email box 103.

The shared user terminal 700 is any desired terminal operated by a user who is set by the email sender as a shared user. Examples of the user terminal 700 include, but not limited to, a personal computer (PC), and a portable device such as a portable phone. The shared user receives password notification, which is transmitted by the print server 200 in response to the email that requests registration of a print job. With this password notification, the shared user is notified that there is the print job registered for the shared user by the request user.

<Example Operation of Print System>

Referring now to FIGS. 3 to 6, operation of registering a print job by email and executing the print job, performed by the print system of FIG. 2, is explained according to an example embodiment of the present invention.

Figure 3:
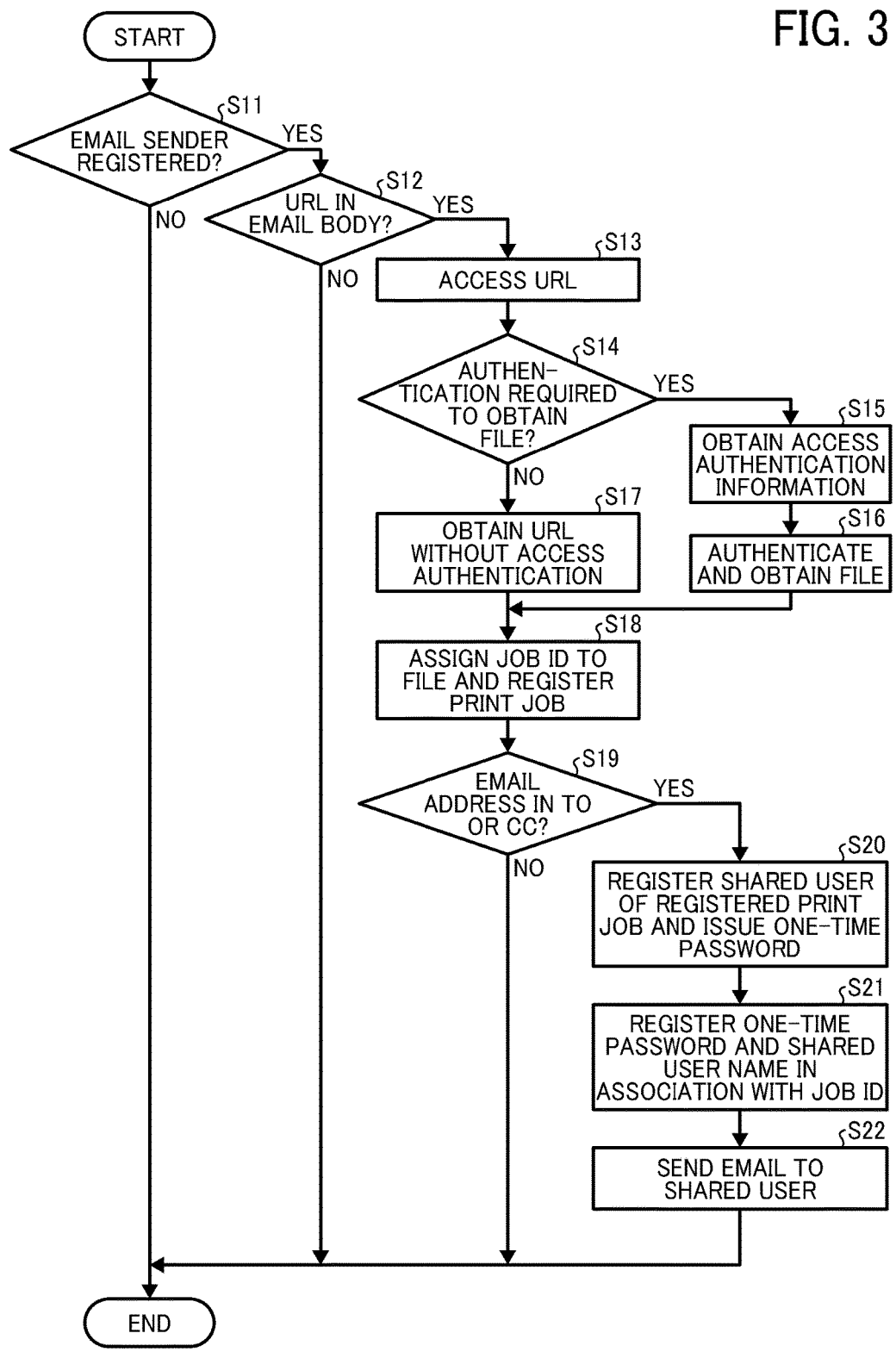
FIG. 3 is a flowchart illustrating operation of processing email that requests registration of a print job, performed by the print server of FIG. 2, according to an example embodiment of the present invention.

FIG. 3 illustrates example operation of processing email that requests registration of a print job, performed by the print server 200. The operation of FIG. 3 is performed by the print server 200, in response to email received from the user terminal 600 via the email server 100. More specifically, the CPU 220 of the print server 200 executes specific control program that relates to print job registration to cause various functions as described above referring to FIG. 2 to perform the operation of FIG. 3.

The CPU 220 of the print server 200 accesses the email server 100 periodically or any desired time to monitor email addressed to the print server 200. When there is new email in the email box 103, the print server 200 receives the email addressed to the print server 200, and starts the operation of FIG. 3. In case there is more than one email, the operation of FIG. 3 is performed for each one of email that is received. Alternatively, the operation of FIG. 3 may be performed only when email having a specific identifier, which indicates that the email is a job request is received. Such specific identifier may be obtained from a specific field of email data such as a body or a title of email data. For example, when the "TO" field is entered with a specific address "cloud_print@xxx.com" that is designated to the print services of the print server 200, the print server 200 executes the operation of FIG. 3.

Referring to FIG. 3, at S11, the CPU 220 of the print server 200 determines whether a sender of the received email is a registered user. More specifically, the CPU 220 refers to the address table of FIG. 17 to find an email address that matches the email address obtained from the "From" field of the email, and if founded, whether the user having that email address is stored in association with user registration information "Y" indicating the registered user. When the user is the registered user ("YES" at S11), the CPU 220 of the print server 200 obtains the user name associated with the email address as user identification information for identifying the email sender. For example, assuming that the email address obtained from the "From" field of the email is "usera@xxx.com", the address table of FIG. 17 indicates that the user having the email address "usera@xxx.com" is registered user. In such case, the CPU 220 determines that the email sender has the user name "User A", using the address table of FIG. 17. S11 is performed by the registration user determiner 202.

When the CPU 220 determines that the email sender is not the registered user ("NO" at S11), the CPU 220 determines that the email sender is not allowed to request a job, and the operation ends in error. For example, when there is no email address in the address table of FIG. 17 that matches the email address of the email sender, the CPU 220 determines that the email sender is not the registered user. In another example, when the email address that matches the email address of the email sender in the address table of FIG. 17 has the user registration information "N", the CPU 220 determines that the email sender is not the registered user.

At S12, the CPU 220 determines whether there is a URL in the body of the received email. The URL indicates an address from which a specific electronic file can be obtained. For example, the URL "www.webstorage1.com/test/data1" indicates a specific location at which an electronic file that the user wants to print is stored. S12 is performed by the analyzer 203.

When it is determined that there is no URL ("NO" at S12), the CPU 220 determines that there is no print job to be registered, and the operation ends. When it is determined that there is a URL ("YES" at S12), the operation proceeds to S13.

The CPU 220 accesses the URL at S13, and determines whether authentication is required to obtain an electronic file specified by the URL at S14. More specifically, in this example, the print server 200 sends a request for accessing the electronic file to the online storage 500, using the URL obtained from the email. When authentication is required to access the electronic file, the online storage 500, specifically, a host having the storage URL address "www.webstorage1.com" requests the print server 200 for access authentication information. In such case, the print server 200 receives a response from the online storage 500, which requests for access authentication information. S14 is performed by the URL authentication processor 204.

When it is determined that authentication is required to obtain the electronic file ("YES" at S14), at S15, the CPU 220 obtains access authentication information to be used for authentication by the online storage 500. More specifically, the CPU 220 refers to the access authentication information table of FIG. 18 using the user name specified at S11 and the URL detected at S12, to obtain access authentication information that is associated with the user name and the storage URL. For example, assuming that the user name of the email sender is "User A", and the specified URL is www.webstorage1.com/text/data1, the CPU 220 searches for a data entry defined by a combination of the user name "User A" and the storage URL "www.webstorage1.com", and obtains the login name "a" and the password "A" as access authentication information. S15 is performed by the authentication information obtainer 205.

At S16, the CPU 220 sends the access authentication information obtained at S15 to the online storage 500 to request for authentication. Assuming that authentication is successful, the CPU 220 obtains the electronic file specified by the URL obtained at S12 from the online storage 500.

At S14, when it is determined that authentication is not required ("NO" at S14), the operation proceeds to S17. For example, when the print server 200 receives a response indicating that authentication is successful in response to the request for accessing, the print server 200 determines that authentication is not required. At S17, the CPU 220 accesses the online storage 500 to obtain the electronic filed specified by the URL that is obtained at S12. S16 or S17 is performed by the data obtainer 206.

At S18, the CPU 220 assigns the obtained electronic file with a job ID, and spools the obtained electronic file in the job spooler 211. Further, the CPU 220 registers the job ID in association with the user name specified at S11, in the print job registration table of FIG. 15, as the print job information regarding the electronic file. S18 is performed by the job manager 209.

At S19, the CPU 220 determines whether at least one email address, other than the address of the print server 200, is set in the TO or CC field of the received email. S19 is performed by the analyzer 203.

When it is determined that there is no other email address ("NO" at S19), the CPU 220 determines that there is no need to set a shared user for the print job registered at S18, and the operation ends. In such case, the CPU 220 causes the job manager 209 to register a print job to print the electronic data specified by the URL only for the request user, without setting the shared user. For example, referring to the print job registration table of FIG. 15, in the example cases of the job having the job ID "001" and the job having the job ID "002", the print job is registered to the print job registration table without setting any shared user.

When it is determined that there is at least one other email address ("YES" at S19), the CPU 220 determines that there is a need to set a shared user for the registered job, and the operation proceeds to S20 to perform S20 to S22. If there is more than one other email address detected at S19, S20 to S22 are performed for each one of a plurality of users that respectively correspond to a plurality of email addresses obtained at S19. S20 to S22 are performed by the shared user information manager 210.

At S20, the CPU 220 refers to the address table of FIG. 17 to obtain a user name of the shared user, which is associated with the address obtained at S19. The CPU 220 inputs the print job registration table of FIG. 15 with the user name of the shared user for the print job registered at S18. The CPU 220 further issues a one-time password for the shared user.

In this example, the user name of the shared user is registered in the print job registration table of FIG. 15 as one example of information regarding the shared user. More specifically, the CPU 220 searches the address table of FIG. 17 to obtain a user name that is associated with the email address obtained at S19 to obtain the user name of the shared user. In this case, the value of user registration information "Y" or "N" does not matter. In case there is no user name stored in the address table of FIG. 17, which is associated with the email address obtained at S19, the CPU 220 newly generates a guest user name as a user name associated with the obtained email address, and registers the newly generated user name to the address table of FIG. 17. For the guest user name, the user registration information "N" is stored. After the user name is obtained for the shared user, the CPU 220 registers the obtained shared user name in the "SHARED USER NAME" field of the print job registration table of FIG. 15, that is associated with the print job information registered at S18. Further, for the unregistered user, the CPU 220 issues a one-time password.

At S21, the CPU 220 registers the one-time password issued at S20 and the shared user name, in association with the job ID of the print job registered at S18, in the shared user password table of FIG. 16.

Referring to the print job registration table of FIG. 15, the job having the job ID "003" and the job having the job ID "004" correspond to the example cases in which the print job set with more than one shared user is registered. More specifically, referring to FIG. 15, the shared user name is stored in association with the job ID and the user name of the email sender. Further, the CPU 220 stores information regarding the one-time password for the print job in the shared user password table of FIG. 16, in association with the job ID and the shared user name. The CPU 220 may further store information regarding the shared user such as an email address of the shared user in the address table of FIG. 17, in case there is no such information.

At S22, the CPU 220 sends email, which notifies of the one-time password issued at S20 and the shared user name, to the email address of the shared user, and the operation ends. For example, the print server 200 may send email addressed to the email address of the shared user, which includes information regarding the one-time password and the shared user name, to the email server 100.

Figure 4:
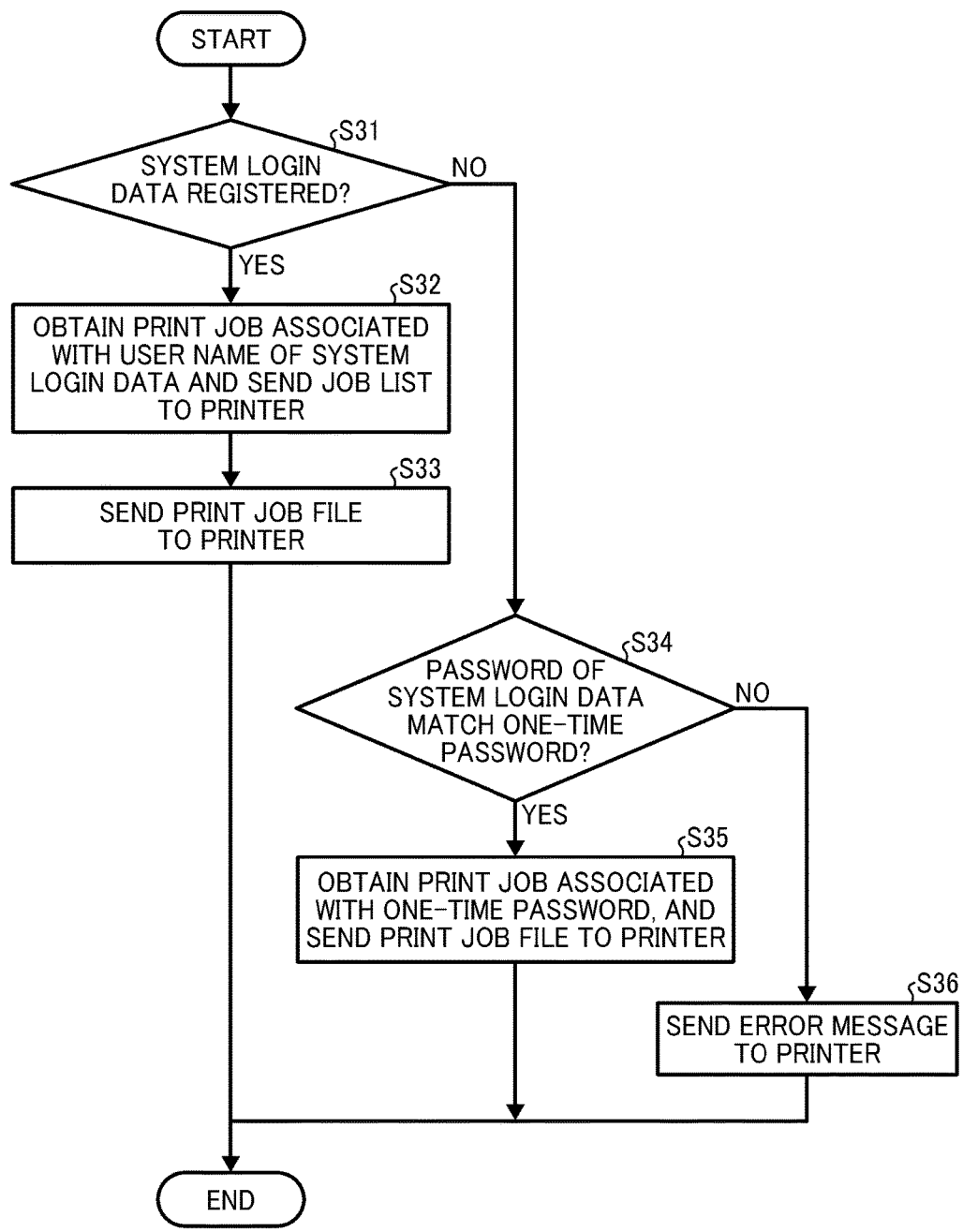
FIG. 4 is a flowchart illustrating operation of executing the print job registered through performing FIG. 3, performed by the print server of FIG. 2, according to an example embodiment of the present invention.

Referring now to FIG. 4, operation of instructing the printer 400 to print based on the print job that is registered through the operation of FIG. 3 according to a user instruction, performed by the print server 200, is explained according to an example embodiment of the present invention. The operation of FIG. 4 is performed by the print server 200, for example, when the print server 200 receives system login data used for user authentication from the printer 400. More specifically, the CPU 220 of the print server 200 executes specific control program related to print job execution to cause various functions described above referring to FIG. 2 to perform the operation of FIG. 4. In this example, the CPU 220 of the print server 200 executes the operation of FIG. 4, in response to system login data, such as a user name and a password, that is sent from the printer 400.

At S31, the CPU 220 determines whether the received system login data matches any one of data stored in the system login data table of FIG. 19. S31 is performed by the print user authenticator 207. Through performing S31, the print server 200 determines whether a user who operates the printer 400 is a user who is authorized to use the print services provided by the print server 200.

When it is determined that the received system login data matches the system login data stored in the system login data table of FIG. 19 ("YES" at S31), at S32, the CPU 220 specifies all of the print job IDs that are associated with the user name of the system login data, in the print job registration table of FIG. 15, to generate a job list that lists the specified print job IDs. The CPU 220 further sends the job list to the printer 400. As described below referring to FIG. 15, all of the jobs that are associated with the specific user name are extracted, irrespective of whether the specific user name is stored in the "USER NAME" field or the "SHARED USER NAME" field.

For example, assuming that the received system login data includes the user name "User A", the CPU 220 refers to the print job registration table of FIG. 15 to extract the job ID "001" and the job ID "004", which are associated with the "User A", to generate a job list that lists the job ID "001" and the job ID "004". The CPU 220 further sends the job list to the printer 400 through the communication I/F 250.

In another example, assuming that the received system login data includes the user name "User C", the CPU 220 refers to the print job registration table of FIG. 15 to extract the job ID "003" and the job ID "004", which are associated with the "User C", to generate a job list that lists the job ID "003" and the job ID "004". The CPU 220 further sends the job list to the printer 400.

In addition to the job ID, the job list may further include any desired information regarding the job, such as a file name of an electronic file to be printed, information regarding a registrar of the job such as the user name of the email sender who requests printing (request user), the time at which the request is sent (the time at which the email is transmitted), etc. With this information, the print job can be identified more easily.

The printer 400, which receives the job list, causes the operation panel of the printer 400 to display information regarding the job list. The printer 400 further receives a user instruction for instructing printing of one or more print jobs listed in the job list. According to the user instruction, the printer 400 sends a request for printing a specific print job, for example, with the specified job ID, to the print server 200.

At S33, the CPU 220 of the print server 200 receives the request for printing, which includes information regarding the specified job ID, sends an electronic file that corresponds to the print job having the specified job ID to the printer 400, and the operation ends. For example, the CPU 220 may read out the electronic file to be transmitted, from the job spooler 211, using the specified job ID. S32 and S33 are performed by the data transmit 208.

Referring back to S31, when it is determined that the received system login data does not match any one of data stored in the system login data table of FIG. 19 ("NO" at S31), at S34, the CPU 220 determines whether a password included in the received system login data matches any one of one-time passwords that are stored in the shared user password table of FIG. 16. In this example, since the one-time password is uniquely assigned to one user, the user name does not have to be used for determination. Alternatively, the user name may be used together with the one-time password for determination. S34 is performed by the print user authenticator 207. Through performing S34, the print server 200 determines whether a user who operates the printer 400 is a user who is authorized to use the print services provided by the print server 200 for a specific print job.

In this example, even when the user has been registered to the system login data table of FIG. 19, the user may access the print server 200 using a one-time password in alternative to the user name and the password, if the one-time password is issued for the user.

When it is determined that the one-time password of the received system login data matches the one-time password in the shared user password table of FIG. 16 ("YES" at S34), at S35, the CPU 220 specifies a print job ID that is associated with the one-time password, in the shared user password table of FIG. 16. The CPU 220 further sends an electronic file to be printed, which is indicated by the specified job ID, to the printer 400, and the operation ends.

For example, assuming that the received system login data includes the one-time password "ABCDEFG", the CPU 220 refers to the shared user password table of FIG. 16 to extract a job ID "003" that is associated with the one-time password "ABCDEFG". The CPU 220 further reads out an electronic file from the job spooler 211, which is associated with the extracted job ID "003", and transmits the electronic file to the printer 400. S35 is performed by the data transmit 208.

When it is determined that the one-time password of the received system login data does not match any one of one-time passwords in the shared user password table ("NO" at S34), the print server 200 determines that the user at the printer 400 is not authorized to use the print services provided by the print server 200, and the operation proceeds to S36. At S36, the CPU 220 of the print server 200 sends an error message to the printer 400, and the operation ends. Based on the error message, the printer 400 may cause the operation panel to display an error message to the user.

As described above, the printer 400 prints an image based on the electronic file transmitted from the print server 200, at S33 or S35. In this manner, the user is able to have a printed image of the electronic file that is previously registered as a print job to be executed.

Figure 5:
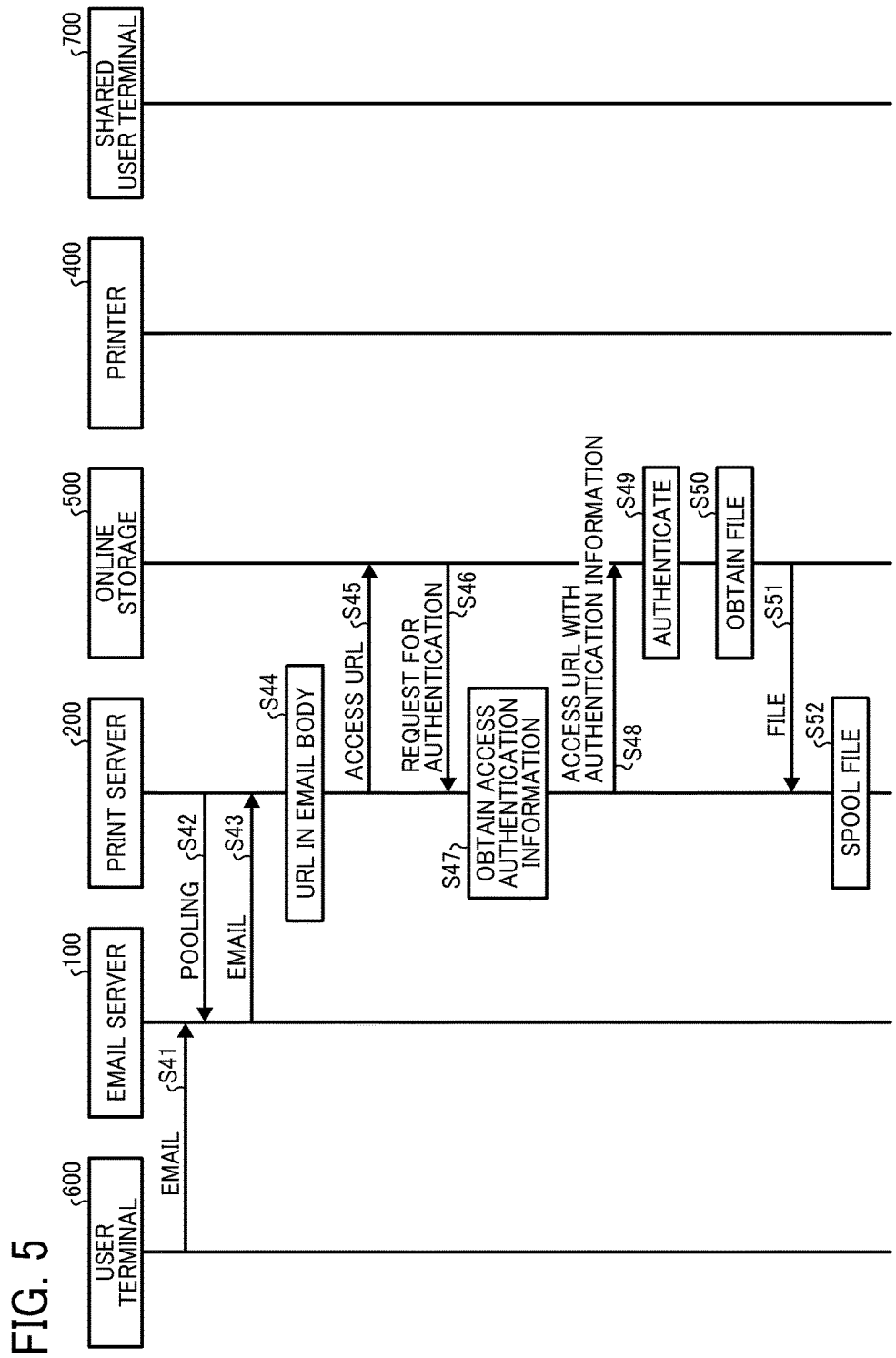
FIGS. 5 and 6 are a data sequence diagram illustrating operation of processing email that requests registration of a print job and executing the print job, performed by the print system of FIG. 2, according to an example embodiment of the present invention.
Figure 6:
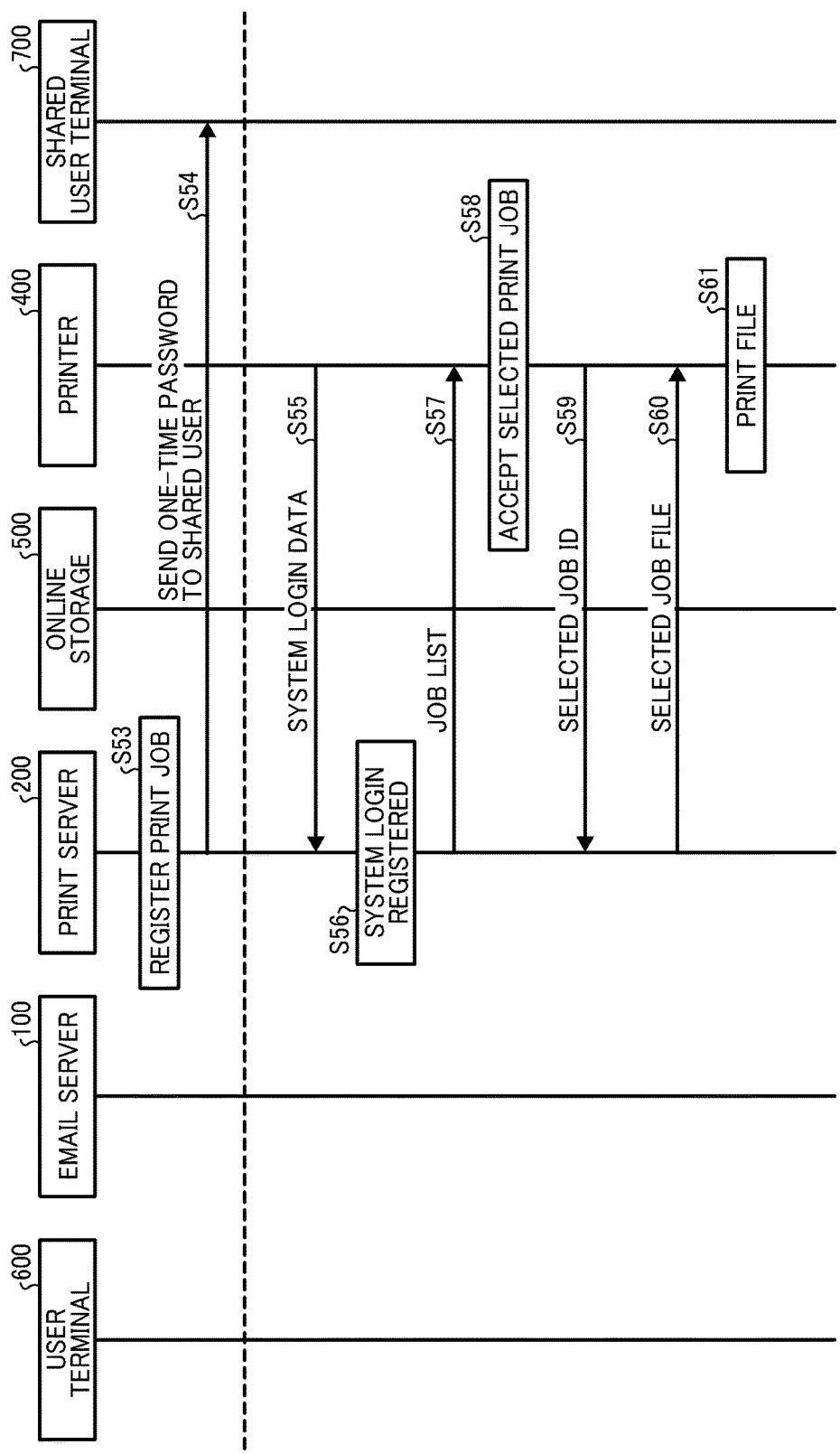

Referring now to FIGS. 5 and 6, operation of processing email that requests registration of a print job and is received from a request user, and operation of executing the print job, performed by the print system of FIG. 2, is explained according to an example embodiment of the present invention. In this example, it is assumed that the request user, who sends email addressed to the print server 200 from the user terminal 600, is a registered user having the value "Y" of user registration information in the address table of FIG. 17. Further, the email includes an URL in the body of email, and an email address other than the email address of the print server 200 in the "CC" field. The online storage 500 requires authentication to access an electronic file specified by the URL.

At S41 to S43, the user at the user terminal 600 instructs the user terminal 600 to send email addressed to the print server 200, which requests registration of a print job for printing an electronic file. The user terminal 600 sends the email to the email server 100. The print server 200 obtains the email addressed to the print server 200 from the email server 100, by polling.

Further, in this example, since the email has the email address of the shared user in the "CC" field, the email that request for registration of a print job is also sent to the email address of the shared user. The shared user terminal 700 receives the email addressed to the email address of the shared user, via the email server 100. With this email, the shared user is able to recognize that, a print job is requested, which sets the shared user as a shared user of the print job.

At S44, the print server 200, which receives the email, performs S11 and S12 of FIG. 3 to determine that the email sender, or the request user, is the registered user, and that the URL is included in the email body. At S45, the print server 200 accesses the online storage 500 using the storage URL, which is obtained from the email body, in a substantially similar manner as described above referring to S13 of FIG. 3.

At S46, the online storage 500, which is accessed, determines that authentication is required for obtaining the electronic file specified by the URL, and sends a response indicating that authentication is required to the print server 200.

In response to the response received from the online storage 500, at S47, the print server 200 determines that authentication is required to obtain the electronic file (S14 of FIG. 3), and obtains access authentication information from the access authentication information table of FIG. 18 (S15 of FIG. 3).

At S48, the print server 200 accesses the URL using the access authentication information to request for authentication. At S49, the online storage 500, accessed at S48, compares the received access authentication information with access authentication information previously registered, to authenticate the user.

Based on the authentication result indicating that authentication is successful, at S50, the online storage 500 reads out an electronic file located at the URL, which is accessed by the print server 200. At S51, the online storage 500 sends the electronic file, which is read, to the print server 200. S48 to S51 correspond to S16 of FIG. 3.

At S52, the print server 200, which receives the electronic file, spools the electronic file in the job spooler 211 after assigning the job ID, as a print job to print the electronic data. At S53, the print server 200 registers information regarding the print job in the print job registration table of FIG. 15. S52 and S53 correspond to S18 of FIG. 3.

At S54, as described above referring to S19 to S22 of FIG. 3, the print server 200 sends email notifying of a one-time password, addressed to the email address of the shared user that is set in the "CC" field of the email. With the one-time password, the shard user, who may not be registered, is able to have the electronic file printed as requested by the request user.

At any desired time after the print job is registered, at S55 (FIG. 6), the request user who sends email at S41 enters system login data to the printer 400. In this example, the system login data may be the user name and the password for the request user, or may be the one-time password for the request user, if the one-time password is assigned and notified to the request user. The printer 400 transmits the system login data to the print server 200.

In one example, assuming that the correct user name and password are entered by the request user, at S56, the print server 200 determines that the system login data matches registered system login data through performing S31 of FIG. 4. At S57, the print server 200 sends a job list, which lists the jobs registered for the request user to the printer 400, by performing S32 of FIG. 4.

At S58, the printer 400, which receives the job list, causes the operation panel to display information regarding the job list. Further, at S58, the printer 400 receives a user instruction, which instructs to print a specific print job selected from the job list, from the user. At S59, in response to the user instruction for selecting the specific print job to be executed, the printer 400 sends a job ID of the selected print job to the print server 200. At S60, the print server 200 obtains an electronic file to be printed using the received job ID, and sends the obtained electronic file to the printer 400. S58 to S60 correspond to S33 of FIG. 4.

At S61, the printer 400 prints an image based on the electronic file, received from the print server 200 to complete the print job instructed by the user.

The operation of FIGS. 5 and 6 may be performed in various other ways.

In the above-described example referring to FIGS. 5 and 6, it is assumed that authentication is required to obtain an electronic file requested by the user. Alternatively, when authentication is not required, when the print server 200 accesses the URL of the online storage 500 at S45 (FIG. 5), the operation proceeds to S50 to read out the electronic file specified by the URL, without requesting for authentication information. The operation further proceeds to S51 to send the obtained electronic file to the print server 200. More specifically, in such case, S46 to S49 are not performed.

Further, in the above-described example, it is assumed that the request user enters system login data at S55. Alternatively, at S55, the shared user who receives notification regarding the one-time password at S54 may enter system login data to the printer 400. In such case, the system login data may be the one-time password assigned to the shared user. Assuming that, at S56, the system login data received at S55 matches the one-time password that is registered in the share user password table of FIG. 16, the operation proceeds to S60, without performing S57 to S59. At S60, the print server 200 obtains the electronic file of the print job, which is associated with the one-time password, and sends the electronic file to the printer 400. At S61, the printer 400 prints an image based on the electronic file.

In another example, at S60, when the electronic file to be transmitted to the printer 400 has a data format that is not printable by the printer 400, the print server 200 determines that rendering is to be performed. Before sending the electronic file, the print server 200 may request the rendering server 300 to apply rendering process to the electronic file to convert a data format of the electronic file. The print server 200 sends the electronic file having a data format printable by the printer 400 to the printer 400.

In alternative to applying rendering process at S60, the print server 200 may request the rendering server 300 to apply rendering process to any electronic file having a data format not compatible with the printer 400 at any desired time. For example, the print server 200 may request for rendering process, when the print job is registered to the job spooler 211. Further, the print server 200 may determine whether the electronic file has a data format compatible with the printer 400, by checking a file extension or by analyzing information regarding the electronic data such as attribute information of the electronic data.

As described above referring to FIGS. 1 to 6, the print server 200 obtains an electronic file specified by the URL, which is extracted from the body of email received from the request user. The print server 200 further registers information regarding the obtained electronic file as a print job, to the job spooler 211.

With this features, a user of the print system of FIG. 2 just needs to send email with information regarding an URL specifying an electronic file to be printed, to the print server 200, when the user decides to register a print job to print the electronic file stored at any desired storage that can be accessed through a network. For example, even when the electronic file is not stored at the user terminal 600 such that the user is not able to attach the electronic file to be printed to the email, the user does not have to download the electronic file from the online storage. This reduces workload for the user who wants to register the print job by email.

Further, before sending the electronic file to be printed to the printer 400, the print server 200 authenticates a user who operates the printer 400 based on system login data received from the printer 400, and sends information regarding only the electronic files that are registered for the authenticated user. This prevents any third user, who is not authenticated, from printing the electronic file registered for the authenticated user. Further, this authentication process is automatically performed by the print server 200 using information regarding the request user who sends the email or destination information obtainable from the email. This further reduces workload for the user.

Further, when the request user decides to allow the other user to access the print job that is registered by email, the request user just needs to input an email address of the other user in the "TO" or "CC" field of the email. In this manner, any user can be set as a shared user who is allowed to access the print job registered by the request user. Further, even when the shared user is not previously registered to such as the print services of the print server 200, the print server 200 issues a one-time password to the shared user to allow the shared user to perform the print job.

With this features, the request user can easily share the print job with the other user. For example, the other user, who does not know login data of the request user and cannot access the online storage 500, is able to print the electronic file stored at the online storage 500 as long as access to such electronic file is allowed by the request user.

Further, the print server 200 can easily obtain the email address of the shared user, from the email transmitted from the request user. Using this email address, the print server 200 can easily send information regarding the one-time password to the shared user, even when the shared user is not previously registered.

In the above-described example referring to FIG. 3, the print server 200 obtains access authentication information at S15. If the access authentication information is not previously stored in the access authentication information table, or if authentication fails such as due to an error in registration process, authentication at S16 may not be successful. In such case, the electronic file is not obtained. When the electronic file is not obtained based on authentication failure, the CPU 220 of the print server 200 may notify the request user of a type of authentication failure by email. For example, the email may indicate that authentication fails due to an error in obtaining access authentication information. In another example, the email may indicate that authentication fails due to an error in authentication process.

In the above-described example referring to FIG. 3, at S13 and S14, the print server 200 accesses the URL extracted from the email body to determine whether authentication is required to obtain the electronic file specified by the URL. Alternatively, based on determination that the email body has the URL at S12, the operation may proceed to S15 to obtain access authentication information, without performing S13 and S14.

When access authentication information is obtained, the print server 200 may obtain the electronic file specified by the URL, using the obtained access authentication information. When access authentication information is not obtained, the print server 200 may obtain the electronic file specified by the URL without access authentication information. This is based on assumption that, in case authentication is required to obtain the electronic file specified by the URL, the access authentication information table is registered with the access authentication information. As long as the access authentication information table stores correct information, the access authentication information that is required for authentication can be obtained. This can eliminate the need for previously accessing the online storage 500 to check whether authentication is required. Accordingly, the processing workload by the print server 200 and the online storage 500 is reduced.

In alternative to S13 and S14 of FIG. 3, the print server 200 may determine whether authentication is required by searching the access authentication information table for at least a part of URL that matches the URL extracted from the body of the email. For example, if the URL "www.webstorage1.com" is stored in the access authentication information table, the print server 200 determines that access authentication information is required to access an electronic file that is managed by a host indicated by that URL. That is, in order to access an electronic file specified by the URL "www.webstorage1.com/test/data1", which is managed by the host having the URL "www.webstorage1.com", authentication is required. When the print server 200 determines that authentication is required, the operation proceeds to S15 to obtain access authentication information.

In the above-described example of FIG. 3, at S20, the print server 200 issues a one-time password to the shared user that is set in the "TO" or "CC" field, irrespective of whether the shared user is previously registered. When the shared user is a registered user who has the system login data that is registered to the print services provided by the print server 200, the print server 200 does not have to issue a one-time password. For example, referring to FIG. 15, in case the print job having the job ID "004" is registered, the shared user with the user name "User C" does not need to have a one-time password as the user "User C" is a registered user. As long as the user "User C" enters the system login data that is previously registered, the user "User C" is allowed to access information regarding the print jobs that are registered for the user "User C" including the job "004".

In the above-described example of FIG. 3, after registering the print job at S18, the print server 200 may notify the request user of a result of the registered print job by email. With this notification, the user at the user terminal 600 is able to know that the print job is successfully registered, before operating the printer 400 to execute the print job.

Alternatively, the request user who registers the print job may be assigned with a one-time password. In such case, the request user, who receives email notification regarding the one-time password, is able to know that the print job is successfully registered. In such case, the print server 200 does not have to send notification indicating that the print job is successfully registered, separately from notification regarding the one-time password. Further, the print server 200 is able to perform processing in a substantially similar manner, irrespective of whether the user is a request user or a shared user.

In the above-described example, it is assumed that a one-time password is unique to each shared user. Alternatively, the one-time password, which is common to the shared users who are allowed to access a specific print job, may be generated for the specific print job. In case the one-time password is to be assigned to the request user, the one-time password that is common to the users including the request user and the shared user may be generated, for a specific print job.

In the above-described example referring to S32 of FIG. 4, the print server 200 sends the job list to the printer 400.

Alternatively, the print server 200 may send all of electronic files that are related to the print jobs specified by the job IDs of the job list, to the printer 400. In such case, the printer 400 prints images based on the electronic files that are received. In this manner, the user is able to automatically have all print outs at once, when the user accesses the printer 400.

Alternatively, after S35 of FIG. 4, the print server 200 may notify the request user of information indicating that the electronic file is transmitted to the printer 400 by email. For example, in case the electronic file is transmitted to the printer 400 operated by the shared user according to a user instruction received from the shared user, the print server 200 may identify the shared user using the one-time password entered by the shared user, and send information indicating the user name of the shared user to the request user by email.

Alternatively, or additionally, the print server 200 may check whether the electronic file is transmitted to the printer 400 for each one of the shared users, and send the checked result to the request user. This monitoring process may be performed periodically or according to a request received from the request user. With this information, the request user is able to know whether the shared user prints the electronic file, or a specific shared user who has printed or who has not printed.

Further, in alternative to entering the system login data to the printer 400, the user, either the request user or the shared user, may enter the system login data through any other device functioning as the user terminal to instruct the printer 400 to execute the print job.

Further, in alternative to requesting the user to enter the user ID and the password as the system login data, the printer 400 may obtain the system login data of the user from a recording medium provided by the user, such as an IC card that may be provided by the user. The IC card may store the system login data of the user.

<Example Operation of Print System>

Referring now to FIGS. 7 to 10, operation of registering a print job by email and executing the print job, performed by the print system of FIG. 2, is explained according to an example embodiment of the present invention. In this example, it is assumed that the print server 200 has a hardware structure illustrated in FIG. 1. Further, the print server 200 uses information obtainable from the tables of FIGS. 16 to 19.

In the above-described examples referring to FIGS. 3 to 6, as described above referring to FIG. 3, the print server 200 obtains the electronic file and registers as the print job, as soon as the print server 200 receives email data that requests for registering the print job. The user, however, may not necessarily print the electronic file right after the print job is registered. The printer 200 may need to keep the electronic file to be printed for a long time period, thus causing the problems in storage capacity or security. In view of this, in this example, the print server 200 obtains the electronic file from the online storage 500 in response to a request for printing the electronic file that is received from a user, such as through the printer 400.

Figure 7:
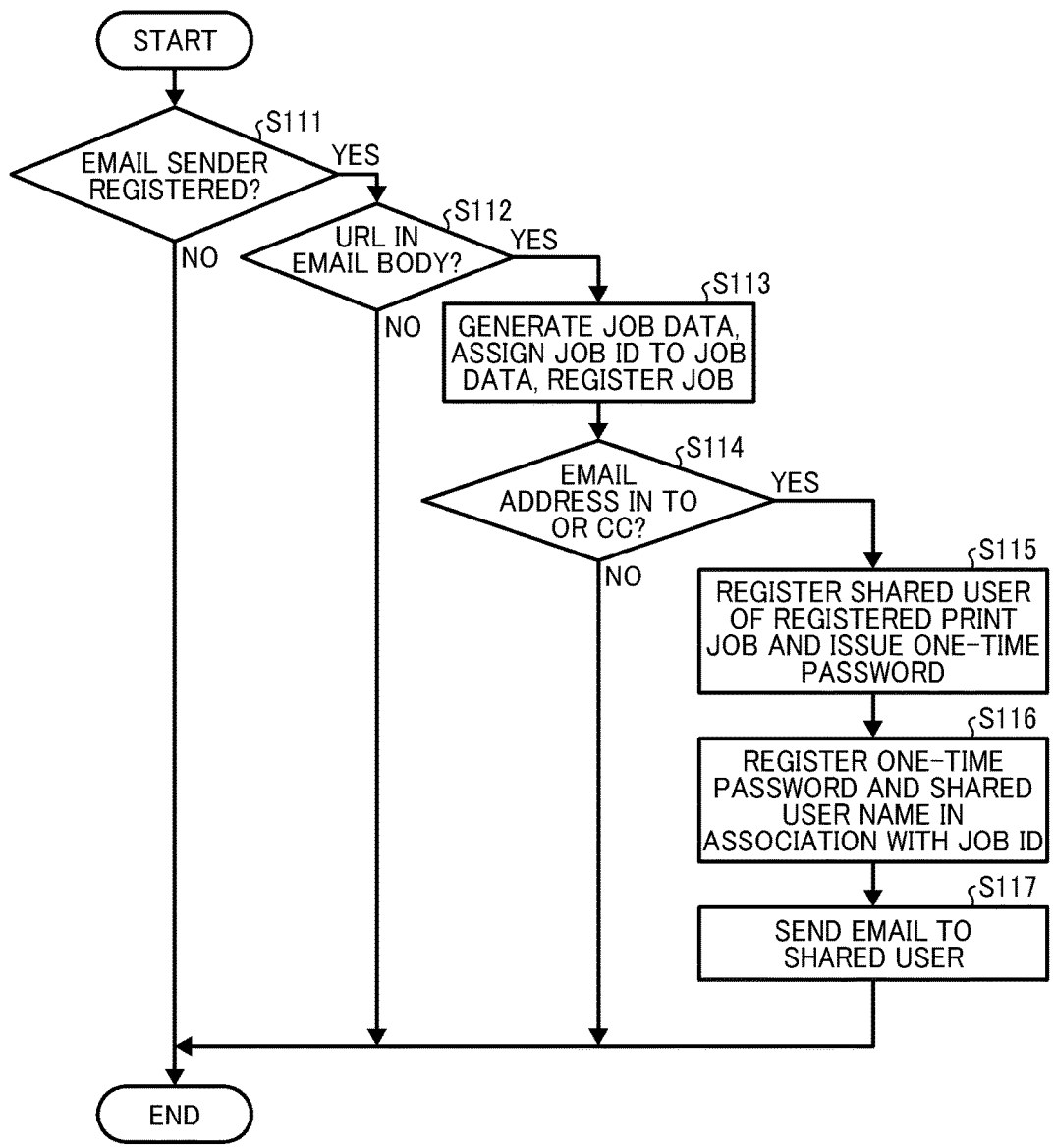
FIG. 7 is a flowchart illustrating operation of processing email that requests registration of a print job, performed by the print server of FIG. 2, according to an example embodiment of the present invention.

FIG. 7 is a flowchart illustrating example operation of processing email that requests registration of a print job, performed by the print server 200, when the email is received from the request user. The operation of FIG. 7 is substantially similar to the operation of FIG. 3, except for the differences. In alternative to obtaining the electronic file as illustrated in FIG. 3, the operation of FIG. 7 stores information regarding the URL specifying the electronic file to be printed, which is to be used when an instruction for executing the print job is received.

S111 and S112 of FIG. 7 are performed in a substantially similar manner as described above referring to S11 and S12 of FIG. 3. When it is determined that the request user is registered ("YES" at S111) and the URL is in the email body ("YES" at S112), the operation proceeds to S113.

At S113, the print server 200 associates the user name specified at S111 and the URL detected at S112 to generate job information, assigns the job information with a job ID, and registers the job information in a print job registration information table of FIG. 20.

The print job registration information table of FIG. 20 differs from the print job registration information table of FIG. 15, such that the table of FIG. 20 additionally stores information regarding the URL specifying the electronic file to be printed in association with the job ID, the user name of the request user, and the user name of the shared user.

S114 to S117 of FIG. 7 are performed in a substantially similar manner as described above referring to S19 to S22 of FIG. 3.

At S114, the CPU 220 of the print server 200 determines whether at least one email address, other than the address of the print server 200, is set in the TO or CC field of the received email. When it is determined that no other email address is set ("NO" at S114), the operation ends. When it is determined that there is at least one other email address ("YES" at S114), the operation proceeds to S115.

At S115, the CPU 220 refers to the address table of FIG. 17 to obtain a user name of the shared user, which is associated with the email address obtained at S114. The CPU 220 further registers the print job registration table of FIG. 20 with the user name of the shared user for the print job registered at S113. The CPU 220 further issues a one-time password for the shared user.

At S116, the CPU 220 registers the one-time password issued at S115 and the shared user name, in association with the job ID of the print job registered at S113, in the shared user password table of FIG. 16.

At S117, the CPU 220 sends email, which notifies of the one-time password issued at S115 and the shared user name, to the email address of the shared user name, and the operation ends.

In alternative to storing the electronic file to be printed in the job spooler 211, the operation of FIG. 7 stores information indicating the URL specifying the electronic file in the print job registration table.

Figure 8:
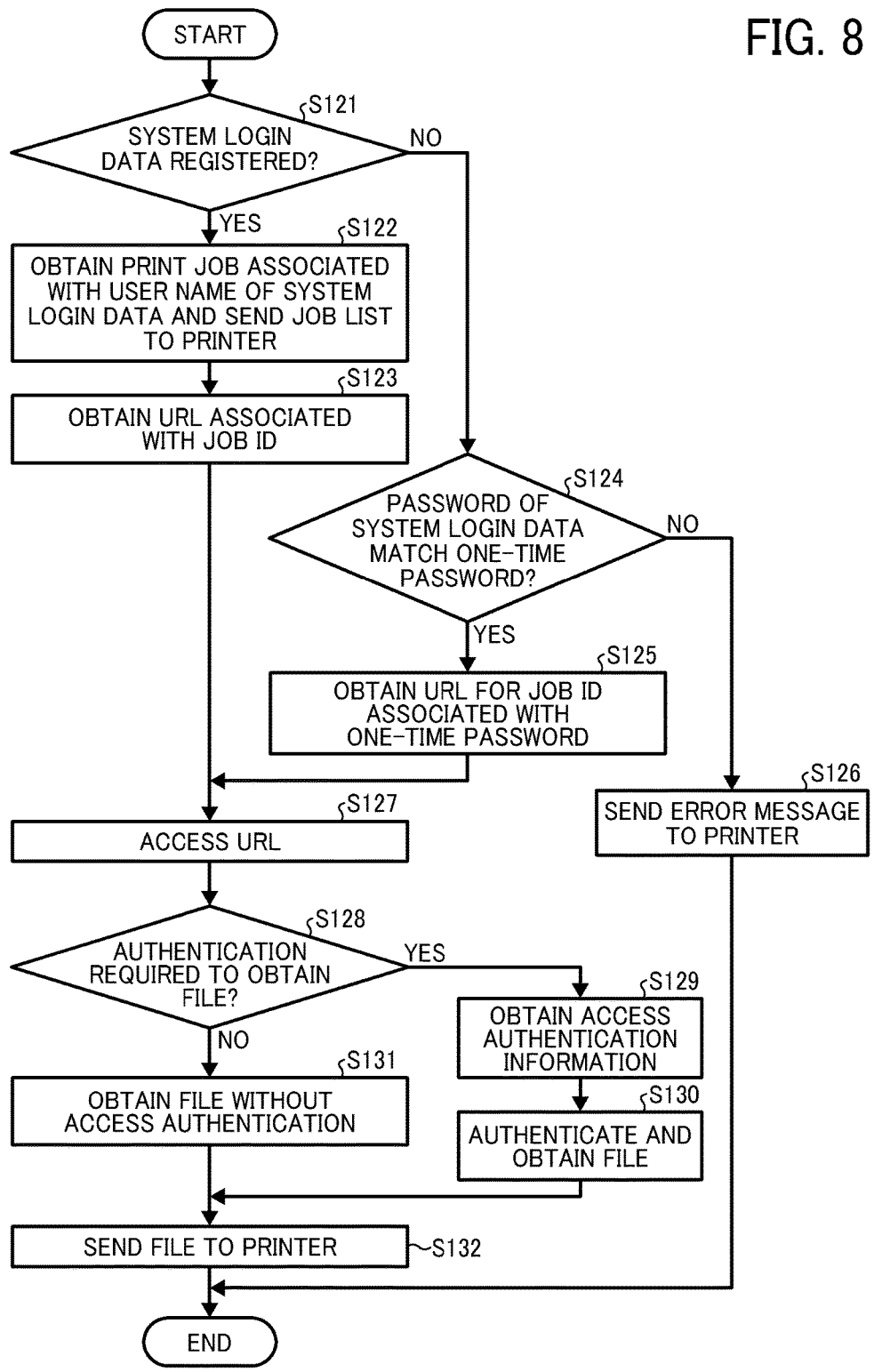
FIG. 8 is a flowchart illustrating operation of executing the print job registered through performing FIG. 7, performed by the print server of FIG. 2, according to an example embodiment of the present invention.

Referring now to FIG. 8, operation of instructing the printer 400 to print based on the print job that is registered through the operation of FIG. 7 according to a user instruction, performed by the print server 200, is explained according to an example embodiment of the present invention. The operation of FIG. 8 is performed by the print server 200, for example, when the print server 200 receives system login data used for user authentication from the printer 400. The operation of FIG. 8 is performed in a substantially similar manner as described above referring to the operation of FIG. 4, except for the differences. The differences include the addition of obtaining the electronic file to be printed from the online storage 500, in response to a request for printing the electronic file.

At S121, the CPU 220 determines whether the received system login data matches any one of data stored in the system login data table of FIG. 19, in a substantially similar manner as described above referring to S31 of FIG. 4. When it is determined that the received system login data matches the system login data stored in the system login data table of FIG. 19 ("YES" at S121), at S122, the CPU 220 sends a job list indicating all of the print jobs that are associated with the user name of the system login data, in a substantially similar manner as described above referring to S32 of FIG. 4.

At S123, the CPU 220 of the print server 200 receives the request for printing, which includes information regarding the specified job ID selected by the user from the job list, from the printer 400. The CPU 220 further obtains information regarding the URL that is associated with the job ID received from the printer 400, from the print job registration table of FIG. 20. The obtained URL indicates a location from which the electronic file to be printed can be obtained.

For example, referring to FIG. 20, assuming that the user with the user name "User A" selects the job ID "004" for execution, the CPU 220 obtains the URL "www.webstorage1.com/test/data1".

S127 to S131 are performed in a substantially similar manner as described above referring to S13 to S17 of FIG. 3. More specifically, when authentication is required, the CPU 220 uses access authentication information stored in the access authentication information of FIG. 18 to obtain electronic file specified by the obtained URL. At S132, the CPU 220 transmits the electronic file to the printer 400, and the operation ends.

When it is determined that the system login data does not match any system login data that is registered ("NO" at S121), the operation proceeds to S124. At S124, the CPU 220 further determines whether a one-time password of the system login data matches in a substantially similar manner as described above referring to S34 of FIG. 4. When they match ("YES" at S124), at S125, the CPU 220 specifies the job ID that is associated with the one-time password in the shared user password table of FIG. 16, and further obtains the URL that is associated with the specified job ID from the print job registration table of FIG. 20.

For example, referring to FIG. 16, assuming that the one-time password "abcdefg" is received as a password of the system login data, the CPU 220 refers to the shared user password table of FIG. 16 to specify the job ID "004". The CPU 220 further refers to the print job registration table of FIG. 20 to obtain the URL "www.webstorage1.com/test/data1" that is associated with the job ID "004".

After the URL is obtained, S127 to S132 are performed to obtain the electronic file that is specified by the obtained URL, and to send the electronic file to the printer 400.

When the password included in the system login data does not match any password that is registered ("NO" at S124), the operation proceeds to S126 to send an error message to the printer 400 in a substantially similar manner as described above referring to S36 of FIG. 4.

Figure 9:
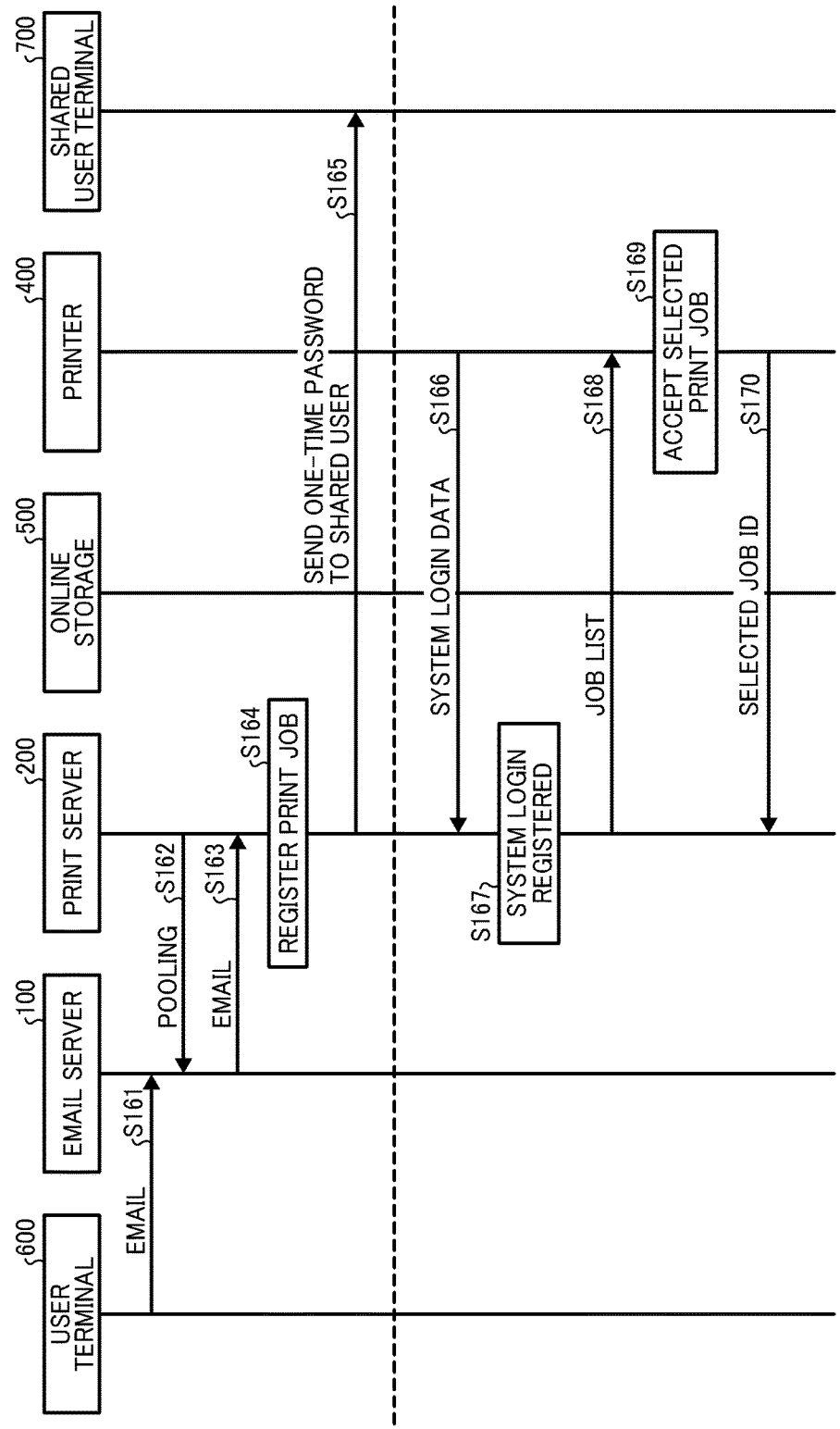
FIGS. 9 and 10 are a data sequence diagram illustrating operation of processing email that requests registration of a print job and executing the print job, performed by the print system of FIG. 2, according to an example embodiment of the present invention.
Figure 10:
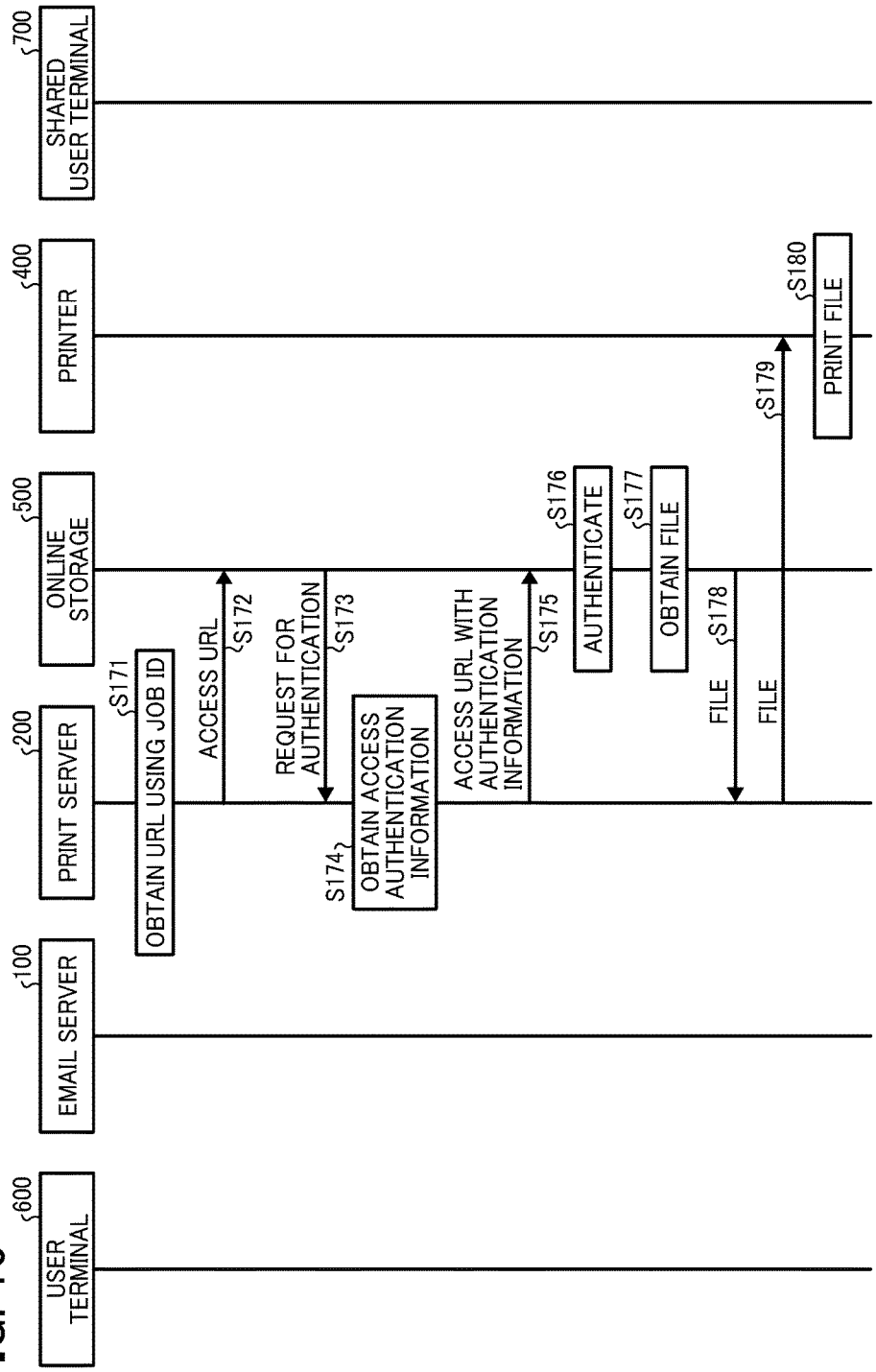

Referring now to FIGS. 9 and 10, operation of processing email that requests registration of a print job and is received from a request user, and operation of executing the print job, performed by the print system of FIG. 2, is explained according to an example embodiment of the present invention. In this example, it is assumed that the request user, who sends email addressed to the print server 200 from the user terminal 600, is a registered user having the value "Y" of user registration information in the address table of FIG. 17. Further, the email includes a URL in the body of email, and an email address other than the email address of the print server 200 in the "CC" field. The online storage 500 requires authentication to access an electronic file specified by the URL.

S161 to S163 are performed in a substantially similar manner as described above referring to S41 to S43 of FIG. 5. More specifically, the user at the user terminal 600 instructs the user terminal 600 to send email addressed to the print server 200, which requests registration of a print job for printing an electronic file. The print server 200 obtains the email addressed to the print server 200 from the email server 100, by polling.

At S164, the print server 200 performs S111 and S112 of FIG. 7 to determine that the email sender, or the request user, is the registered user, and that the URL is included in the email body. At S164, the print server 200 registers print job information that associates information regarding the URL and information regarding the request user, as described above referring to S113 of FIG. 7.

At S165, the print server 200 performs S114 to S117 of FIG. 7. More specifically, the print server 200 sends email notifying of a one-time password, addressed to the email address of the shared user that is set in the CC field of the email. With the one-time password, the shard user, who may not be registered, is able to have the electronic file printed as requested by the request user.

At any desired time after the print job is registered, at S166, the request user who sends email at S161 or the shared user notified with the one-time password at S165 enters system login data to the printer 400. The printer 400 sends the system login data to the print server 200.

S167 to S170 are performed in a substantially similar manner as described above referring to S56 to S59 of FIG. 6. At S170, the printer 400 sends the job ID of the print job, which is requested by the user, to the print server 200.

S171 to S178 are performed in a substantially similar manner as described above referring to S45 to S51 of FIG. 5, except for S171. At S171, the print server 200 obtains information regarding the URL to be accessed, from the print job registration table of FIG. 20 using the job ID received at S170. Through performing S171 to S178, the print server 200 obtains an electronic file to be printed, which is specified by the job ID received from the printer 400.

At S179, the print server 20 sends the electronic file obtained from the online storage 500 at S178, to the printer 400. At S180, the printer 400 prints an image based on the received electronic file.

As described above referring to FIGS. 7 to 10, the print server 200, which receives email that requests registration of a print job, stores information regarding the URL specifying the electronic file to be printed, as a part of print job information. The print server 200 does not obtain the electronic file itself at this time. At any desired time that the print server 200 determines to send the electronic file to be printed to the printer 400, the print server 200 obtains the electronic file to be printed, using the URL information.

This prevents the job spooler 211 from storing the electronic file even when the electronic file is not being used, a memory space in the print server 200 can be efficiently used. This further prevents any unauthorized user to access the electronic file stored in the print server 200, while the electronic file to be printed is kept at the print server 200.

<Example Operation of Print System, with Storing Electronic Data>

Referring now to FIGS. 11 to 14, operation of registering a print job by email and executing the print job, performed by the print system of FIG. 2, is explained according to an example embodiment of the present invention. In this example, it is assumed that the print server 200 has a hardware structure illustrated in FIG. 1. Further, the print server 200 uses information obtainable from the tables of FIGS. 16 to 19.

In this example, assuming that there is a shared user, the print server 200 stores the electronic file to be printed, in a storage area of the online storage that can be accessed by the shared user.

Figure 11:
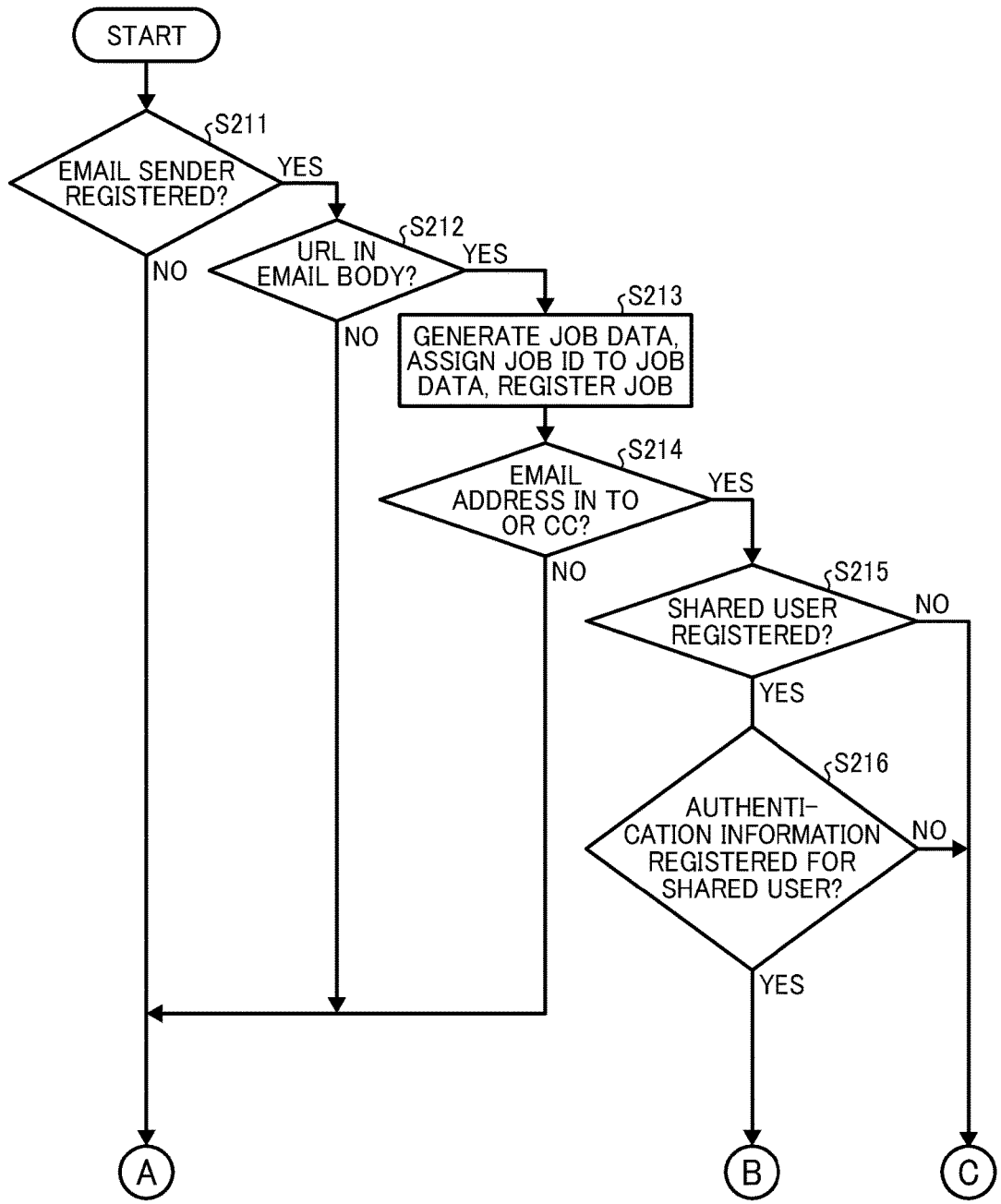
FIGS. 11 and 12 are a flowchart illustrating operation of processing an email that requests registration of a print job, performed by the print server of FIG. 2, according to an example embodiment of the present invention.
Figure 12:
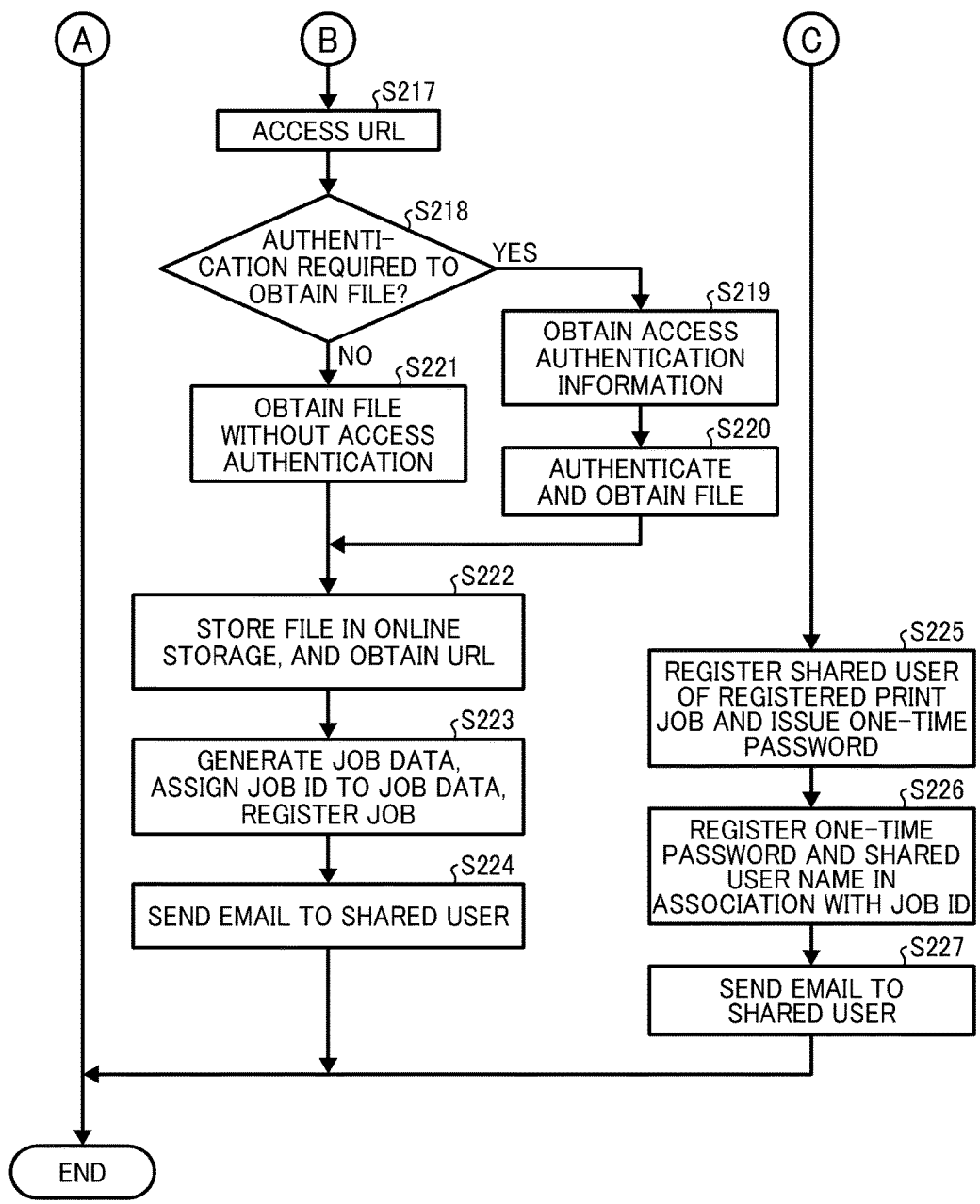

FIGS. 11 and 12 are a flowchart illustrating operation of processing email that requests registration of a print job, performed by the print server 200, when the email is received from the request user.

S211 to S214 are performed in a substantially similar manner as described above referring to S111 to S114 of FIG. 7. When it is determined that the other email address is set in the "TO" or "CC" field of the email ("YES" at S214), the operation proceeds to S215. In this example illustrated in FIGS. 11, S215 and S216, which correspond to operation of setting a shared user for a newly registered print job, are performed differently than the operation of FIG. 7.

At S215, the CPU 220 determines whether the shared user that corresponds to the email address found at S214 has the user registration information "Y", for example, by referring to the address table of FIG. 17. When it is determined that the shared user is registered ("YES" at S215), the operation proceeds to S216. At S216, the CPU 220 determines whether the access authentication information table of FIG. 18 stores access authentication information that is associated with the shared user.

When it is determined that the access authentication information for the shared user is stored ("YES" at S216), the CPU 220 determines that the shared user uses services provided by the online storage 500 such that the print server 200 can access an account of the shared user using the access authentication information for the shared user. The operation proceeds to S217 (FIG. 12) to perform S217 to S221 in a substantially similar manner as described above referring to S13 to S17 of FIG. 3.

Through performing S217 to S221, the CPU 220 of the print server 200 accesses the URL using the access authentication information of the request user, and obtains the electronic file specified by the URL.

At S222, the CPU 220 of the print server 200 accesses the online storage 500, specifically, the storage URL associated with the shared user, using the access authentication information of the shared user. Information regarding the storage URL and the access authentication information of the shared user are obtained at S216. Further, the CPU 220 stores the electronic file to be printed, which is obtained at S220 or S221, at a desired storage area designated to the shared user. At S222, the CPU 220 further obtains information regarding a URL at which the electronic file to be printed is stored. In this example, the CPU 220 may automatically assign a folder name and/or a file name of the electronic file, according to a predetermined naming rule. For example, referring to FIG. 18, assuming that the electronic file "www.webstorage1.com/test/data1" is obtained from the storage URL associated with the user "User A", the print server 200 may access the storage URL "www.webstorage2.com" of the user "User B" to store the electronic file in a folder "test" with a file name "data 1". The print server 200 further obtains the URL specifying the electronic file for the user "User B", that is, "www.webstorage2.com/test/data1".

Further, at S216, if the CPU 220 finds a plurality of items of access authentication information that respectively correspond to a plurality of online storages, the CPU 220 may arbitrarily select one of the online storages that can be accessed by the shared user.

At S223, the CPU 220 generates job information, which associates the shared user name and the URL at which the electronic file to be printed is stored (obtained at S222), and assigns a job ID to a print job corresponding to the job information. The CPU 220 further registers the job information in association with the job ID, in the print job registration table.

At S224, the CPU 220 sends email addressed to the shared user to notify the shared user of registration of a new print job, and the operation ends.

Referring back to FIG. 11, when it is determined that the email address of the shared user indicates that the shared user is not registered ("NO" at S215), or when it is determined that there is no access authentication information for the shared user ("NO" at S216) in the access authentication information table of FIG. 18, the print server 200 determines that the shared user does not have access to the online storage 500. In such case, the operation proceeds to S225 to perform S225 to S227, in a substantially similar manner as described above referring to S115 to S117 of FIG. 7.

Through performing S225 to S227, the print server 200 issues a one-time password for the shared user, notifies the shared user of the one-time password, and registers information regarding the shared user in the print job registration table. In printing the electronic document, the print server 200 obtains the electronic file by accessing an account of the request user using the access authentication information of the request user.

As described above referring to FIGS. 11 and 12, the print server 200 stores print job information in the print job registration table differently, depending on whether the shared user is a registered user of the online storage 500.

Assuming that the email instructs to register a print job to print electronic data specified by the URL, for the request user "User A" and the shared users "Guest D" and "User B", when the User B does not have an account of the online storage 500, the print server 200 generates a data entry of the print job having the job ID "004" as described above referring to FIG. 20.

Alternatively, when the user B does have an account of the online storage 500, the print server 200 generates a data entry of the print job having the job ID "004" and a print job having a job ID "005" as illustrated in FIG. 21.

Referring to FIG. 21, the print job with the job ID "004" and the print job with the job ID "005" are generated and registered, in response to email data transmitted from the request user that requests for registering a print job to print a specific electronic file. The email data is set with the shared users "User B" and "Guest D". Since the shared user "User B" has access authentication information stored in the access authentication information table of FIG. 18, the print server 200 obtains the electronic file to be printed from the URL extracted from the email, and stores the electronic file to be printed in a storage area that belongs to an account of the shared user "User B". Accordingly, the print server 200 creates a new print job with the job ID "005", which stores information regarding a URL at which the electronic data to be printed by the shared user "User B" is stored. The shared user "User B" is further removed from the "SHARED USER NAME" field for the job ID "004", as the new job is created for the user "User B".

After the print job is registered, the user may instruct the printer 400 to execute the print job, in a substantially similar manner as described above referring to FIG. 8. The operation of executing the print job is performed by the print server 200, in response to system login data received from the printer 400.

For example, referring to the print job registration table of FIG. 21, the request user "User A" or the shared user "User B" may enter system login data to be authenticated by the print server 200, and receive a job list that lists one or more print jobs that are registered for the user from the print server 200.

More specifically, the job list of the request user "User A" lists the job ID "004". The job list of the shared user "User B" lists the job ID "005". Based on the job ID received from the printer 400, the print server 200 obtains information regarding the URL from the print job registration table of FIG. 21, and access authentication information from the access authentication information table of FIG. 18. Using the obtained information, the print server 200 accesses a specific URL of the online storage 500 to obtain the electronic file to be processed.

While the print server 200 obtains the URL and the access authentication information for the user "User A" based on the job ID "004", and obtains the URL and the access authentication information for the user "User B" based on the job ID "005", the user who requests through the printer 400 does not have to care about such process. In either case, the print server 200 requests the printer 400 to print the electronic file as specified by the email transmitted from the request user.

Figure 13:
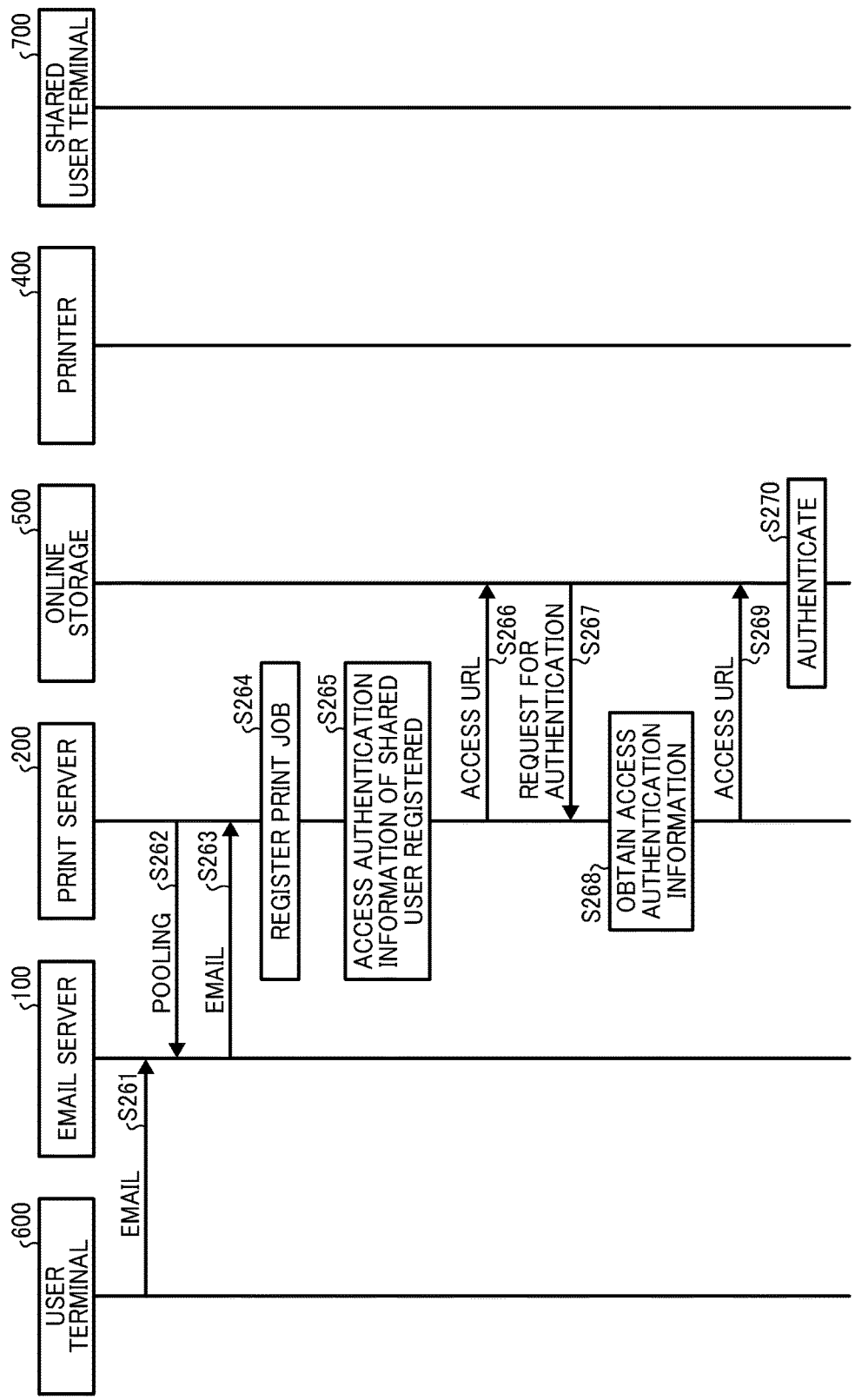
FIGS. 13 and 14 are a data sequence diagram illustrating operation of processing email that requests registration of a print job and executing the print job, performed by the print system of FIG. 2, according to an example embodiment of the present invention.
Figure 14:
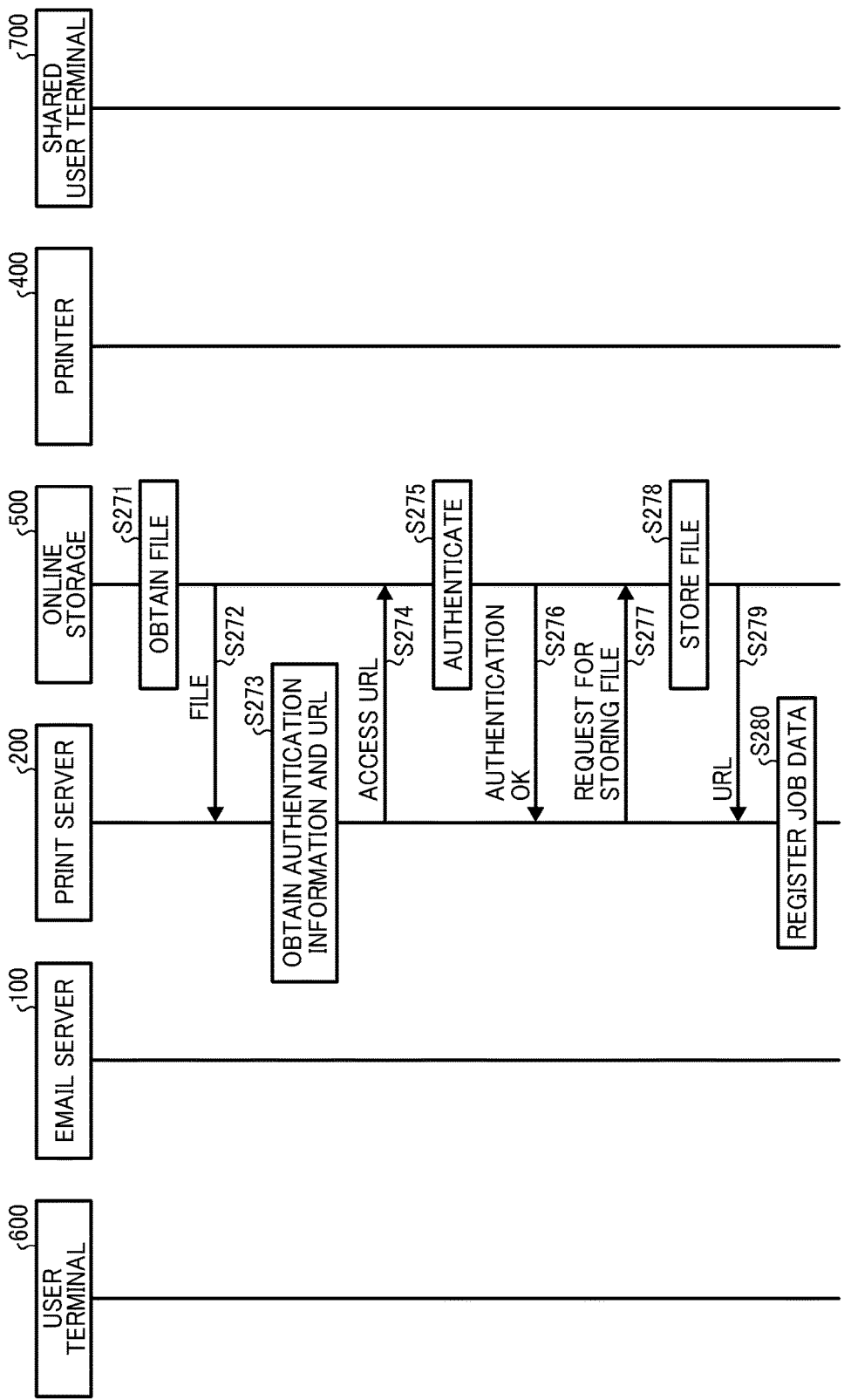

Referring now to FIGS. 13 and 14, operation of processing email that requests registration of a print job and is received from a request user, and operation of executing the print job, performed by the print system of FIG. 2, is explained according to an example embodiment of the present invention. In this example, it is assumed that the request user, who sends email addressed to the print server 200 from the user terminal 600, is a registered user having the value "Y" of user registration information in the address table of FIG. 17. Further, the email includes a URL in the body of email, and an email address other than the email address of the print server 200 in the "CC" field. The online storage 500 requires authentication to access an electronic file specified by the URL. Further, it is assumed that the access authentication information of the shared user is stored in the access authentication information table of FIG. 18. In the following example, the operation of executing the print job, which is performed by the print server 200 in response to the system login data received from the printer 400, is performed in a substantially similar manner as described above referring to S166 to S180 of FIGS. 9 and 10. For this reasons, description thereof is omitted.

Referring to FIG. 13, S261 to S263 are performed in a substantially similar manner as described above referring to S41 to S43 of FIG. 5 and S161 to S163 of FIG. 9. More specifically, the user at the user terminal 600 instructs the user terminal 600 to send email addressed to the print server 200, which requests registration of a print job for printing an electronic file. The print server 200 obtains the email addressed to the print server 200 from the email server 100, by polling.

At S264, the print server 200 performs S211 to S212 of FIG. 11 to determine that the email sender, or the request user, is the registered user, and that the URL is included in the email body. At S264, the print server 200 registers print job information that associates information regarding the URL and information regarding the request user, as described above referring to S213 of FIG. 11.

At S265, the print server 200 performs S214 to S216 of FIG. 11, and determines that the access authentication information used for accessing the online storage of the shared user is stored in the access authentication information table of FIG. 18.

At S266 to S272, the print server 200 obtains the electronic file from the URL that is extracted from the body of the email, in a substantially similar manner as described above referring to S45 to S51 of FIG. 5.

At S273, the print server 200 obtains the access authentication information and the storage URL of the shared user, from the access authentication information table of FIG. 18.

At S274, the print server 200 accesses the online storage 500, specifically, the storage URL obtained at S273, using the access authentication information obtained at S273. At S275, the online storage 500 authenticates the shared user, using the received access authentication information to generate an authentication result. In this example, it is assumed that the online storage 500 returns the authentication result indicating that authentication is successful at S276.

At S277, the print server 200 sends the electronic file obtained at S272 to the online storage 500 to request for storing the electronic file in a storage area of the online storage 500 that belongs to the account of the shared user.

At S278, the online storage 500 stores the electronic file in the storage area of the shared user. At S279, the online storage 500 sends a response indicating a URL at which the electronic file is stored.

At S280, the print server 200 performs S223 of FIG. 12 to generate job information for the shared user based on the received URL, and registers the job information to the print job registration table of FIG. 21. In this manner, a new print job is generated for the shared user as described above referring to FIG. 21.

As described above referring to FIGS. 11 to 14, the print server 200 receives email from a request user, which requests registration of a print job to print an electronic file stored in the online storage. When the email indicates a shared user who is allowed to share access to the print job, the print server 200 determines whether the shared user is capable of accessing the online storage 500 using access authentication information of the shared user, for example, by checking whether the shared user has an account in the online storage 500. When it is determined that the shared user can access the online storage 500, the print server 200 obtains the electronic file from the online storage 500 using access authentication information of the request user, and stores the obtained electronic file in a storage area of the online storage 500 that belongs to the account of the shared user using access authentication information of the shared user. The print server 200 further registers a print job for the shared user.

This allows the request user to freely edit or move the electronic file to be printed, irrespective of whether the shared user has accessed the electronic file for printing. For example, in the above-described example in which the electronic file is obtained from the online storage 500 by the print server 200 in response to a user instruction for executing the print job, the request user needs to consider whether the electronic file has been accessed by the shared user even there is a need for editing or moving the electronic file to be printed.

In this example, even when the electronic file to be printed is edited or moved to another location by the request user, since a print job is newly generated for the shared user, the shared user is able to always print the electronic file as instructed by the email transmitted from the request user.

Further, there may a case in which the print server 200 cannot access an account of the request user in the online storage 500, for example, as the account is made invalid or the access authentication information of the request user has been changed without notifying the print server 200. Even in such case, the shared user is able to execute the print job, as the print job is newly created for the shared user.

Further, the request user may sometimes want to distribute the electronic file itself to the shared user, in addition to requesting the shared user to print the electronic file. In such case, the request user needs to simply send email data specifying the electronic file and the shared user. Since the shared user can access the electronic file itself, the request user does not have to send the electronic file to the shared user.

The hardware structures, functional structures, or operations of any one of the print system of FIG. 2 and the print server 200 are not limited to the above-described examples.

For example, the functions related to authentication that are performed by the print server 200 may be performed by an authentication server. In one example, the functions performed by the registered user determiner 202, the URL authentication processor 204, the authentication information processor 205, and the print user authenticator 207 may be partly or entirely performed by the authentication server. Further, the address table of FIG. 17, the access authentication information table of FIG. 18, and the system login data table of FIG. 19 may be stored in a memory of the authentication server. In case the printer server 200 needs to refer to any one of the tables of FIGS. 17, 18, and 19, the print server 200 sends a processing request to the authentication server, and receives a processing result from the authentication server.

In alternative to receiving email by polling, when the email server 100 detects that email is newly stored in the email box 103, the email server 100 may send notification to the print server 200. In response to the notification, the print server 200 may send a request for obtaining email through the email obtainer 201. This may improve effectiveness in obtaining email, when compared with the above-described example case of obtaining email by polling.

Further, in the above-described example of FIGS. 3, 7, and 11, which is to be performed by the print server 200 in response to the received email, when it is determined that the email sender is not registered ("NO" at S11), the operation ends. In such case, the print server 200 may instruct the email server 100 to send email addressed to the email address of the email sender, which indicates that the user is not registered, before ending the operation. With this notification, the email sender can recognize that the user needs to be registered to the print system to use the print services of the print server 200.

Further, in the above-described example of FIGS. 3, 7, and 11, when it is determined that there is no URL in the email body, the operation ends. In such case, the print server 200 may instruct the email server 100 to send email addressed to the email address of the email sender, which indicates that a URL needs to be specified, before ending the operation. With this notification, the email sender can recognize that the URL needs to be identified.

Further, at S33 and S35 of FIG. 4, and S132 of FIG. 8, the CPU 220 of the print server 200 sends an electronic file to be printed to the printer 400. With this electronic file, the print server 200 may additionally send print settings data to be used for printing an image based on the electronic file. The print settings data sets various printing parameters including, for example, printing parameters for integrated printing, double-sided printing, etc. In one example, the print settings data may be previously set by default for each one of the registered users. In another example, the request user may generate email including the print settings data in the email body, and send the email to the print server 200. The print server 200 analyzes the print settings data to apply various printing parameters set by the print settings data to electronic data to be printed. In another example, the printer 400 may cause the operation panel to display a user interface, which allows the user (the request user or the shared user) to set various printing parameters, and print electronic data according to the printing parameters that are set by the user. In this example case of setting the printing parameters through the user interface, information regarding the printing parameters may be transmitted to the print server 200 to cause the print server 200 to set the received printing parameters to a print job.

In the above-described example, the print server 200 obtains the email address set in the "From" field of the email, as information regarding the email sender. Alternatively, the print server 200 may extract a user name of the email sender from the body of the email as information regarding the email sender, if the user name is found in the email body. Alternatively, the user name of the email sender may be obtained, based on information that may be automatically sent by the user terminal 600 with the email.

In the above-described example, the print server 200 sends the electronic file to be printed to the printer 400, and the printer 400 forms an image based on the electronic file received from the print server 200. Alternatively, the print server 200 may send the electronic data to any destination other than the printer 400. Further, the electronic file that is transmitted from the print server 200 may be used for any purpose other than printing.

For example, the print server 200 may transfer an electronic file to a data processing device. Examples of the data processing device include, but not limited to, a personal computer (PD), a personal digital assistant (PDA), a tablet device, a smart phone, a projector, and an electronic document reader or processor. The electronic file transmitted from the print server 200 may be used to display through a destination apparatus.

In the above-described example, the functions of the print server 200 are performed by an information processing apparatus having the functional structure of FIG. 1. Alternatively, the functions of the print server 200 may be distributed over a plurality of information processing apparatuses capable of communicating with one another through a network. Further, some of information processing apparatuses may cooperatively operate to perform a set of functions of the print server 200.

In the above-described example, the user terminal 600 uses email to register a print job. Alternatively, the user terminal 600 may directly send the print server 200 with information regarding the request user, information regarding electronic data to be printed, and information regarding the shared user.

Further, a one-time password to be notified to the email address of the user (the request user or the shared user) may be treated as user identification information that uniquely identifies a user or a group of users. As long as a user, or a group of users, can be identified, any other information such as the user ID, user name, business unit code, information regarding the user's position or role in company, or a device ID or a phone number of a portable device owned by a user may be used. These types of information regarding the user may at least partly be used as authentication information, which may be stored in the authentication information storage.

Further, the above-described technique of processing email that requests for registration of a print job may be applicable to an example case of registering a data output job to output electronic data using a data output apparatus. The electronic data to be processed may be stored in an external data management apparatus such as an external HDD provided by the storage services. More specifically, the data output job may be a print job to print the electronic data using such as a printer, or a display job to display the electronic data using such as a display. Further, the electronic data is managed using first condition information such as access authentication information. The network system, which communicates with the external data management apparatus, via a network to obtain the electronic data stored in the external data management apparatus using the first condition information.

Even when a user does not know the first condition information, the user may input user information, such as a user name or a one-time password, to request for outputting the electronic data to the data output apparatus.

In one example, the information processing apparatus receives first user information such as a sender address, location information from which the electronic data is obtained, and second user information such as a destination address. The information processing apparatus obtains first condition information, using first user information that is obtained from storing means storing the first user information and first condition information such as access authentication information. The information processing apparatus obtains electronic data based on the location information from the data management apparatus using the first condition information. The information processing apparatus receives second user information, such as system login data or the destination address, from the data processing apparatus. The information processing apparatus further transmits the electronic data to the data output apparatus, using the second user information.

When the second user information, which may be received with the first user information, is different from second user information received from the data output apparatus, the information processing apparatus is provided managing means that manages correspondence information regarding user information. The user information to be managed includes, for example, one-time password to be generated by the information processing apparatus.

In outputting the electronic data, the information processing apparatus obtains the electronic data from the data management apparatus to the data output apparatus as it is to cause the electronic data be output through the data output apparatus. Alternatively, the information processing apparatus may apply data processing such as rendering to electronic data obtained from the data management apparatus, and transmits the processed electronic data to the data output apparatus. The electronic data to be transmitted to the data output apparatus includes any one of electronic data obtained from the data management apparatus, and electronic data obtained from the data management apparatus and processed.

In the above-described example illustrated in FIGS. 1 to 21 and 43, the print server 200 provides the user with the print services. In alternative to or in addition to the print services, any services related to electronic data may be provided to the user using the above-described technique of registering a job by email and executing the job while allowing any unregistered user to execute the job.

Referring now to FIGS. 22 to 42, a configuration of a data output system including an information processing apparatus or an information processing system functioning as a server that processes electronic data according to a request received from a client is explained, according to another example embodiment of the present invention. More specifically, in this example, the data output system is implemented as a data output system including a service provider system that outputs electronic data according to a request received from a user. The electronic data may be output as a print output using any desired image forming apparatus, or may be output as a display image using any desired display device such as a projector.

Figure 22:
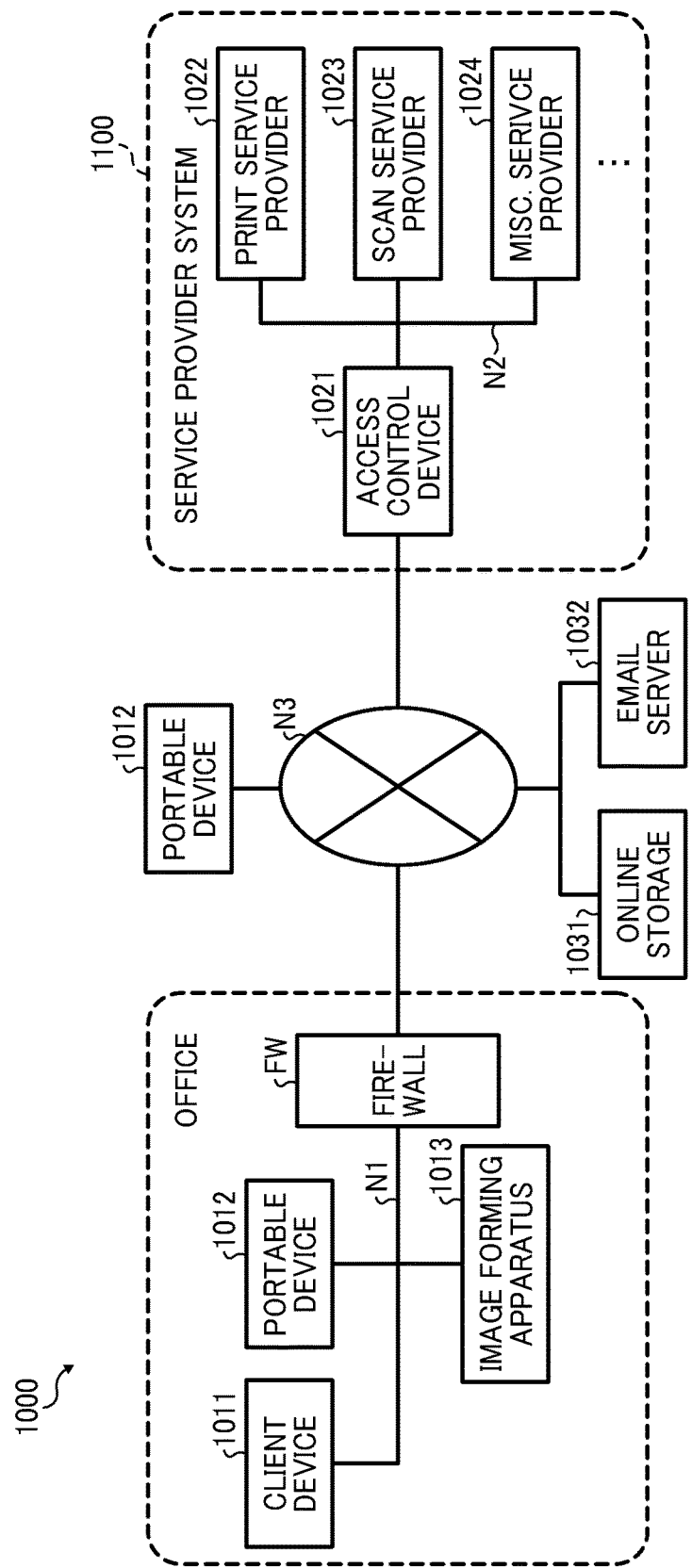
FIG. 22 is a schematic block diagram illustrating a configuration of a data output system including a service provider system, according to an example embodiment of the present invention.

The data output system 1000 of FIG. 22 includes, for example, a first network N1 such as a local area network provided in the office environments, a second network N2 such as a service provider network on which a service provider system providing the cloud services is provided, and a third network N3 such as the public network including the Internet.

The first network N1 is implemented by a private network provided inside a firewall FW. The firewall FW is provided between the first network N1 and the third network N3 to detect and prevent unauthorized access to the first network N1 from the third network N3. The first network N1 includes a client device 1011, a portable device 1012, and an image forming apparatus 1013 such as a multifunctional peripheral (MFP).

The client device 1011 is one example of a terminal device 1300. The client device 1011 may be implemented by an information processing apparatus (computer system) on which the general-purpose OS is mounted. The client device 1011 includes a communication device, such as a wireless communication device or a wired communication device. Examples of the client device 1011 include, but not limited to, a tablet PC, a note PC, and a user terminal operated by the user.

The portable device 1012 is one example of the terminal device 1300. The portable device 1012 includes a communication device such as a wireless communication device or a wired communication device. Examples of the portable device 1012 include, but not limited to, a smart phone, a portable device, a tablet PC, a note PC, and any other portable device that can be carried by the user.

The image forming apparatus 1013 includes an image forming device that performs the image forming function, and a communication device such as a wireless communication device or a wired communication device. Examples of the image forming apparatus 1013 include, but not limited to, an MFP, a copier, a scanner, a printer, and a laser printer. In addition to or in alternative to the image forming apparatus 1013, an image processing apparatus may be provided, such as a projector or an electronic board, capable of processing an image for display to the user.

In the above-described example of FIG. 22, only one client device 1011, one portable device 1012, and one image forming apparatus 1013 are illustrated. Alternatively, any desired number of client device 1011, portable device 1012, and image forming apparatus 1013 may be provided. Further, in this example, the network N1 is managed by a specific organization, such as a specific company providing a client system that resides on the network N1. Although only one client system on the network N1 is illustrated in FIG. 22, there may be a plurality of client systems that reside on different networks that are respectively managed by different organizations.

In this example, the client device 1011 and the portable device 1012 each function as the user terminal 600 or the shared user terminal 700. The image forming apparatus 1013 functions as the printer 400.

The second network N2 is connected to the third network N3 via an access control device 1021. The access control device 1021 protects the second network N2 from the outside so as to keep security at a certain level. The second network N2 includes a plurality of servers each providing a specific service (service providers) to a client such as the client device 1011 or the portable device 1012 through the network. More specifically, the second network N2 includes the access control device 1021, a print service provider 1022, a scan service provider 1023, and a miscellaneous service provider 1024. For the descriptive purposes, the plurality of service providers may be collectively referred to as the service provider system 1100. The service provider system 1100 is substantially similar in function and operation to the print server 200 and the rendering server 300 of the print system of FIG. 2.

The access control device 1021 controls login to each service provided by the service provider system 1100, such as the print service provided by the print service provider 1022 or the scan service provided by the scan service provider 1023.

Further, the access control device 1021, the print service provider 1022, the scan service provider 1023, and the misc. service provider 1024 may each be implemented by one or more information processing apparatuses such as one or more PCs. For example, the access control device 1021, the print service provider 1022, the scan service provider 1023, and the misc. service provider 1024 may be integrated into one information processing apparatus. Alternatively, the access control device 1021, the print service provider 1022, the scan service provider 1023, and the misc. service provider 1024 may be distributed over a plurality of information processing apparatuses. Alternatively, one or more functions performed by the access control device 1021, the print service provider 1022, the scan service provider 1023, and the misc. service provider 1024 may be grouped into a set of services to be carried out by one or a group of information processing apparatuses.

The third network N3 is connected to an online storage 1031, and an email server 1032. The online storage 1031 functions as the online storage 500 of FIG. 2. The email server 1032 functions as the email server 100 of FIG. 2.

Further, in this example, at least a part of the service provider system on the second network 2 may be provided outside the second network N2, such as on the third network N3 or on the first network N1.

Further, in this example of FIG. 22, the portable devices 1012 are respectively provided on the first network N1 and the third network N3. Alternatively, the portable device 1012 may be provided on any other network. For example, the portable device 1012, which is provided on the first network N1, may be provided outside the first network N1, depending on a specific location where the user operates the portable device.

In the example of FIG. 22, the image processing system 1000 includes one online storage 1031. Alternatively, the image processing system 1000 may include any desired number of online storage.

<Hardware Configuration of Data Output System>

Figure 23:
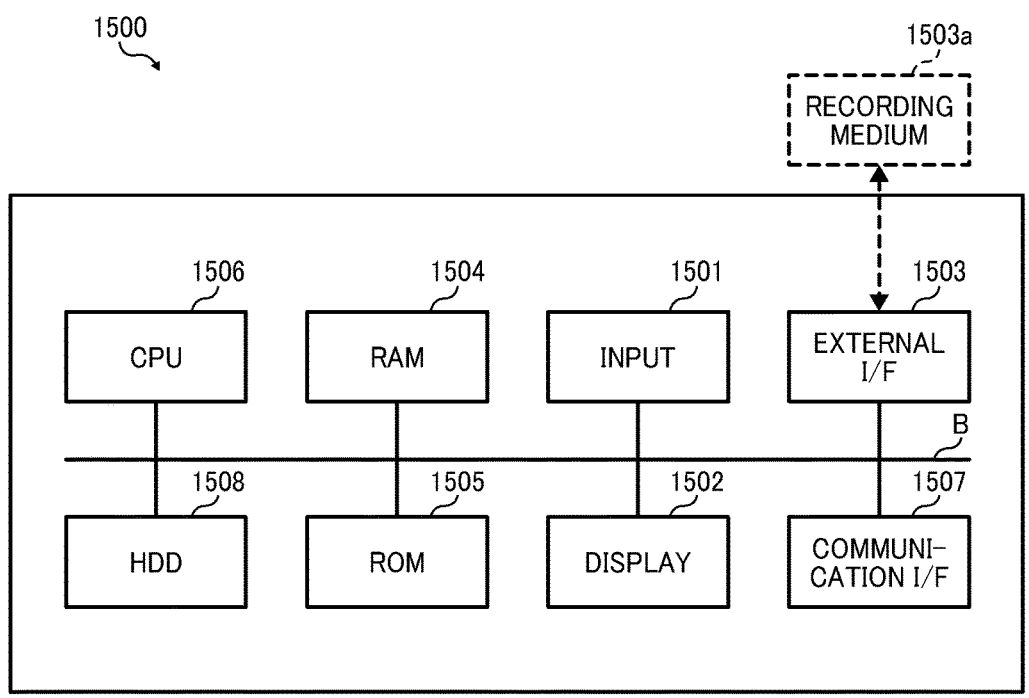
FIG. 23 is a schematic block diagram illustrating a hardware structure of a computer system, which functions as an apparatus in the data output system of FIG. 22 including the service provider system of FIG. 22.

In one example, the client device 1011, the portable device 1012, the access control device 1021, the print server provider 1022, the scan service provider 1023, the misc. service provider 1024, the online storage 1031, and the email server 1032 may each be implemented by a computer system 1500 having a hardware structure of FIG. 23.

Referring to FIG. 23, the computer system 1500 includes an input device 1501, a display 1502, an external interface (I/F) 1503, a random access memory (RAM) 1504, a read only memory (ROM) 1505, a central processing unit (CPU) 1506, a communication interface (I/F) 1507, and a hard disk drive (HDD) 1508, which are connected through a bus B.

The input device 1501, which may be implemented by a keyboard, a mouse, or a touch panel, receives a user input from the user such as in the form of electric signal. The display 1502 displays information such as a processing result of the computer system 1500.

The communication I/F 1507 may be implemented by a network interface that allows the computer system 1500 to connect with a network such as the first network N1, the second network N2, and the third network N3. Through the communication I/F 1507, the computer system 1500 transmits or receives data to or form the outside apparatus via a network.

The HDD 1508 is a nonvolatile memory, which may store various programs or data. The programs that may be stored include, for example, the operating system (OS) that controls entire operation of the computer system 1500, and application software that provides various functions under control of the OS. The HDD 1508 manages various programs and data using a predetermined file system and/or a database (DB).

The external I/F 1503 may be implemented by an interface, which allows the computer system 1500 to communicate with the outside apparatus, such as a recording medium 1503a. For example, the computer system 1500 may read or write various data with respect to the recording medium 1503a, via the external I/F 1503. Examples of the recording medium 1503a include, but not limited to, a flexible disk, a compact disc (CD), a digital versatile disc (DVD), a secure digital (SD) memory card, a universal serial bus (USB) memory, etc.

The ROM 1505 is a nonvolatile memory, such as a nonvolatile semiconductor memory, which keeps various programs or data even when the power of the computer system 1500 is turned off. In this example, the ROM 1505 stores various programs and data, such as Basic Input/Output System (BIOS) to be called upon execution of the computer system 1500, information regarding the OS settings and the network configuration, etc.

The RAM 1504 is a volatile memory, such as a volatile semiconductor memory, which temporarily stores programs and data.

The CPU 1506 is a computing unit, which controls entire operation or function of the computer system 1500. The CPU 1506 reads programs and data from a memory such as the ROM 1505 or HDD 1508, onto the RAM 1504, to perform various operations or functions, according to the read programs and data.

The client device 1011, the portable device 1012, the access control device 1021, the print service provider 1022, the scan service provider 1023, the misc. service provider 1024, the online storage 1031, and the email server 1032 respectively perform various functions described below, using the hardware structure of the computer system 1500.

<Software Configuration of Data Output System>

(Service Provider System)

Figure 24:
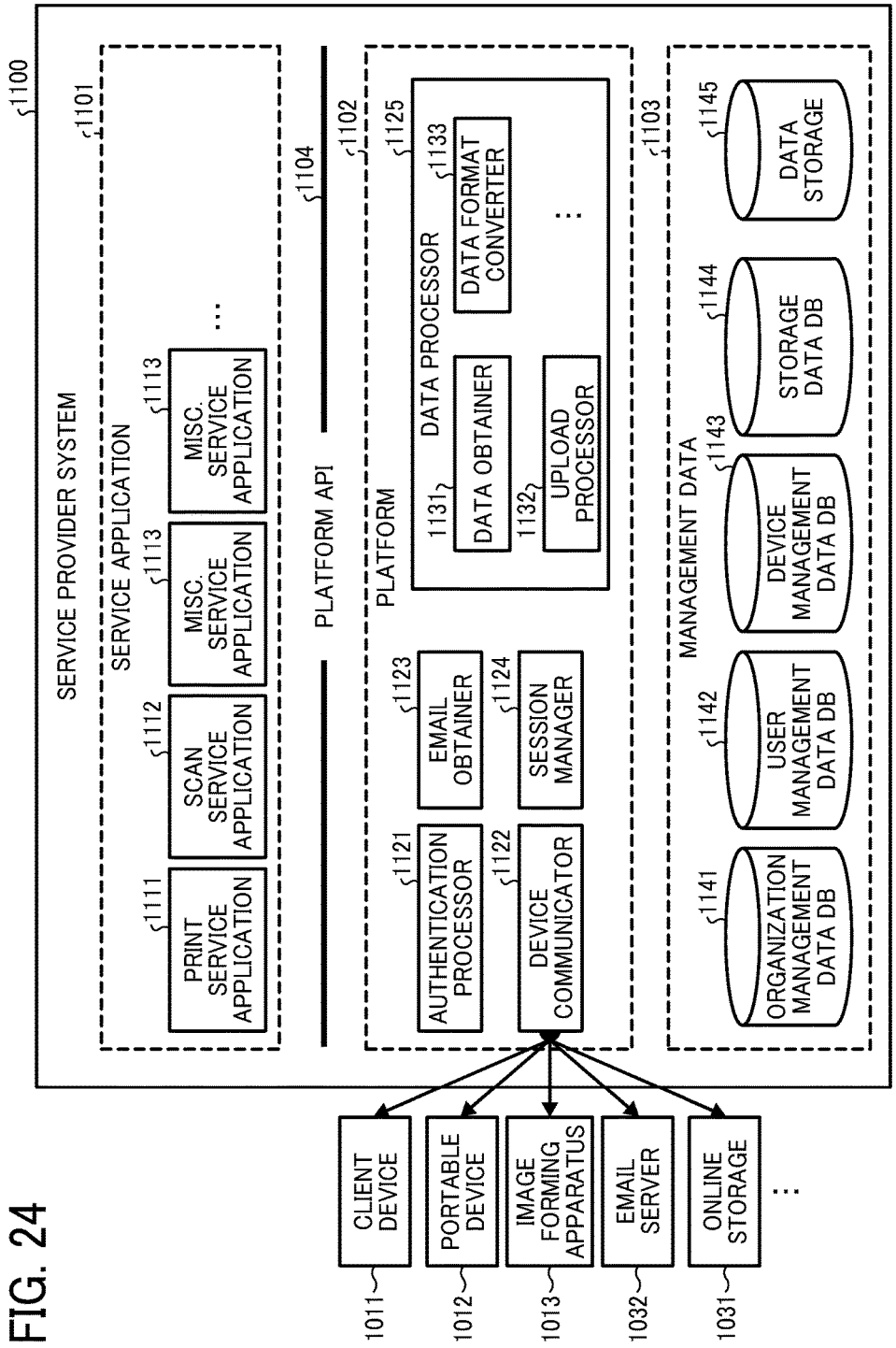
FIG. 24 is a schematic block diagram illustrating a functional structure of the service provider system of FIG. 22, according to an example embodiment of the present invention.

FIG. 24 illustrates a functional structure of the service provider system 1100 of FIG. 2, according to an example embodiment of the present invention. More specifically, the computer system 1500 of FIG. 23 executes various service providing programs, to be implemented as the service provider system 1100. The service provider system 1100 includes service application 1101, a platform 1102, a management data storage 1103, and a platform Application Programming Interface (API) 1104.

The service application 1101 includes various service application, such as print service application 1111, scan service application 1112, and one or more misc. service application 1113. The print service application 1111 provides print services. The scan service application 1112 provides scan services. The misc. application 1113 provides any other services.

The platform API 1104 is an interface, which allows the service application 1101, such as the print service application 1111, the scan service application 1112, or the misc. service application 1113, to access the platform 1102. More specifically, the platform API 1104 is an interface, which is previously defined such that the platform 1102 can receive a request from the service application 1101. The platform API 1104 may be implemented by, for example, function or class. When the service provider system 1100 is implemented by a plurality of information processing apparatuses that are distributed over a network, the platform API 1104 may be implemented by a web API that can be accessed via the network.

The platform 1102 includes an authentication processor 1121, a device communicator 1122, an email obtainer 1123, a session manager 1124, and a data processor 1125. The data processor 1125 includes a data obtainer 1131, an upload processor 1132, and a data format converter 1133.

The authentication processor 1121, which may be implemented by the instructions generated by the CPU 1506, performs functions related to authentication, such as the functions provided by the registered user determiner 202, the authentication information obtainer 205, and/or the print user authenticator 207 of the print system of FIG. 2. In one example, the authentication processor 1121 performs authentication in response to a login request from an office device such as the client device 1011 or the image forming apparatus 1013. In this example, the office device may be any apparatus, which may be provided in the office environments on the first network N1, such as the client device 1011, the portable device 1012, or the image forming apparatus 1013. For simplicity, in this example, the client device 1011, the portable device 1012, and the image forming apparatus 1013 are each or collectively referred to as the office device.

In one example, the authentication processor 1121 accesses a user management data database (DB) 1142 in the management data storage 1103 to obtain login data to be used for accessing the online storage 1031 for a user who uses the services provided by the service provider system 1100. The authentication processor 1121 accesses the online storage 1103 using the login data, such as a user name and a password of the user registered to the online storage 1103. In another example, the authentication processor 1121 authenticates a user, who operates the office device such as the image forming apparatus 1013, to determine whether the user is registered to use the services provided by the service provider system 1100.

The device communicator 1122 allows the service providing system 1100 to communicate with the outside apparatus, such as the office device, the online storage 1031, or the email server 1032. The device communicator 1122 may be implemented by the communication I/F 1507.

The email obtainer 1123, which may be implemented by the CPU 1506 that operates in cooperation with the communication I/F 1507, performs functions of obtaining email, which may be provided by the email obtainer 201 of the print system of FIG. 2. The email obtainer 1123 obtains new email addressed to the service provider system 1100 from the email server 1032, for example, by polling. For example, the email obtainer 1123 obtains email addressed to the print service provider 1022 from the terminal device 1300 such as the portable device 1012, which requests registration of a print job including a URL specifying electronic data to be printed. While the email obtainer 201 is provided in the platform 1102 in this example, the functions of the email provider 201 may be provided in the service application 1101.

The session manager 1124 manages a session, which is established with the outside apparatus such as the office device, the online storage 1031, or the email server 1032. For example, the session manager 1124 performs the functions provided by the data transmit 208, which manages transmission of data. When the service provider system 1100 is implemented by a plurality of information processing apparatuses, the session manager 1124 manages a session, which is establishes between or among a plurality of apparatuses of the service provider system 1100. The session manager 1124 may be implemented by the CPU 1506.

The data processor 1125, which may be implemented by the instructions generated by the CPU 1506, performs data processing based on the request received from the service application 1101. The data obtainer 1131 of the data processor 1125 performs the functions provided by the data obtainer 206 of FIG. 2. More specifically, the data obtainer 1131 sends login data to the online storage 1031 to have an authentication result from the online storage 1031, and obtains electronic data specified by the URL of email obtained at the email obtainer 1123 based on the authentication result.

The upload processor 1132 performs the operation or function of storing electronic data in a storage area of the online storage 1031 that can be accessed by a shared user, which may be provided by the job manager 209 of the print system of FIG. 2. More specifically, as described above referring to FIGS. 11 to 14, the upload processor 1132 may store electronic data obtained by the data obtainer 1131 in a storage area of the online storage 1031, which is designated to the shared user, using login data of the shared user.

The data format converter 1133 corresponds to the rendering processor 301 of the rendering server 300 of the print system of FIG. 2. For example, when the electronic data obtained at the data obtainer 1131 has a data format not compatible with the image forming apparatus 1013, the data format converter 1133 converts the electronic data to have a data format compatible with the image forming apparatus 1013.

The management data storage 1103 includes an organization management data DB 1141, the user management data DB 1142, a device management data DB 1143, a storage data DB 1144, and a data storage 1145. The management data storage 1103 may be implemented by any desired memory such as the HDD 1508. Further, any one of databases in the management data storage 1103 may be distributed over any desired network as long as it can be accessed by specific functional modules of the service provider system 1100.

The organization management data DB 1141 stores organization management data, which includes various information to be used for managing an organization that is previously registered as a user group authorized to use the services provided by the service provider system 1100. For example, the organization management DB 1141 stores an organization management data table of FIG. 29, which stores various information regarding each one of a plurality of user groups, or organizations, which are previously registered.

The user management data DB 1142 stores user management data, which includes various information to be used for authenticating a user to determine whether the user is a registered user or the user has access to the online storage 1031. The user management data DB 1142 corresponds to the authentication information storage 212 of the print system of FIG. 2, which stores the address table of FIG. 17, the access authentication information table of FIG. 18, and the system login data table of FIG. 19. For example, the user management data DB 1142 stores a user management data table of FIG. 30.

The device management data DB 1143 stores device management data, which includes various information to be used for managing devices or apparatuses on the data output system 1000. For example, the device management data DB 1143 stores a device management data table of FIG. 31.

The storage data DB 1144 stores storage data, which includes various information regarding the online storage 1031 that is available on the data output system 1000. For example, the storage data DB 1144 stores a storage data table of FIG. 32.

The data storage 1145, which may be implemented by the CPU 1506 that operates in cooperation with any desired memory such as the HDD 1508, functions as the job spooler 211 of the print system of FIG. 2. More specifically, the data storage 1145 spools electronic data assigned with an output data ID, as electronic data to be processed as a job is registered.

With the functional structure as illustrated in FIG. 24, the service provider system 1100 provides a cloud platform performing various functions such as the authentication function or data format conversion function, and a set of services that provides various services such as the printing service using the functions provided by the cloud platform. The cloud platform is implemented by, for example, the platform 1102, the management data DB 1103, and the platform API 1104. The set of services is implemented by the service application 1101.

In one example, the authentication function provided by the cloud platform of the service provider system 1100 is implemented by, for example, the authentication processor 1121 and an authentication database. The authentication database is implemented by the organization management data DB 1141, user management data DB 1142, and/or device management data DB 1143.

In another example, the data format conversion function provided by the cloud platform of the service provider system 1100 is implemented by, for example, the data format converter 1133 and the data storage 1145.

The set of services of the service provider system 1100 uses the functions provided by the cloud platform of the service provider system 1100, such as the authentication function or the data format conversion function, to provide various services. The set of services of the service provider system 1100 uses the authentication function provided by the cloud platform to obtain login data, which is to be used for accessing the online storage 1031 to obtain electronic data from the online storage 1031.

In this example, the online storage 1031 is provided as one example of the external service system. The external service system is any system other than the service provider system 1100, which is provided on the data output system 1000. In addition to the online storage, various other services may be provided outside the service provider system 1100 such as the scan document storing and managing services.

Further, the service provider system 1100 of FIG. 24 collectively manages the organization management data, the user management data, the device management data, and the storage data, which are commonly used by the plurality of service application 1101, thus integrating the authentication function.

For the descriptive purposes, in the following examples, it is assumed that a user at the terminal device 1300 requests the service provider system 1100 to provide the print services through the print service provider 1022.

<Print Service Application>

FIG. 25 illustrates a schematic block diagram illustrating a functional structure of the print service application 1111 of the service provider system 1100 of FIG. 24. More specifically, the computer system 1500 of FIG. 23 executes print service application 1111 to have the functional modules illustrated in FIG. 25 to function as the provide service provider 1022. The print service application 1111 includes a data analyzer 1201, an output data manager 1202, a process request 1203, a registered user determiner 1204, a URL authentication processor 1205, a password generator 1206, and an output data management information storage 1207.

The data analyzer 1201 provides the functions that are similar to the functions of the analyzer 203 of the print system of FIG. 2. The data analyzer 1201 analyzes email obtained at the email obtainer 1123, and obtains information indicating a sender's email address set in the "From" field of the email. The data analyzer 1201 further obtains the URL from the body of the email, if the URL is described in the body. The data analyzer 1201 further obtains information indicating an email address of a shared user, which is set in the "TO" or "CC" field of the email data.

The output data manager 1202 provides the functions that are similar to the functions of the job manager 209 of the print system of FIG. 2. The output data manager 1202 manages various information regarding a job, which is stored in the output data management information storage 1207.

The process request 1203 provides the functions that are similar to the functions of the data transmit 208 of the print system of FIG. 2. The process request 1203 transmits the electronic data obtained at the data obtainer 1131 to the image forming apparatus 1013.

The registered user determiner 1204 provides the functions that are similar to the functions of the registered user determiner 202 of the print system of FIG. 2. The registered user determiner 1204 determines whether a request user, who sends email that is received at the email obtainer 1123, is previously registered to use the services provided by the service provider system 1100.

The URL authentication processor 1205 provides the functions that are similar to the functions of the URL authentication processor 204 of the print system of FIG. 2. When the data analyzer 1201 obtains the URL from the email body, the URL authentication processor 1205 determines whether authentication is required to obtain the electronic data specified by the URL.

The password generator 1206 issues a one-time password for the user such as the shared user. The password generator 1206 issues a password, which is one example of shared authentication information for authenticating the shared user.

The output data management information storage 1207 stores output data management information, which is used for managing a job that is registered according to a request for registering a job received from the request user received by email. For example, the output data management information storage 1207 stores various information, which may be managed using the print job registration table of FIG. 15 and/or the shared user password table of FIG. 16. In this example, the output data management information storage 1207 stores an output data management information table of any one of FIGS. 26, 27, and 28.

FIG. 26 illustrates an example data structure of the output data management information table, which stores output data management information to be used to manage information regarding a job, which is registered according to a request for registering the job received from the request user. For the descriptive purposes, the output data management information table of FIG. 26 may be referred to as the output data management information table for the request user. The output data management information table of FIG. 26 stores, for each one of a plurality of jobs, a job ID, output data ID, organization code, user identification data, bibliographic data, and conversion status.

The job ID is one example of job identification information for uniquely identifying a job, which is registered according to the request received from the request user. The output data ID is one example of data identification information for uniquely identifying electronic data that is spooled in the data storage 1145, as electronic data to be processed for the registered job.

The user identification data uniquely identifies a request user, who requests registration of a job. For example, the user identification data may be a user name or a user ID. The organization code uniquely identifies an organization, such as a company or a business unit, to which the request user belongs. With the organization code, a group of users or a group of devices such as office devices may be managed. Further, in this example, the organization code is not limited to identify a group of users or devices by a specific organization. In another example, the organization code may be defined as a contract code, or contract information, for uniquely identifying a contract that is applied to a specific group of users or devices. The output data management information may be managed using the organization code.

The bibliographic data is any attribute information related to the electronic data such as print settings of the electronic data, which is set by the request user. The conversion status indicates a progress in data format conversion at the data format converter 1133, when the electronic data needs to be converted. For example, the conversion status may have the value "waiting" to indicate that the data format is to be performed, the value "processing" to indicate that data format conversion is being performed, and the value "completed" to indicate that data format conversion is completed.

FIG. 27 illustrates an example data structure of the output data management information table, which stores output data management information to be used to manage information regarding a job, which is registered according to a request for registering the job received from the request user for a shared user. In this example, the print service application 1111 creates an entry to the output data management information table of FIG. 27, when the email has information regarding a shared user. For the descriptive purposes, the output data management information table of FIG. 27 may be referred to as the output data management information table for the shared user. In this example illustrated in FIG. 27, it is assumed that, of the jobs registered in the output data management information table for the request user (FIG. 26), the jobs that respectively have the job IDs "1", "2", and "5" are to be shared with one or more shared users. In such case, the print service application 1111 creates data entries in the output data management information table for the shared user (FIG. 27), that respectively correspond to the job IDs "1", "2", and "5".

Referring to FIG. 26, the output data management information table of FIG. 27 stores, for each one of a plurality of jobs, a job ID, output data ID, shared user organization code, hared user identification data, request user organization code, request user identification data, bibliographic data, and conversion status.

The job ID, the request user organization code, and the request user identification data are identical to those data items stored in the output data management information table of FIG. 26.

The shared user organization code uniquely identifies an organization to which the shared user belongs. The shared user identification data uniquely identifies the shared user, which is set by the request user. The output data management information table of FIG. 27 can be used, even when the request user and the shared user are respectively assigned with different organization codes. If the request user and the shared user both belong to the same organization identified by the same organization code, information regarding the request user organization code may not be entered, as it is the same as the shared user organization code.

The bibliographic data is any attribute information related to the electronic data such as print settings of the electronic data, which is set by the shared user. In this example, the print settings data of the shared user may be different from that of the request user, as the shared user may instruct to print the electronic data with different print settings. The conversion status indicates a progress in data format conversion at the data format converter 1133, when the electronic data needs to be converted.

The output data ID is one example of data identification information for uniquely identifying electronic data that is spooled in the data storage 1145, as electronic data to be processed for the registered job. In this example, the output data ID of the shared user differs from the output data ID of the request user in the output data management information table of FIG. 26, even though the electronic data to be processed is the same. For example, when the print settings are different between the request user and the shared user, the image forming apparatus 1013 needs to output the electronic data according to the print settings specific to each user. By assigning a different output data ID, the print service application 1111 is able to identify a specific print job by a combination of the job ID and the output data ID. For example, referring to FIGS. 26 and 27, the output data ID "1" of the print job having the ID "1" is changed to the output data ID "6", in case the print service application 1111 needs to manage electronic data based on the print settings set by the shared user rather than the print settings set by the request user.

In alternative to setting the print settings by each user, the print settings may be set common to all users for each print job. In such case, the output data management information table stores output data management information as illustrated in FIG. 28, such that the image forming apparatus 1013 outputs the electronic data according to the common print settings, such as the print settings set by the request user. In FIG. 28, the print job ID and the output data ID have the same values, as the print settings are common to all users who execute the same print job. For example, the output data ID "1" of the print job having the ID "1", which is stored in the output data management information of FIG. 26, is kept the same for the shared user, so as to manage electronic data based on the print settings common to all users including the request user and the shared user.

<Management Data>

Referring now to FIGS. 24 and 29 to 32, data structures of management data are explained according to an example embodiment of the present invention.

FIG. 29 is an example data structure of the organization management data table, which is stored in the organization management data DB 1141. The organization management data table of FIG. 29 stores, for each organization being registered, an organization code, an organization name, a country, a language, and address data. The organization code is one example of organization identification data that uniquely identifies an organization such as a company. The organization name is a name of the organization. The country is a country at which the organization is located, such as where the organization is registered. The language indicates an official language used by the organization. The address data indicates an email address assigned to the organization, which is used by a user of the organization when requesting the service provider system 1100 to request specific service. For example, the service provider providing the print service may register information regarding the organization in the organization management DB 1141.

FIG. 30 is an example data structure of the user management data table, which is stored in the user management data DB 1142. The user management data table of FIG. 30 stores, for each one of a plurality of registered users, an organization code, a user name, a password, address data, and login data.

The organization code is the organization code of an organization to which the user belongs. The user name and the password are one example of user identification data that uniquely identifies the user. In alternative to the user name, any other information that uniquely identifies the user such as a user ID may be used. Further, the password does not have to be registered, for example, when authentication is not required. The user identification data, such as the user name and/or the password, should be uniquely set for each one of the users who belong to the same organization identified by the same organization code. If the users belong to different organizations identified by the different organization codes, the same user identification data may be assigned to different users, as the users can be distinguished using a combination of the organization code and the user identification data.

The address data indicates an email address of the user.

The login data functions as access authentication information, which is used to access the online storage 1031. More specifically, the login data stores a user name and a password, which are used by the user to access a user's account in the online storage 1031. In this example, the user name and the password that are required to access the online storage 1031 may differ from the user name and the password of the user identification data. Further, as illustrated in FIG. 30, more than one type of login data may be provided for one user, if the user has access to more than one storage. For example, the user "User A" uses the user name "User AA" and the password "xxx" to login the storage A, and the user name "User AA" and the password "xx" to login the storage B.

In alternative to using information that uniquely identifies the user as the user identification data, any information that uniquely identifies an electronic device uniquely assigned to the user such as an IC card may be used as the user identification data. Examples of the electronic device uniquely assigned to the user include, but not limited to, IC card, portable device, tablet terminal, and electronic book device. As the identification information that uniquely identifies the electronic device, any one or any combination of a card ID, a serial ID, a phone number of a portable device, and terminal profile information may be used.

FIG. 31 is an example data structure of the device management data table stored in the device management data DB 1143. The device management data table stores device management data to be used for managing devices or apparatuses on the system such as office devices on the first network N1. The device management data table of FIG. 31 stores, for each office device, an organization code, device authentication data, business unit data, and capability data.

The organization code is one example of identification information that uniquely identifies an organization managing the office device. The device authentication data is any information that may be used to authenticate the office device based on determination of whether the office device satisfies a specific condition. For example, the device authentication data may be an ID indicating that specific application is being installed onto the office device, or a machine number that identifies the office device. The business unit data indicates a business unit within the organization at which the office device is provided. The capability data indicates the capability of the office device, such as functionality of the office device. For example, referring to FIG. 31, the office device with the device authentication data "1111", which is managed by the organization having the organization code "XXX", is located at the business unit A and has capability in printing a full color image on A4 size paper.

FIG. 32 is an example data structure of the storage data table, which is stored in the storage data DB 1144. The storage data table stores information regarding the online storage 1031 that is available on the data output system 1000. The storage data table of FIG. 32 stores, for each storage 1031, a storage name and a URL keyword. The storage name indicates a name that is uniquely assigned to the online storage 1031. The URL keyword is a keyword to be used for obtaining information regarding an address of the online storage 1031, such as a URL of the online storage 1031. For example, the URL keyword may be at least a part of the URL of the online storage 1031.

<Functional Structure of Terminal Device>

Figure 33:
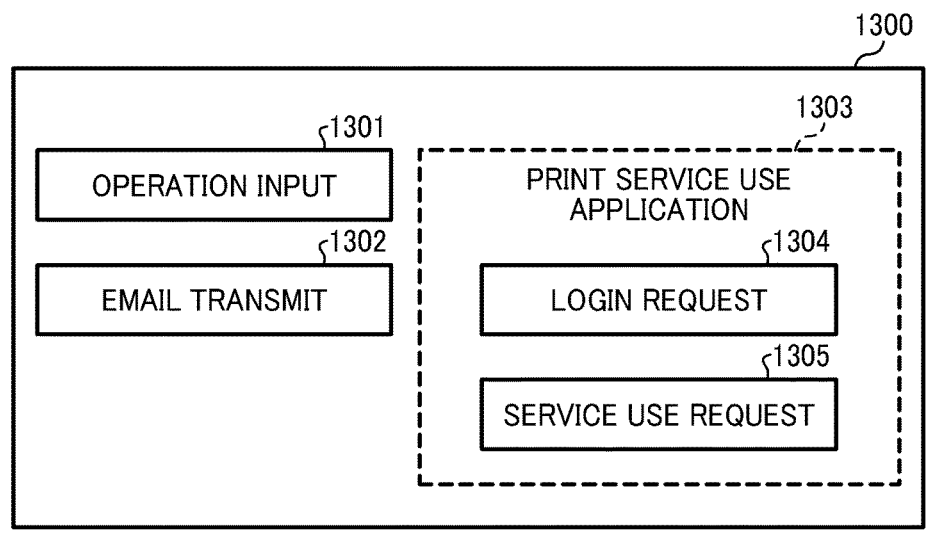
FIG. 33 is a schematic block diagram illustrating a functional structure of a terminal device of the data output system of FIG. 22, according to an example embodiment of the present invention.

The terminal device 1300 of the data output system 1000, such as the client device 1011 and the portable device 1012, may have a functional structure illustrated in FIG. 33, according to an example embodiment of the present invention.

More specifically, the computer system 1500 of FIG. 23 executes control program to have functional modules of FIG. 33, which include an operation input 1301, an email transmit 1302, and print service use application 1303.

The operation input 1301 receives various instructions from the user, such as a request for transmitting email that requests registration of a job, such as registration of a print job. The email transmit 1302 transmits email in response to the request for transmitting email that requests registration of a job, which is received at the operation input 1301.

The print service use application 1303 provides the function of uploading. For example, the print service use application 1303 provides the function of registering a print job by uploading various information regarding the electronic data to be processed using the web services, instead of sending electronic data to an apparatus operated by the shared user by email. The print service use application 1303 includes a login request 1304 and a service use request 1305. The login request 1304 allows the terminal device 1300 to login the service provider system 1100. The service use request 1305 requests the terminal device 1300 to register a job to the service provider system 1100 using the web upload function.

<Functional Structure of Image Forming Apparatus>

Figure 34:
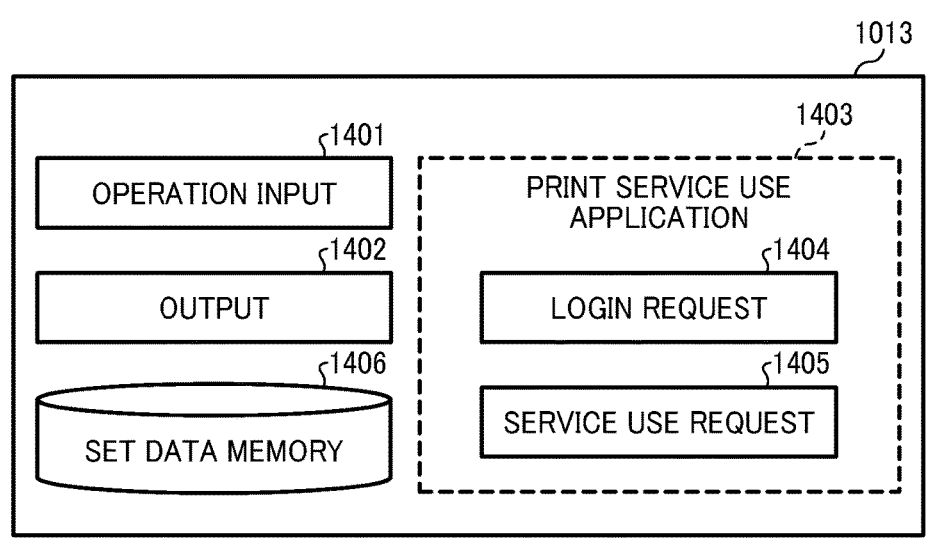
FIG. 34 is a schematic block diagram illustrating a functional structure of an image forming apparatus of the data output system of FIG. 22, according to an example embodiment of the present invention.

The image forming apparatus 1013 of the data output system 1000 has a functional structure as illustrated in FIG. 34. More specifically, the image forming apparatus 1013, which may have a hardware structure of FIG. 43, executes the control program to have functional modules illustrated in FIG. 34, which include an operation input 1401, an output 1402, print service use application 1403, and a set data memory 1406.

The operation input 1401 receives various instructions from the user such as the request user or the shared user, including a login request with login data of the user. The output 1402 outputs electronic data, received from the service provider system 1100, in response to a user instruction received at the operation input 1401. For example, the output 1402 forms an image based on the electronic data according to a request for printing.

The print service use application 1403 executes a job, using a login request 1404 and a service use request 1405. The login request 1404 allows the image forming apparatus 1013 to login the service provider system 1100. The login request 1404 receives a job list regarding one or more jobs related to a login user, from the service provider system 1100.

The image forming apparatus 1013, which receives the job list, may cause the operation panel to display information based on the job list, and receives a user instruction for selecting a job to be executed through the operation input 1401. The service use request 1405 requests the service provider system 1100 to execute a job according to the user instruction. The set data memory 1406 stores various settings data, such as print settings data to be used for printing the electronic data.

<Operation of Registering a Job by Email>

Now, operation of processing email that requests registration of a job that processes electronic data, performed by the data output system 1000, is explained according to an example embodiment of the present invention.

FIG. 35 is a data sequence diagram illustrating operation of processing email that requests registration of a print job, performed by the data output system 1000, according to an example embodiment of the present invention.

At S501, the operation input 1301 of the terminal device 1300 receives a user instruction for transmitting email, which requests registration of a job and is addressed to the print service application 1111, from a user (request user).

At S502, the operation input 1301 of the terminal device 1300 sends notification to the email transmit 1302, which notifies that the instruction for transmitting email is received. At S503, the email transmit 1302 of the terminal device 1300 sends email that requests registration of a job, to the email server 1032.

At S504 and S505, the email obtainer 1123 of the service provider system 1100 receives email from the email server 1032, for example, by polling. For example, the email obtainer 1123 may receive email from the email server 1032 in response to a request for obtaining email addressed to the print service application 1111.

At S506, the email obtainer 1123, which receives the email, determines whether the email is attached with an attachment file, and extracts the attachment file from the email if the file is attached. If the email does not have any attachment file, S506 is not performed to extract the attachment file.

At S507, the email obtainer 1123 sends en email message that corresponds to the email body, and the attachment file if extracted, to the print service application 1111 as email data.

At S508, the print service application 1111 analyzes contents of the email data received from the email obtainer 1123. The print service application 1111 extracts a URL from the email body, if the URL is provided. The print server application 1111 further obtains an email address of the request user that is set in the "From" field. The print server application 1111 further obtains an email address of the shared user other than the email address of the print service application 1111, from the "TO" field. The print server application 1111 may also analyze the attachment file.

At S509, the print service application 1111 sends a request for obtaining user management data to the authentication processor 1121, with information regarding the email address of the request user ("sender address") and the email address of the shared user ("destination address"). The email address of the shared user is sent, only when the email address of the shared user is detected.

At S511, the authentication processor 1121 refers to the user management data DB 1142 to obtain user management data, which are respectively associated with the sender address and the destination address. For example, the authentication processor 1121 obtains the user identification data of the request user, and the user identification data of the shared user, by referring to the user management data table of FIG. 30.

At S512, the authentication processor 1121 sends user management data, which are respectively obtained using the sender address and the destination address, to the print service application 1111.

At S513, the print service application 1111 obtains information regarding the URL extracted from the body of the email, and sends a request for obtaining storage data to the authentication processor 1121 with information regarding the URL.

At S514, the authentication processor 1121 refers to the storage data DB 1144 to obtain an entry of storage data that is associated with a URL keyword that matches the obtained URL. At S515, the authentication processor 1121 sends the obtained storage data, which is associated with the URL keyword that matches the obtained URL, to the print service application 1111. With the storage data, the print service application 1111 obtains the storage name of the online storage 1031 that is associated with the URL of the email. The print service application 1111 further refers to the user management data DB 1142 to obtain login data of the request user associated with the sender email, which is used to access the online storage 1031 having the obtained storage name.

At S516, the print service application 1111 sends a request for obtaining electronic data specified by the URL, to the data processor 1125, with the login data of the request user that is used to access the online storage 1031 having the obtained storage name.

At S517, the data processor 1125 sends a login request to the online storage 1031 using the login data received from the print service application 1111. The online storage 1031 authenticates the request user, based on the login data to generate an authentication result. In this example, it is assumed that the authentication result indicates that authentication is successful.

At S518, the online storage 1031 sends the authentication result indicating that authentication is successful. At S519, the data processor 1125 requests the online storage 1031 to obtain electronic data specified by the URL of the email. At S520, the online storage 1031 sends electronic data specified by the URL to the data processor 1125.

At S521, the data processor 1125 sends the electronic data specified by the URL of the email, to the print service application 1111. The print service application 1111 assigns an output data ID to the received electronic data, and spools the electronic data in the data storage 1145.

At S522, the print service application 1111 sends a request for obtaining user management data to the authentication processor 1121, with information regarding the email address of the shared user that is set in the "CC" or "BCC" field of the email. At S523, the authentication processor 1121 refers to the user management data DB 1142 to obtain user management data, which is associated with the email address set in the "CC" or "BCC" field. For example, the authentication processor 1121 obtains the user identification data of the share user, by referring to the user management data table of FIG. 30. At S524, the authentication processor 1121 sends the obtained user management data, which is associated with the email address set in the "CC" or "BCC" field, to the print service application 1111.

At S525, the print service application 1111 stores the output data management information, which associates the job ID for uniquely identifying the registered job, the output data ID of the electronic data spooled in the data storage 1145, the organization code of each user (request user and shared user), and user identification data that uniquely identifies each user (request user and shared user). With the output data management information, the print service application 1111 can manage a plurality of jobs that are registered. More specifically, in this example, the output data management information is stored such that the request user and the shared user for the same job are associated. In this example, the shared user includes a shared user having the email address that is set in "TO" field except for the email address of the print service application 1111, and a shared user having the email address that is set in the "CC" or "BCC" field of the email.

When there is a need for data format conversion, at S526, the print service application 1111 sends a request for converting a data format of the electronic data to the data processor 1125. For example, the print service application 1111 may send information indicating the output data ID to request data format conversion of the specific electronic data.

At S527, the data processor 1125 converts a data format of the electronic data specified by the output data ID, and the operation ends.

Figure 35B:
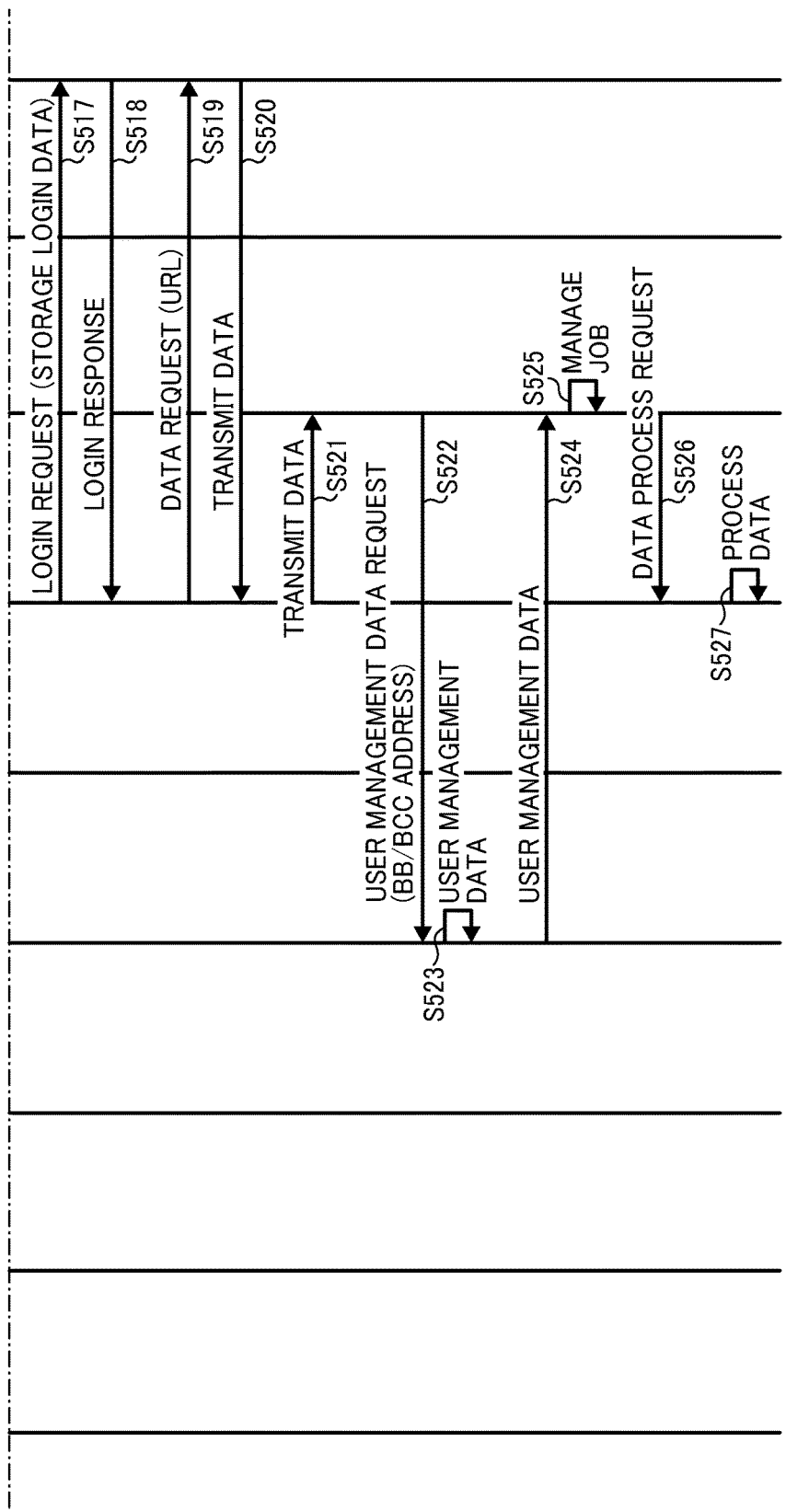
Figure 36:
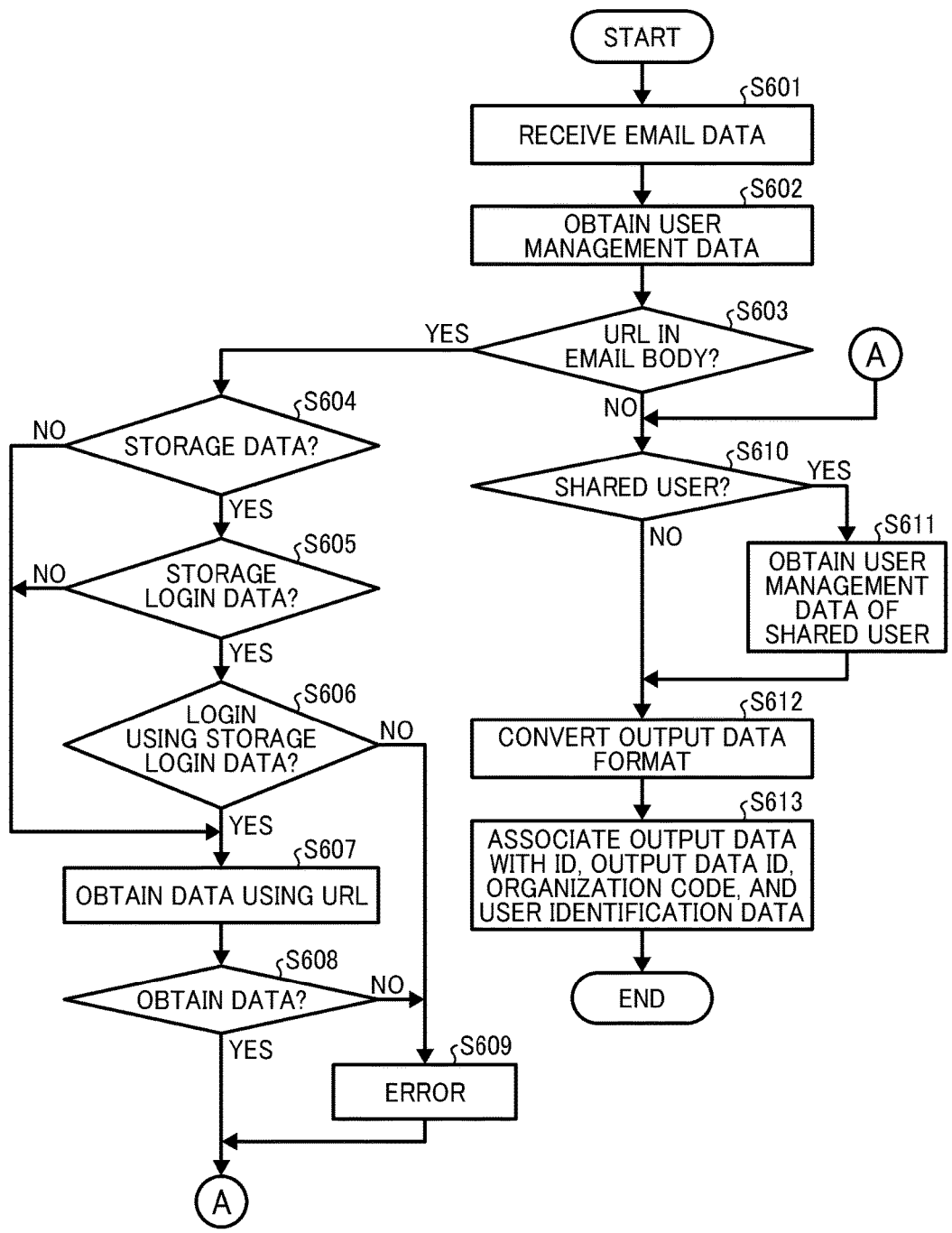
FIG. 36 is a flowchart illustrating operation of processing email that requests registration of a job, performed by the service provider system of FIG. 22, according to an example embodiment of the present invention.

Referring now to FIG. 36, operation of processing email that requests registration of a job that processes electronic data, performed by the service provider system 1100, is explained according to an example embodiment of the present invention. In the following example, it is assumed that the print service application 1111 receives email requesting registration of a print job, as described above referring to FIG. 35.

At S601, the print service application 1111 receives email data from the email obtainer 1123 of the service provider system 1100, at S507 of FIG. 35. The email data includes an email message such as the email body, and an attachment file if any.

At S602, the print service application 1111 analyzes contents of the email data. More specifically, the print service application 111 extracts an email address from the "FROM" field as an email address of the request user (the sender address), and an email address other than the email address of the print service application 1111 from the "TO" field as an email address of the shared user (the destination address). The print service application 1111 requests the authentication processor 1121 for user management data that matches the sender address and user management data that matches the destination address. In response, the print service application 1111 obtains the user management data of the request user and the user management data of the shared user.

At S603, the print service application 1111 determines whether the email has a URL in the body. When it is determined that the email has the URL ("YES" at S603), the operation proceeds to S604.

At S604, the print service application 1111 determines whether there is storage data that is associated with the extracted URL. More specifically, the print service application 111 sends a request for obtaining storage data associated with the extracted URL to the authentication processor 1121, and receives a response including storage data associated with the extracted URL if the storage data is obtained from the storage data DB 1144. As described above referring to S514 and S515 of FIG. 35, the response from the authentication processor 112 includes the storage data such as a storage name stored in association with a URL keyword that matches the extracted URL.

When it is determined that the storage data associated with the extracted URL is obtained ("YES" at S604), the operation proceeds to S605.

At S605, the print service application 1111 obtains the storage name included in the storage data to identify the online storage 1031. The print service application 1111 further determines whether the user management data associated with the sender address, obtained at S602, includes login data that corresponds to the online storage 1031 having the obtained storage name. When it is determined that the user management data of the request user includes the login data of the online storage 1031 having the obtained storage name, the operation proceeds to S606.

At S606, the data processor 1125 sends a login request to the online storage 1031 having the obtained storage name, using the login data of the request user that is obtained for the online storage 1031. The data processor 1125 further determines whether login to the online storage 1031 having the obtained storage name is successful. When it is determined that login is successful ("YES at S606), the operation proceeds to S607.

At S607, the data processor 1125 obtains the electronic data specified by the extracted URL from the online storage 1031, by sending a request for obtaining the electronic data to the online storage 1031.

At S608, the print service application 1111 determines whether the electronic data specified by the extracted URL is obtained. When the electronic data is obtained ("YES" at S608), the operation proceeds to S610.

At S610, the print service application 1111 determines whether the email requests to share the job with one or more shared users. More specifically, in this example, the print service application 1111 analyzes the email data to determine whether there is email address other than the email address of the print server application 1111, which is set in the field of the email. When it is determined that there is at least one shared user ("YES" at S610), the operation proceeds to S611.

At S611, the print service application 111 obtains user management data of the shared user. As described above referring to S522 and S523 of FIG. 35, the print service application 1111 requests the authentication processor 1121 to obtain user management data from the user management data DB 1142 using the email address of the shared user. The user management data includes, for example, the user name of the shared user.

When it is determined that the electronic data to be output needs to be converted, the operation proceeds to S612. At S612, the print service application 1111 sends a request for converting a data format of the electronic data to the data processor 1125, and receives the electronic data having a converted data format.

At S613, the print service application 1111 generates output data management information, which associates a job being registered and electronic data to be output through performing the job. More specifically, the output data management information associates a job ID that uniquely identifies a job being registered, an output data ID of the electronic data spooled in the data storage 1145, an organization code of the user, and user identification data of the user.

Referring to S603, when there is no URL in the body of email ("NO" at S603), the print service application 1111 determines that there is no need to obtain electronic data from the online storage 1031, and the operation proceeds to S610 without performing S604 to S609. For example, in such case, the email may be provided with the electronic data to be processed as an attachment file. In such case, the print service application 1111 obtains the electronic data from the email data, without accessing the online storage 1031.

Referring to S604, when there is no storage data associated with the URL extracted from the email ("NO" at S604), the authentication processor 1121 determines that login data is not required to obtain electronic data from the online storage 1031, and the operation proceeds to S607 without performing S605 and S606.

Referring to S605, when there is no login data associated with the storage name ("NO" at S605), the print service application 1111 determines that login data is not required to obtain electronic data from the online storage 1031, and the operation proceeds to S607 without performing S606.

Referring to S606, when login is not successful, the operation proceeds to S609 to determine that electronic data cannot be obtained. The operation further proceeds to S609 to return an error in obtaining electronic data specified by the URL.

Referring to S610, when there is no settings regarding a shared user ("NO" at S610), the print service application 1111 determines that there is no need to obtain user management data for the shared user, and the operation proceeds to S612 without performing S611.

In this example, this determination made at S610 is based on assumption that user management data for the shared user can be obtained from the user management data DB 1142. More specifically, the shared user needs to be previously registered to the user management data DB 1142.

In alternative to the example described above referring to FIG. 36, in the following example of FIG. 37, the print service application 1111 can register a job for a shared user, even when the shared user is not registered to the user management data DB 1142.

Figure 37:
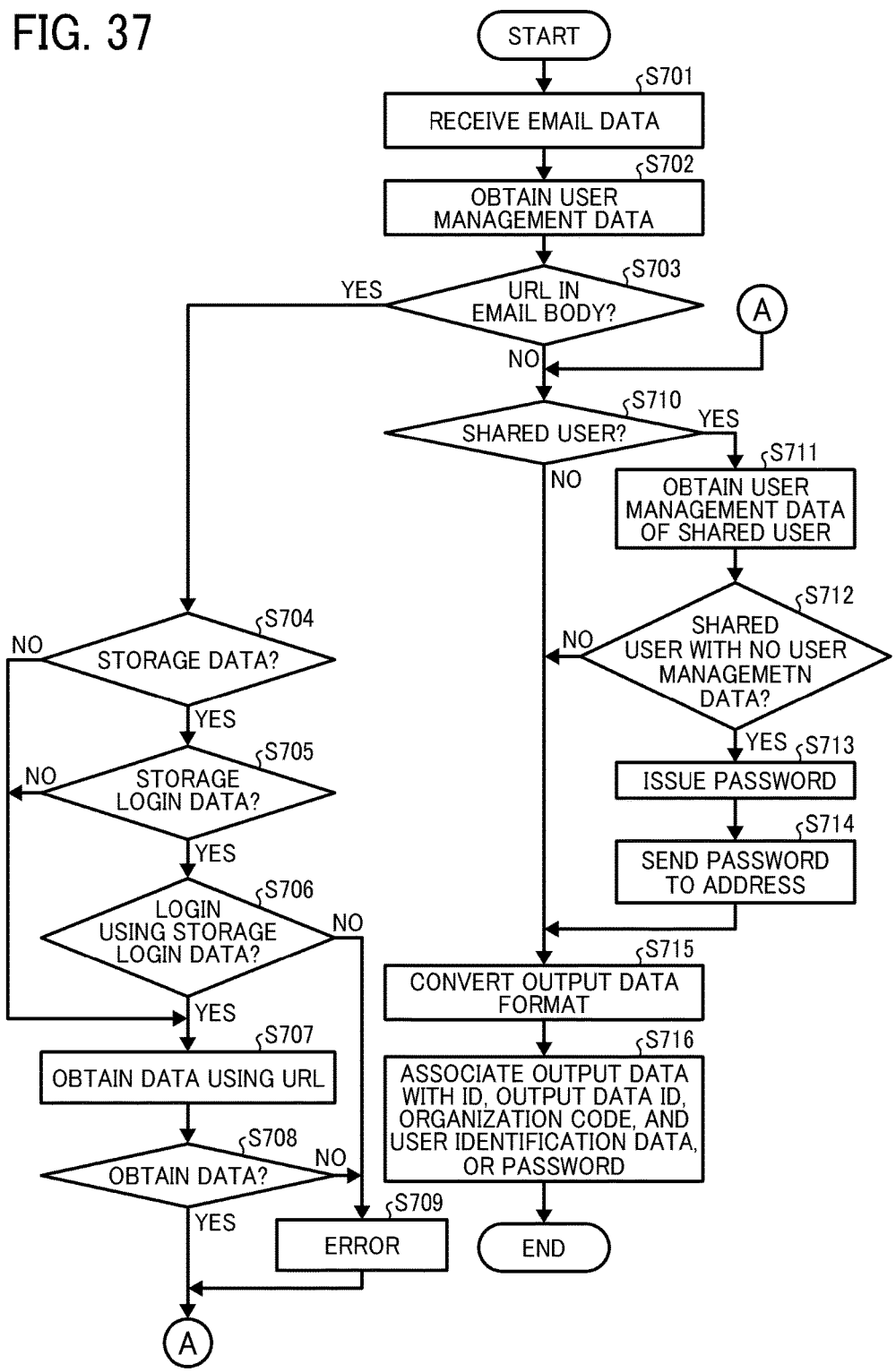
FIG. 37 is a flowchart illustrating operation of processing email that requests registration of a job, performed by the service provider system of FIG. 22, according to an example embodiment of the present invention.

The operation of FIG. 37 is performed in a substantially similar manner as described above referring to FIG. 36, except that a one-time password is issued for a user who is not registered to the user management data DB 1142.

S701 to S710 are performed in a substantially similar manner as described above referring to S601 to S610 of FIG. 36.

At S711, the print service application 1111 sends a request for obtaining user management data for a shared user to the authentication processor 1121, for example, by sending an email address of the shared user that can be extracted from the email.

At S712, the print service application 1111 determines whether there is at least one shared user missing user management data. When it is determined that there is no shared user missing user management data ("NO" at S712), the operation proceeds to S715 to S716 in a substantially similar manner as described above referring to S612 to S613 of FIG. 36.

When it is determined that there is at least one shared user missing user management data ("YES" at S713), the operation proceeds to S713. At S713, the print service application 1111 issues a password for the shared user who does not have user management data registered in the system.

At S714, the print service application 1111 sends email data, which notifies the password issued at S713, to the email address of the shared user who does not have user management data registered to the user management data DB 1142.

At S715, the print service application 1111 may request the data processor 1125 to convert a data format of the electronic data as needed, in a substantially similar manner as described above referring to S612 of FIG. 36.

At S716, the print service application 1111 associates a job to be registered and an electronic data to be output to generate output data management information. For example, the print service application 1111 may manage an output data management information table of FIG. 38. The output data management information table of FIG. 38 stores a password assigned to the shared user, in addition to the data items managed by the output data management information table of FIG. 27. For example, for the job with the ID "4", the user management data is not obtained for the shared user. In such case, in alternative to the organization code or the user identification data, the password "12345" generated at S713 is stored as the user management data regarding the shared user.

<Operation of Registering a Job by Web Upload>

Figure 39:
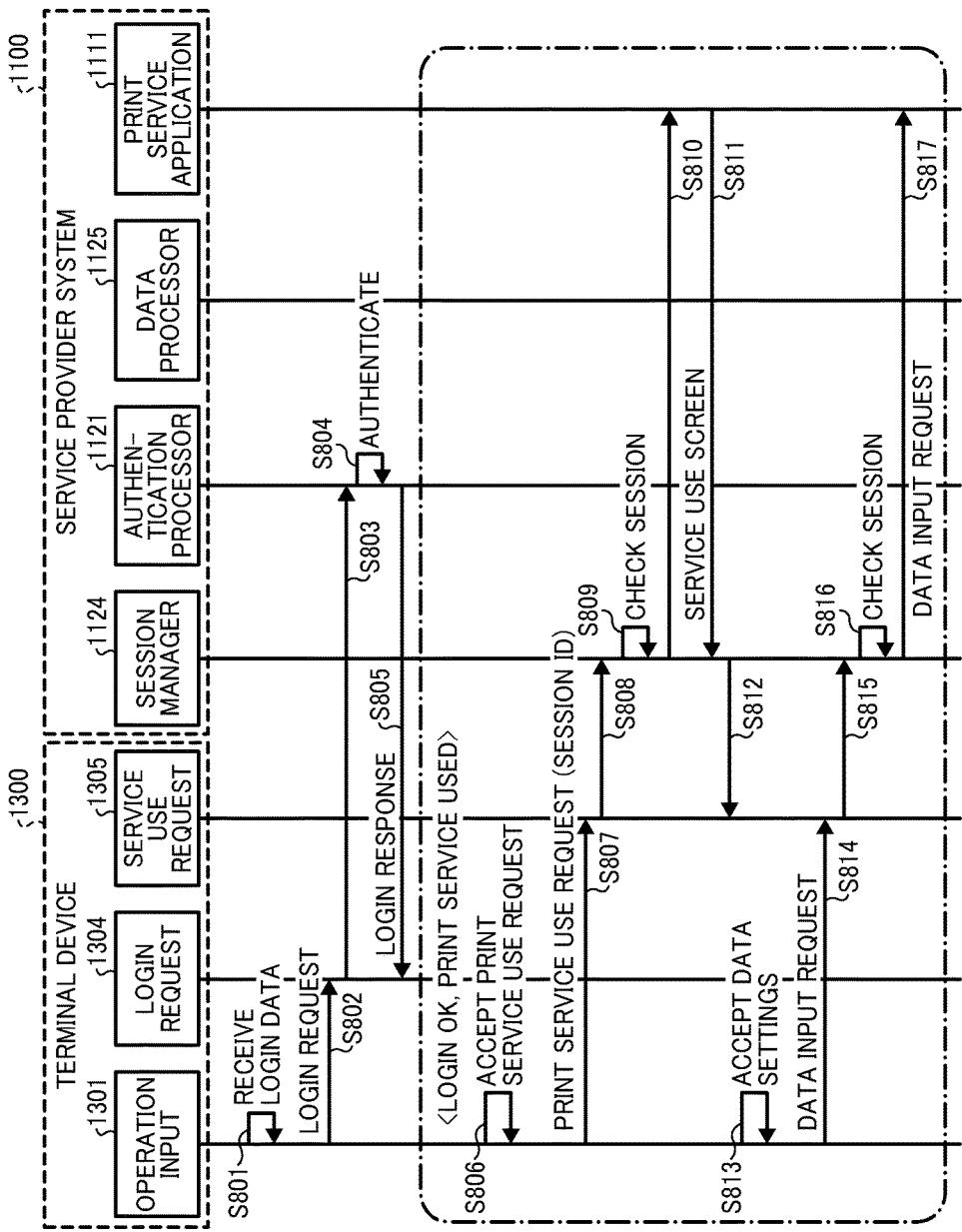
FIG. 39 is a data sequence diagram illustrating operation of processing a web upload request that requests registration of a job, performed by the data output system of FIG. 22, according to an example embodiment of the present invention.
Figure 40:
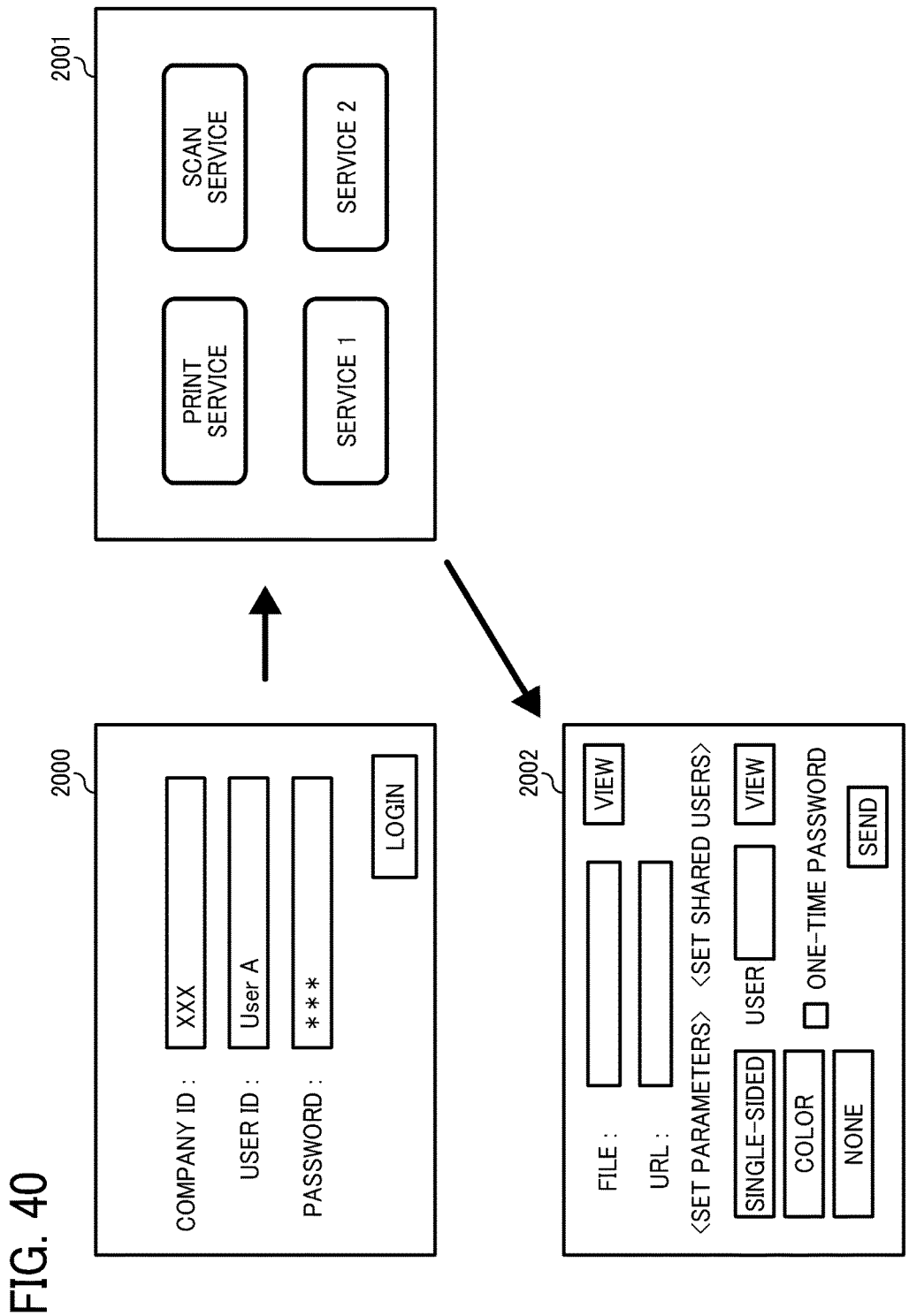
FIG. 40 is an illustration of example screens displayed at the terminal device of the data output system of FIG. 22.

In alternative to registering a job by email as illustrated in FIG. 35, the print service application 1111 may register a job by web uploading. FIG. 39 is a data sequence diagram illustrating operation of processing a web upload request that requests registration of a job, performed by the data output system 1000, according to an example embodiment of the present invention. FIG. 40 illustrates example screens, which may be displayed at the terminal device 1300.

Referring to FIG. 39, at S801, the terminal device 1300 accepts login data from a request user, who intends to request registration of a job by web upload. More specifically, in this example, the terminal device 1300 displays a login screen 2000 (FIG. 40) to request the request user to log in the service provider system 1100. After entering a company ID, a user ID, and a password, the user presses the "LOG IN" key to request the terminal device 1300 to send a login request to the service provider system 1100. In this example, the company ID is one example of organization code, which identifies a company to which the request user belongs. The user ID is one example of user identification data that is previously assigned to the request user. The operation input 1301 of the terminal device 1300 obtains login data, such as the company ID, user ID, and password, from the request user.

At S802, the operation input 1301 sends the login request from the request user, to the login request 1304. At S803, the login request 1304 of the terminal device 1300 sends the login request to the service provider system 1100, which includes the login data entered by the request user.

At S804, the authentication processor 1121 of the service provider system 1100 authenticates the request user, using the login data received from the terminal device 1300. The authentication processor 1121 determines whether to allow login by the request user based on an authentication result indicating whether the received login data matches any of login data previously registered. For simplicity, it is assumed that the authentication processor 1121 allows login from the request user.

At S805, the authentication processor 1121 sends a login response indicating that login is accepted to the login request 1304 of the terminal device 1300. In response to the login response, the terminal device 1300 displays a service list selection screen 2001 (FIG. 40) to request the request user to select one of the services provided by the service provider system 1100.

In this example, it is assumed that the request user selects the "PRINT SERVICE" key from the service list selection screen 2001 to select the print service. At S806 of FIG. 39, the operation input 1301 of the terminal device 1300 accepts a request for using the print service ("print service use request") from the request user. At S807, the operation input 1301 sends a print service use request to the service use request 1305.

At S808, the service use request 1305 sends a print service use request, received from the request user, to the service provider system 1100.

At S809, the session manager 1124 of the service provider system 1100, checks whether a session is being established with the print service application 111. Based on a check result indicating that the session is being established, at S810, the session manager 1124 sends a request for service use screen to the print service application 1111. At S811, the print service application 1111 sends a service use screen, such as a print service screen 2002 of FIG. 40, to the session manager 1124.

At S812, the session manager 1124 sends data of the print service screen 2002 to the service use request 1305 of the terminal device 1300.

At S813, the terminal device 1300 displays the print service screen 2002 of FIG. 40 on a display to request the request user to enter information regarding a print job to be registered. Through the print service screen 2002, the request user specifies electronic data to be printed, such as a file name or a URL of the electronic data, by directly entering in a data field or selecting from a list that may be displayed when the "View" key is selected. The request user further enters various print parameter settings such as whether to print one-sided or double-sided, or in color or black. In FIG. 40, when the key "NONE" is selected, the image is printed with default settings. Further, the request user enters one or more shared users, if the user decides to share the electronic data. The request user may determine whether to allow issuance of a one-time password, in case the shared user is not registered, by check box. After entering various settings information, the request user enters the "Send" key to generate a request for registering a print job with various data settings. The operation input 1301 receives the request for registering the print job ("data input request") with various data settings.

At S814, the operation input 1301 sends the data input request, received from the request user, to the service use request 1305. At S815, the service use request 1305 sends the data input request, received from the request user, to the service provider system 1100.

After checking a session at S816, at S817, the session manager 1124 of the service provider system 1100 sends the data input request with various data settings entered by the request user, to the print service application 1111.

The print service application 1111, which receives the data input request, registers a job in a substantially similar manner as described above referring to FIGS. 35 to 37. While the above-described example of receiving a request by email generates output data management information based on information obtained from the email, this example of receiving a request by web upload generates output data management information based on data settings input by the user through the web services.

<Operation of Executing a Job>

Figure 41A:
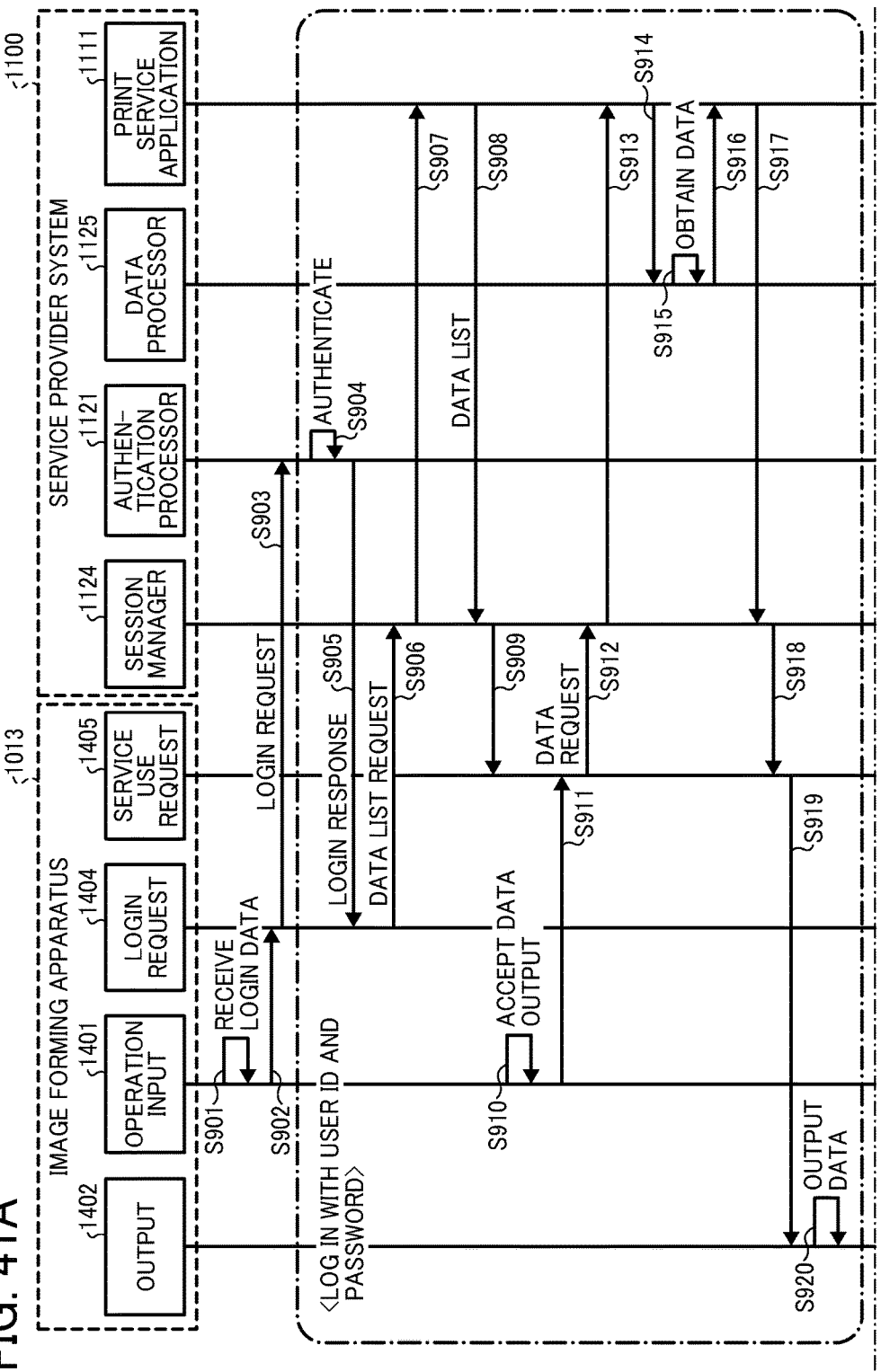
FIGS. 41A and 41B are a data sequence diagram illustrating operation of executing a job to output electronic data, performed by the data output system of FIG. 22, according to an example embodiment of the present invention.
Figure 41B:
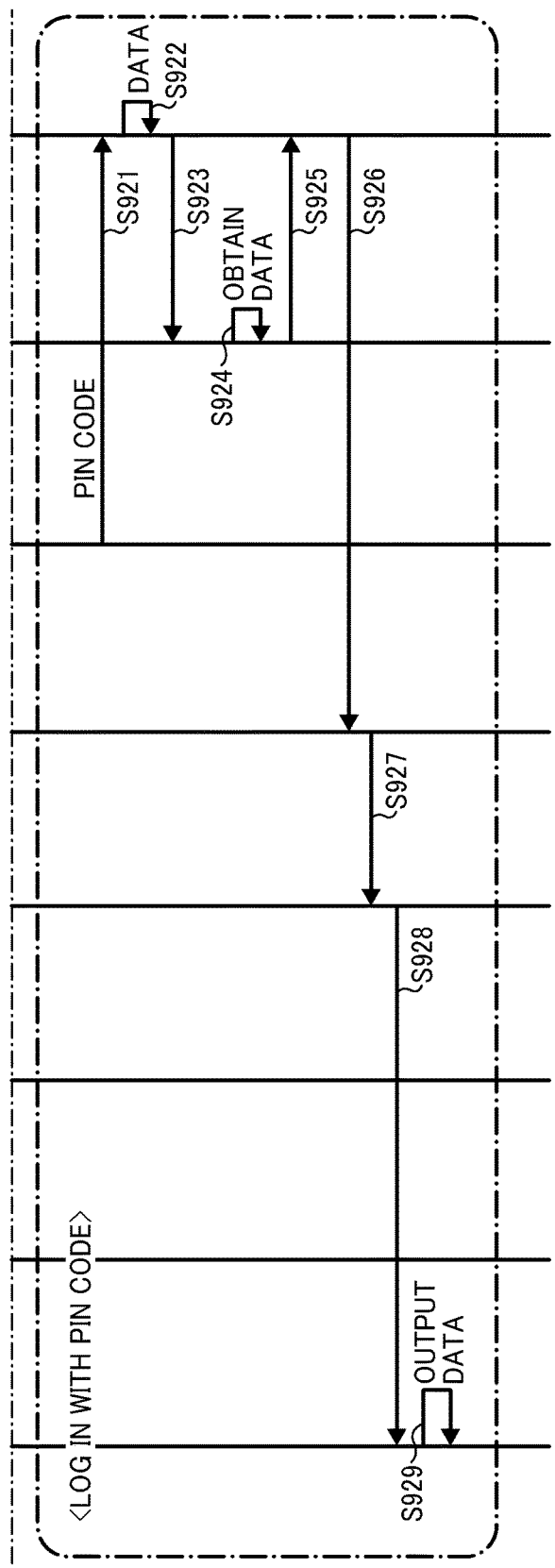

Referring now to FIGS. 41A and 41B, operation of executing a job that is registered to print electronic data using the image forming apparatus 1013, is explained according to an example embodiment of the present invention.

Figure 42:
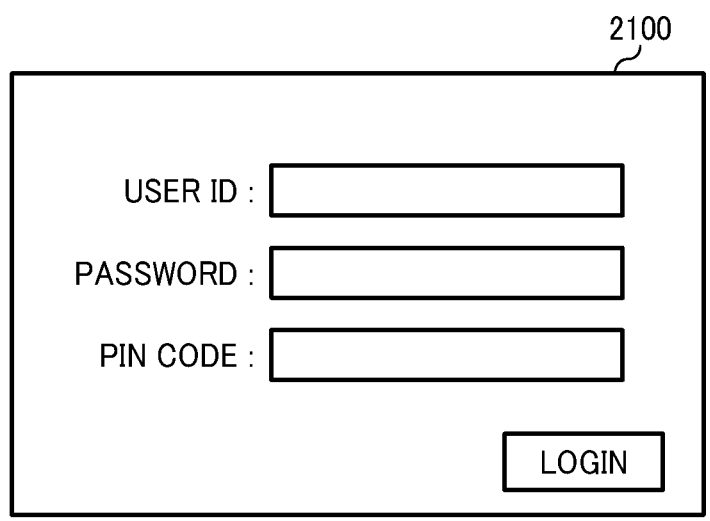
FIG. 42 is an illustration of an example screen displayed at the image forming apparatus of the data output system of FIG. 22.

FIGS. 41A and 41B are a data sequence diagram illustrating example operation of executing a print job registered through performing operation of any one of FIGS. 35 to 39, performed by the data output system 1000. FIG. 42 is an example login screen, which may be displayed at the image forming apparatus 1013.

Referring to FIG. 41A, at S901, the image forming apparatus 1013 accepts login data from a user, who intends to execute a print job that is registered. More specifically, in this example, the image forming apparatus 1013 displays the login screen 2100 of FIG. 42 to request the user to log in the service provider system 1100. After entering a user ID and a password, or a PIN code, the user presses the "LOG IN" key to request the image forming apparatus 1013 to send a login request to the service provider system 1100. In this example, the PIN code is one example of password, such as a one-time password that is temporarily assigned with the unregistered user. The operation input 1401 of the image forming apparatus 1013 obtains login data, such as the user ID and the password, or the PIN code, from the user.

At S902, the operation input 1401 sends the login request received from the user, to the login request 1404.

At S903, the login request 1404 of the image forming apparatus 1013 sends the login request to the service provider system 1100, which includes the login data entered by the user, the organization code previously assigned to the image forming apparatus 1013, and device authentication information to be used for authenticating the image forming apparatus 1013. In this example, the device authentication information is used to at least verify the validity of use of services by the image forming apparatus 1013 accessing the service provider system 1100. Depending on a type of the office device or a type of services or functions in use, the device authentication information may not be required to access the service provider system 1100.

In this example, the service provider system 1100 operates differently, depending on information obtained as the login data. More specifically, in one example, assuming that the login data received from the user includes the user ID and the password ("log in with user ID and password" in FIG. 41A), the operation proceeds to S905 to perform S905 to S919. In another example, assuming the login data received from the user includes the PIN code ("log in with PIN code" in FIG. 41B), the operation proceeds to S921 to perform S921 to S929.

In the example case of login with user ID and password, at S904, the authentication processor 1121 authenticates the user using the user ID and the password, and further authenticates the image forming apparatus 1013 using the organization code and the device authentication information. For example, the authentication processor 1121 may authenticate, using the organization management data table of FIG. 29, the user management data table of FIG. 30, and the device management data table of FIG. 31. The authentication processor 1121 determines whether to allow log in by user based on an authentication result indicating whether the user and the image forming apparatus 1013 are both authenticated. For simplicity, it is assumed that the authentication processor 1121 allows login from the user at the image forming apparatus 1013.

At S905, the authentication processor 1121 sends a login response indicating that login is accepted to the login request 1404 of the image forming apparatus 1013. In response to the login response, at S906, the login request 1404 sends a request for obtaining a data list ("data list request") with the user ID of the user.

After checking a session being established with the print service application 1111, at S907, the session manager 1124 sends a data list request to the print service application 1111. The print service application 1111 searches the output data management information storage 1207 (FIG. 25) using the received user ID to obtain output data management information indicating one or more jobs that are related with the login user. Based on the output data management information obtained for the login user, the print service application 111 generates a data list that lists one or more jobs that are related to the login user.

At S908 and S909, the print service application 1111 sends the data list to the service use request 1405 of the image forming apparatus 1013, via the session manager 1124. The image forming apparatus 1013 displays a screen that lists one or more jobs that are related to the user based no the data list, and requests the user to select electronic data to be output.

At S910, the operation input 1401 of the image forming apparatus 1013 receives a request for outputting electronic data with selection of the data to be output ("data output request"), from the user. At S911, the operation input 1401 sends the data output request, received from the user, to the service use request 1405. At S912, the service use request 1405 sends the data output request to the service provider system 1100.

After checking a session being established with the print service application 1111, at S913, the session manager 1124 of the service provider system 1100 sends a data output request, received from the user, to the print service application 1111.

Through performing S914 to S916, the print service application 1111 obtains the electronic data requested by the data output request from the data storage 1145. At S917 to S919, the service provider system 1100 sends the electronic data that is obtained to the output 1402 of the image forming apparatus 1013.

At S920, the output 1402 of the image forming apparatus 1013 outputs electronic data according to the data output request, and the operation ends. More specifically, the output 1402 prints an image based on the electronic data to complete the print job.

In the example case of login with PIN code, at S921 of FIG. 41B, the authentication processor 1121 sends a request for obtaining electronic data specified by the PIN code, to the print service application 1111. At S922, the print service application 1111 refers to the output data management information of FIG. 38 to identify electronic data associated with the PIN code. S923 to S929 are performed in a substantially similar manner as described above referring to S914 to S920.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. For example, the control program that causes an information processing apparatus such as one or more general-purpose computers to function as the print server 200 or the service provider system 1100 may be used. In such case, the control program may be stored in any desired memory such as the ROM 230, the HDD 260, the ROM 1505, or the HDD 1508. The other examples of storage mediums include, but are not limited to, flexible disk, hard disk, optical discs such as CD-ROM, magneto-optical discs, magnetic tapes, SRAM, EEPROM, nonvolatile memory cards, ROM (read-only-memory), etc. The control program may be read from the memory or storage medium may be installed onto a desired number of general-purpose computers to cause one or more processors to execute various functions according to the read control program.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The illustrated server apparatuses or systems, such as the print server 200 and the service provider system 1100, which may be collectively referred to as the information processing apparatus or system, are only illustrative of one of several computing environments for implementing the embodiments disclosed herein. For example, in some embodiments, the print server 200 or the service provider system 1100 includes a plurality of computing devices, e.g., a server cluster, that are configured to communicate with each other over any type of communications link, including a network, a shared memory, etc. to collectively perform the processes disclosed herein.

Moreover, the service provider system 1100 can be configured to share the processing steps disclosed, e.g., in FIGS. 35A and 35B, in various combinations. For example, the processes performed by the email server 1032 can be performed by the service provider system 1100. Similarly, the functionality of the online storage 1031 can be performed by the service provider system 1100. Further, the illustrated elements of the print system of FIG. 2 or the data output system 1000 of FIG. 22 can be combined into a single server apparatus, or divided between a plurality of machines in combinations other than that shown for example in FIG. 2 or 22.

Further, in another example, the service application 1101 such as the print service application 1111 may be provided by a service provider, which may be different from a service provider providing the platform 1102. In such case, one or more information processing apparatuses (or information processing system) functioning as the print service application 1111, and one or more information processing apparatuses (or information processing system) may cooperatively operate to have the functions or operations described above.

Further, each of the plurality of computing devices is configured to communicate with one or more external computing devices using any type of communication link, including any combination of wired and wireless communication links; using any type of network, including the Internet, a wide-area network (WAN), a local-area network (LAN), and a virtual private network (VPN); and using any combination of transmission techniques and communication protocols.

In one example, the present invention may reside in an information processing apparatus, which can be connected to a data management apparatus that stores electronic data, and to a data output apparatus that outputs the electronic data, through a network. The information processing apparatus includes: information obtaining means for obtaining first user information regarding a first user, location information indicating a location from which the electronic data is obtained such as a data storage area at which the electronic data to be processed is stored, and second user information regarding a second user; data managing means for managing the first user information and the second user information, in association with the electronic data to be processed; data obtaining means for obtaining the electronic data to be processed, from the data stores area, using the first user information and the location information; and data transmitting means for transmitting the electronic data associated with the first user information and the second user information to the data output apparatus in response to a request for executing the job, the request for executing the job being received from the first user or the second user.

For example, the information processing apparatus corresponds to the print server 200, or at least a portion of the service provider system 1100. The data management apparatus corresponds to the online storage 500 or the online storage 1031. The data output apparatus corresponds to the printer 400, the image forming apparatus 1013, or any desired data output apparatus such as the projector.

Further, the first receiving means, which performs the function of obtaining information, corresponds to any one or any combination of the email obtainer 201 of the print server 200, the analyzer 203 of the print server 200, the email obtainer 1123 of the service provider system 1100, and the data analyzer 1201 of the print service application 1111, which may operate in cooperation with the email server 100 or the email server 1032. The data obtaining means corresponds to any one or any combination of the data obtainer 206 of the print server 200 and the data obtainer 1131 of the service provider system 1100, which may operate in cooperation with information stored in a memory such as the authentication information storage 212 or the management data 1103. The data managing means corresponds to any one or any combination of the job manager 209 of the print server 200, and the output data manager 1202 of the print service application 1111, which may operate in cooperation with information stored in a memory such as the output data management information storage 1207. The data transmitting means corresponds to any one or any combination of the data transmit 208 of the print server 200, and the device communicator 1122 of the service provider system 1100.

For example, the first receiving means and the data transmitting means may be implemented by a processor, which operates in cooperation with a communication interface. The data managing means and the data obtaining means may be implemented by the processor.

In one example, the information obtaining means may function as receiving means for receiving the request for registering the job by electronic mail from the first user and analyzing the electronic mail to obtain the first user information, the location information, and the second user information, respectively, from the electronic mail. For example, the information obtaining means may obtain the first user information from a sender email address extracted from the electronic mail, and the second user information from a destination email address extracted from the electronic mail.

Alternatively, the information obtaining means may receive the request for registering the job, which is input by the first user through a user interface that is displayed through the terminal device operated by the first user.

Further, in one example, association of the first user information and the second user information, with the electronic data to be processed may be managed by registering job information, such as the print job registration table of FIG. 15, the output data management information table of FIG. 27, or the output data management information table of FIG. 28. The first user information and the second user information are stored in association with job identification information.

Further, in one example, the first user or the second user may send the request for executing the job, by directly operating the data output apparatus. Alternatively, the first user or the second user may send the request for executing the job, by sending a request to the data output apparatus.

In one example, a storage device is provided, which stores authentication information to be used for accessing the data storage apparatus in association with user information. The data obtaining means obtains first user authentication information to be used by the first user to access the data storage area of the data storage apparatus, which is associated with the first user information, from the storage device. The data obtaining means further obtains the electronic data to be processed from the data storage area using the first user authentication information.

For example, the storage device storing the user information and the authentication information may correspond to any one or any combination of the authentication information storage 212 of the print server 200 such as a DB storing the access authentication information table of FIG. 18, and the management data 1103 of the service provider system 1100 such as the user management data DB 1142.

The data obtaining means obtains the electronic data to be processed from the data storage area of the data management apparatus, in response to the request for executing the job being received from the first user or the second user. In one example, the first user or the second user may send the request for executing the job through the data output apparatus. Further, before obtaining the electronic data to be processed from the data management apparatus, the data managing means stores the location information in association with the first user information and the second user information, for example, as described above referring to FIGS. 7 to 10 and 20.

The information processing apparatus, which obtains the electronic data using the first user information and the location information from the data management apparatus, causes the data management apparatus to store the obtained electronic data in a data storage area using the second user information and location information of the second user, such that the second user can obtain the electronic data from the data storage area of the data management apparatus using the second user information. For example, the information processing apparatus may obtain location information indicating the data storage area of the second user at which the electronic data to be processed is stored, and manages the second user information in association with the electronic data stored in the data storage area of the second user, using the location information indicating the data storage area of the second user, for example, as described above referring to FIGS. 11 to 14 and 21.

The information processing apparatus further includes means for generating temporarily assigned authentication information for the second user, temporarily assigned authentication information is different from the second user information; and notifying means for notifying the second user of the temporarily assigned authentication information. The data management means manages the electronic data to be processed, in association with the temporarily assigned authentication information of the second user. The data transmitting means transmits the electronic data associated with the temporarily assigned authentication information to the data output apparatus, in response to the request for executing the job being received from the second user and including the temporarily assigned authentication information.

In one example, the generating means corresponds to the shared information manager 210 or the password generator 1206. The notifying means corresponds to the data transmit 208 of the print server 200, or the device communicator 1122 of the service provider system 1100, which may cooperatively operate with the email server 100 or the email server 1032. For example, the temporarily assigned authentication information may be a one-time password that may be managed using the shared password table of FIG. 16 or the output data management information table of FIG. 38.

In one example, the information processing apparatus further includes means for determining whether the first user is a registered user based on whether the first user information obtained by the information obtainer means is previously stored. When the first user is not the registered user, the data obtaining means does not obtain the electronic data using the first user information and the location information.

In one example, the information processing apparatus further includes means for determining whether the location information is obtained from the request for registering the job. When the location information is not obtained by the information obtainer means, the data obtaining means does not obtain the electronic data using the first user information and the location information.

In one example, the present invention may reside in a computer program stored in a non-transitory recording medium, which cause one or more processors to function as any one of the above-described information processing apparatuses.

In one example, the present invention may reside in an information processing system that can be connected to a data management apparatus that stores electronic data, and a data output apparatus that outputs the electronic data, through a network. The information processing system includes: information obtaining means for obtaining first user information regarding a first user, location information indicating a location from which the electronic data is obtained such as a data storage area at which the electronic data to be processed is stored, and second user information regarding a second user; data managing means for managing the first user information and the second user information, in association with the electronic data to be processed; data obtaining means for obtaining the electronic data to be processed, from the data stores area, using the first user information and the location information; and data transmitting means for transmitting the electronic data associated with the first user information and the second user information to the data output apparatus in response to a request for executing the job, the request for executing the job being received from the first user or the second user.

In one example, the present invention may reside in an information sharing method performed by an information processing apparatus or system that can be connected to a data management apparatus that stores electronic data, and a data output apparatus that outputs the electronic data, through a network. The information sharing method includes: obtaining first user information regarding a first user, location information indicating a location from which the electronic data is obtained such as a data storage area at which the electronic data to be processed is stored, and second user information regarding a second user; managing the first user information and the second user information, in association with the electronic data to be processed; obtaining the electronic data to be processed, from the data stores area, using the first user information and the location information; and transmitting the electronic data associated with the first user information and the second user information to the data output apparatus in response to a request for executing the job, the request for executing the job being received from the first user or the second user.

In one example, the present invention may reside in: an information processing system comprising: a communication interface configured to obtain a request for registering a job to process electronic data from a first user and a processor. The processor obtains, from the request for registering the job to process the electronic data, first user information regarding the first user, location information indicating a data storage area at which the electronic data to be processed is stored, and second user information regarding a second user, obtains the electronic data from the data storage area, using the first user information and the location information, and transmits the electronic data associated with the first user information and the second user information to a data output apparatus in response to a request for executing the job, the request for executing the job being received from the first user or the second user. The processor may further manage the first user information and the second user information, in association with the electronic data to be processed.

In one example, the present invention may reside in: an information processing apparatus including: a communication interface configured to obtain a request for registering a job to process electronic data from a first user; and a processor. The processor obtains, from the request for registering the job to process the electronic data, first user information regarding the first user, location information indicating a data storage area at which the electronic data to be processed is stored, and second user information regarding a second user, obtains the electronic data from the data storage area, using the first user information and the location information, and transmits the electronic data associated with the first user information and the second user information to a data output apparatus in response to a request for executing the job, the request for executing the job being received from the first user or the second user. The processor may further manage the first user information and the second user information, in association with the electronic data to be processed.

In one example, the present invention may reside in a method of sharing a job to process electronic data, the method comprising: obtaining, from a request for registering the job to process the electronic data, first user information regarding a first user who sends the request for registering the job, location information indicating a data storage area at which the electronic data to be processed is stored, and second user information regarding a second user; obtaining the electronic data from the data storage area, using the first user information and the location information; and outputting the electronic data associated with the first user information and the second user information in response to a request for executing the job, the request for executing the job being received from the first user or the second user. The method may further include managing the first user information and the second user information, in association with the electronic data to be processed.

In one example, the present invention may reside in: a non-transitory recording medium storing a plurality of instructions which, when executed by a processor, cause the processor to perform a method of sharing a job to process electronic data. The method includes: obtaining, from a request for registering the job to process the electronic data, first user information regarding a first user who sends the request for registering the job, location information indicating a data storage area at which the electronic data to be processed is stored, and second user information regarding a second user; obtaining the electronic data from the data storage area, using the first user information and the location information; and outputting the electronic data associated with the first user information and the second user information in response to a request for executing the job, the request for executing the job being received from the first user or the second user. The method may further include managing the first user information and the second user information, in association with the electronic data to be processed.

What is claimed is:

1. An information processing system, comprising:
a storage device configured to store authentication information to be used by one or more users, respectively, in accessing a server, the authentication information stored in the storage device being associated with user information for the one or more users;
a communication interface configured to obtain a request for registering a job to process electronic data from a first user; and
a processor configured to,
obtain, from the request for registering the job to process the electronic data, first user information regarding the first user, location information indicating a data storage area of the server at which the electronic data to be processed is stored, and second user information regarding a second user, the first user information associated with a source of the electronic data and the second user information associated with a destination of the electronic data, the source and the destination being different;
determine whether the second user is registered;
generate temporarily assigned authentication information when the second user is determined to be not registered, the temporarily assigned authentication information being different from the authentication information stored in the storage device;
manage the temporarily assigned authentication information in association with the electronic data to be processed and the first user information stored in the storage device;
obtain the electronic data from the data storage area by accessing the server using the temporarily assigned authentication information in response to a request for executing the job from the second user; and
transmit the electronic data associated with the first user information and the temporarily assigned authentication information to a data output apparatus, as a response to the request for executing the job from the second user.

2. The information processing system of claim 1, wherein the processor is configured to receive the request for registering the job by electronic mail, and extract the first user information, the location information, and the second user information, respectively, from the electronic mail.

3. The information processing system of claim 2, wherein the processor is configured to obtain the first user information from a sender email address extracted from the electronic mail, and the second user information from a destination email address extracted from the electronic mail, the sender email address and the destination email address being different.

4. The information processing system of claim 1, wherein the processor is configured to cause the electronic data obtained from the data storage area be stored in a data storage area of the second user, using the second user information,
obtain location information indicating the data storage area of the second user at which the electronic data to be processed is stored, and
manage the second user information in association with the electronic data stored in the data storage area of the second user, using the location information indicating the data storage area of the second user.

5. The information processing system of claim 1, wherein the processor is further configured to notify the second user of the temporarily assigned authentication information, wherein the temporarily assigned authentication information is in the request for executing the job.

6. The information processing system of claim 1, wherein the processor determines whether the second user is a registered user based on whether the second user information obtained from the request for registering the job is previously stored in the storage device.

7. The information processing system of claim 1, further comprising:
a network interface configured to receive the request for registering the job from a terminal device.

8. A data output system, comprising:
the information processing system of claim 1; and
a data management apparatus including the data storage area at which the electronic data to be processed is stored.

9. The data output system of claim 8, further comprising:
the data output apparatus configured to output the electronic data received from the information processing system according to the request for executing the job.

10. A method of sharing a job to process electronic data, the method comprising:
storing authentication information in a memory, the authentication information stored in the memory to be used by one or more users, respectively, in accessing a server, the authentication information stored in the memory being associated with user information for the one or more users;
obtaining, from a request for registering the job to process the electronic data, first user information regarding a first user who sends the request for registering the job, location information indicating a data storage area at which the electronic data to be processed is stored, and second user information regarding a second user, the first user information associated with a source of the electronic data and the second user information associated with a destination of the electronic data, the source and the destination being different;
determining whether the second user is registered;
generating temporarily assigned authentication information when the second user is determined to be not registered, the temporarily assigned authentication information being different from the authentication information stored in the memory;
managing the temporarily assigned authentication information in association with the electronic data to be processed and the first user information stored in the memory;
obtaining the electronic data from the data storage area by accessing the server using the temporarily assigned authentication information in response to a request for executing the job from the second user; and
outputting the electronic data associated with the first user information and the temporarily assigned authentication information, as a response to the request for executing the job from the second user.

11. The method of claim 10, further comprising:
receiving the request for registering the job by electronic mail; and
extracting the first user information, the location information, and the second user information, respectively, from the electronic mail.

12. The method of claim 10, further comprising:
storing the electronic data obtained from the data storage area in a data storage area of the second user, using the second user information;
obtaining location information indicating the data storage area of the second user at which the electronic data to be processed is stored; and
managing the second user information in association with the electronic data stored in the data storage area of the second user, using the location information indicating the data storage area of the second user.

13. The method of claim 10, further comprising:
notifying the second user of the temporarily assigned authentication information, wherein the temporarily assigned authentication information is in the request for executing the job.

14. The method of claim 10, further comprising:
determining whether the second user is a registered user based on whether the second user information obtained from the request for registering the job is previously stored in the memory.

15. The information processing system of claim 1, wherein, when the second user is determined to be registered,
the processor is further configured to,
manage the second user information in association with the electronic data to be processed and the first user information,
obtain second authentication information associated with the second user information from the authentication information stored in the storage device,
in response to a request for executing the job from the second user, obtain the electronic data from the data storage area by accessing the server using the second authentication information, and
transmit the electronic data associated with the first user information and the second user information to the data output apparatus, as the response to the request for executing the job from the second user.

16. The information processing system of claim 1, wherein the data storage area stores the electronic data to be processed in association with the temporarily assigned authentication information.

17. The information processing system of claim 16, wherein the data storage area stores the electronic data to be processed in a table, each row of the table including an entry for the electronic data to be processed and another entry for the temporarily assigned authentication information.

18. The method of claim 10, wherein, when the determining indicates that the second user is registered, the method further comprising:
managing the second user information in association with the electronic data to be processed and the first user information;
obtaining second authentication information associated with the second user information from the authentication information stored in the memory;
in response to a request for executing the job from the second user, obtaining the electronic data from the data storage area by accessing the server using the second authentication information; and
transmitting the electronic data associated with the first user information and the second user information to a data output apparatus, as the response to the request for executing the job from the second user.

19. The method of claim 10, further comprising:
storing the electronic data to be processed in association with the temporarily assigned authentication information.

20. The method of claim 19, wherein the storing the electronic data to be processed includes storing the electronic data to be processed in a table, each row of the table including an entry for the electronic data to be processed and another entry for the temporarily assigned authentication information.

* * * * *